(12) United States Patent
Kosaka et al.

(10) Patent No.: US 10,627,835 B2
(45) Date of Patent: Apr. 21, 2020

(54) POSITIONING CONTROLLER

(71) Applicant: Mitsubishi Electric Corporation, Chiyoda-ku (JP)

(72) Inventors: Ko Kosaka, Tokyo (JP); Koichiro Ueda, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 271 days.

(21) Appl. No.: 15/553,657

(22) PCT Filed: Feb. 16, 2016

(86) PCT No.: PCT/JP2016/054484
§ 371 (c)(1),
(2) Date: Aug. 25, 2017

(87) PCT Pub. No.: WO2016/170829
PCT Pub. Date: Oct. 27, 2016

(65) Prior Publication Data
US 2019/0107848 A1 Apr. 11, 2019

(30) Foreign Application Priority Data
Apr. 23, 2015 (JP) ................... 2015-088694

(51) Int. Cl.
*G05D 3/12* (2006.01)
*G05B 19/402* (2006.01)
*G05B 19/404* (2006.01)

(52) U.S. Cl.
CPC ............ *G05D 3/12* (2013.01); *G05B 19/402* (2013.01); *G05B 19/404* (2013.01); *G05B 2219/41128* (2013.01); *G05B 2219/45031* (2013.01)

(58) Field of Classification Search
CPC ........ G05B 19/402; G05B 2219/45031; G05D 3/12
See application file for complete search history.

(56) References Cited

U.S. PATENT DOCUMENTS

2003/0083783 A1 5/2003 Matsuo et al.
2012/0187891 A1* 7/2012 Ueda ................... G05B 19/402
318/615

FOREIGN PATENT DOCUMENTS

JP 2003-91320 A 3/2003
JP 2003-517167 A 5/2003
(Continued)

OTHER PUBLICATIONS

International Search Report dated May 10, 2016 in PCT/JP2016/054484 filed Feb. 16, 2016.

*Primary Examiner* — Kenneth M Lo
*Assistant Examiner* — Mohammad A Rahman
(74) *Attorney, Agent, or Firm* — Oblon, McClelland, Maier & Neustadt, L.L.P.

(57) ABSTRACT

A positioning controller includes a position command signal generating unit that generates a position command signal for moving a mechanical load over a set movement distance D by driving a motor; a drive control unit that executes positioning control on the basis of a detected position signal of the mechanical load and the position command signal; a residual vibration information recording unit that stores a plurality of pieces of residual vibration information; and a position command signal parameter determining unit that determines, on the basis of the allowable positioning error and the plurality of pieces of residual vibration information, a position command signal parameter for generating the position command signal for which the residual vibration amplitude is smaller than or equal to an allowable positioning error.

16 Claims, 35 Drawing Sheets

(56) References Cited

FOREIGN PATENT DOCUMENTS

| JP | 2006-31146 A | 2/2006 |
| JP | 2007-272597 A | 10/2007 |
| WO | 2011/039929 A1 | 4/2011 |

* cited by examiner

POSITIONING CONTROLLER

FIELD

The present invention relates to a positioning controller that moves a control target over a set movement distance.

BACKGROUND

Conventional industrial machines such as electronic-component mounting machines and semiconductor manufacturing equipment perform positioning control in which a servo motor is driven in order to move a control target, such as a mounted head, over a set movement distance. It is desired, with this kind of positioning control, to improve the productivity of an industrial machine per unit of time by shortening the time required for positioning. However, when positioning control is performed by an industrial machine with low rigidity, residual vibration is generated, which hinders the shortening of the time required for positioning.

An example of a conventional technique for solving such a problem is disclosed in Patent Literature 1, wherein vibration is suppressed by applying, to a positioning command, a filter with a characteristic of lowering both the gain of a predetermined frequency and a frequency in the vicinity thereof and with another characteristic of suppressing the gain of high frequencies. Patent Literature 2 also discloses a technique for suppressing vibration in which the natural frequency of a control target is obtained and the acceleration time and deceleration time of acceleration/deceleration patterns are set to integer multiples of the natural period, which is a reciprocal of the natural frequency.

CITATION LIST

Patent Literature

Patent Literature 1: Japanese Patent Application Laid-Open No. 2006-31146
Patent Literature 2: Japanese Patent Application Laid-Open No. 2007-272597

SUMMARY

Technical Problem

However, according to the technique disclosed in Patent Literature 1, in which a filter is used to remove the vibration frequency component of the machine from the positioning command, the command issuing time, which is the time it takes for the positioning command to reach a target position from the start of positioning, is longer than when a filter is not used, whereby the positioning time is also extended. The technique disclosed in Patent Literature 2 is a vibration suppression method that does not use a vibration suppression filter and vibration suppression is actually performed by adjusting the acceleration/deceleration times of a move command to the integer multiples of the natural period of the control target. With this method, extension of the acceleration/deceleration times can delay the command issuing time, which results in an extension of the positioning time.

The present invention has been made in view of the above, and it is an objective of the present invention to provide a positioning controller capable of shortening positioning times.

Solution to Problem

In order to solve the above-mentioned problem and achieve the objective, the present invention provides a positioning controller that includes: a position command signal generating unit to generate a position command signal on the basis of a position command signal parameter that determines a shape of the position command signal, the position command signal being used to move a control target over a set movement distance by driving a motor; a drive control unit to execute positioning control so that a detected position signal, which is a piece of position information on the motor or the control target that is detected, follows the position command signal on the basis of the detected position signal and the position command signal; a residual vibration information recording unit to store, as residual vibration information, a residual vibration amplitude and the position command signal parameter in association with each other, the residual vibration amplitude being a magnitude of a residual vibration of the motor or the control target generated at the time of execution of the positioning control by using a plurality of the position command signals, the position command signal parameter of each being previously determined and different; and a position command signal parameter determining unit to determine, on the basis of the allowable positioning error and a plurality of pieces of the residual vibration information stored in the residual vibration information recording unit, the position command signal parameter for generating the position command signal that has a residual vibration amplitude that is within an allowable positioning error, the allowable positioning error being a tolerance of a difference between the set movement distance of the control target and a detected position of the motor or the control target at the end of the positioning control.

Advantageous Effects of Invention

According to the present invention, the residual vibration is suppressed and thus falls within the allowable positioning error so as to be able to shorten the time required for the positioning control.

DESCRIPTION OF EMBODIMENTS

A positioning controller according to embodiments of the present invention is described herein in detail with reference to the drawings. Note that the present invention is not to be limited to the embodiments.

First Embodiment

Figure 1:
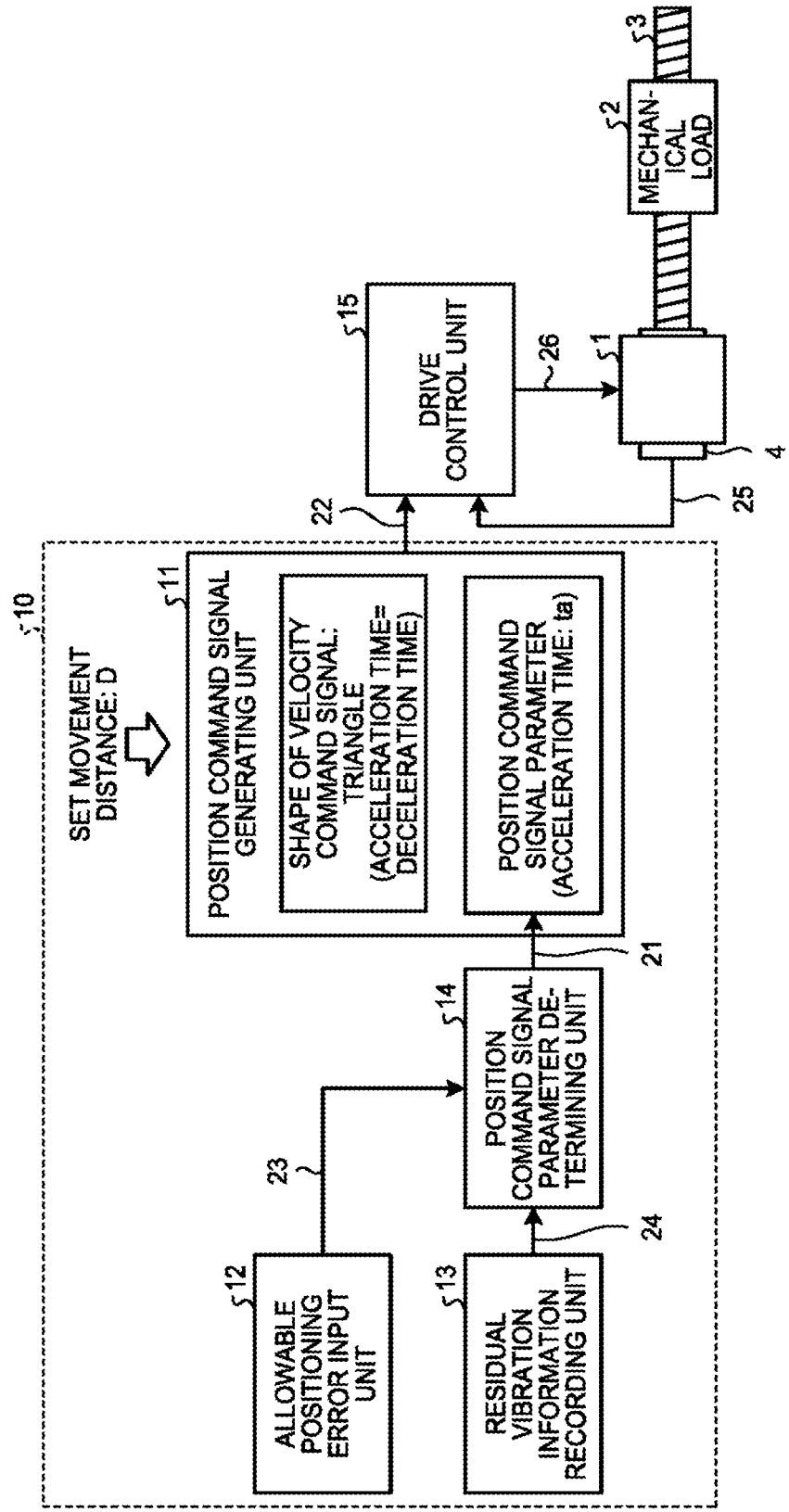
FIG. 1 is a block diagram of a positioning controller according to a first embodiment of the present invention.

FIG. 1 is a block diagram of a positioning controller according to a first embodiment of the present invention. A positioning controller 10 drives a motor 1 and a mechanical load 2, which is a control target, is moved over a set movement distance and positioned at a desired position. The motor 1 of FIG. 1 moves the mechanical load 2, which is the control target, by applying thereto a torque or thrust via a ball screw 3 or the like. The motor 1 can be any device capable of moving the mechanical load 2, such as a rotary servo motor, a linear motor, a stepping motor, or the like.

The ball screw 3 transforms the rotational motion of the motor 1 into a linear motion. The mechanical load 2 includes a ball screw nut (not illustrated) assembled to the ball screw 3 and it moves in the axial direction of the ball screw 3 due to the rotation of the motor 1. The mechanical load 2 can be, for example, a drive unit of an electronic-component mounting machine or semiconductor manufacturing equipment as well as being used with any drive unit that requires positioning control. The motor 1 includes a position sensor 4. The position sensor 4 detects the position of the motor 1 or the mechanical load 2 and outputs a detected position signal 25, which is a piece of position information on the motor 1 or the mechanical load 2, to a drive control unit 15, which is described later. A specific example of the position sensor 4 is a rotary encoder. The position sensor 4 described in the first embodiment detects the position of the motor 1, but it can also be adapted to detect the position of the mechanical load 2.

As illustrated in FIG. 1, the positioning controller 10 includes a position command signal generating unit 11, which generates a position command signal 22 for moving the mechanical load 2 over a set movement distance D and the drive control unit 15, which executes positioning control on the mechanical load 2 on the basis of the detected position signal 25 of the motor 1 or the mechanical load 2 and the position command signal 22. The positioning controller 10 further includes an allowable positioning error input unit 12 to which an allowable positioning error 23 is input, the allowable positioning error being the tolerance of the difference between the set movement distance D of the mechanical load 2 and the detected position of the mechanical load 2 upon completion of positioning control; a residual vibration information recording unit 13 that stores residual vibration information 24 including a residual vibration amplitude, which is the magnitude of residual vibration of the motor 1 or the mechanical load 2 generated at the time of performing positioning control using a plurality of the position command signals 22; and a position command signal parameter determining unit 14 that determines a position command signal parameter 21 for generating the position command signal 22 on the basis of the allowable positioning error 23 and a plurality of pieces of the residual vibration information 24 stored in the residual vibration information recording unit 13.

The position command signal generating unit 11 generates the position command signal 22, which is a command for performing positioning control, on the basis of the set movement distance D by which the motor 1 moves the mechanical load 2, and outputs the position command signal 22 to the drive control unit 15. The set movement distance D is externally input in advance by an operator.

Figure 2:
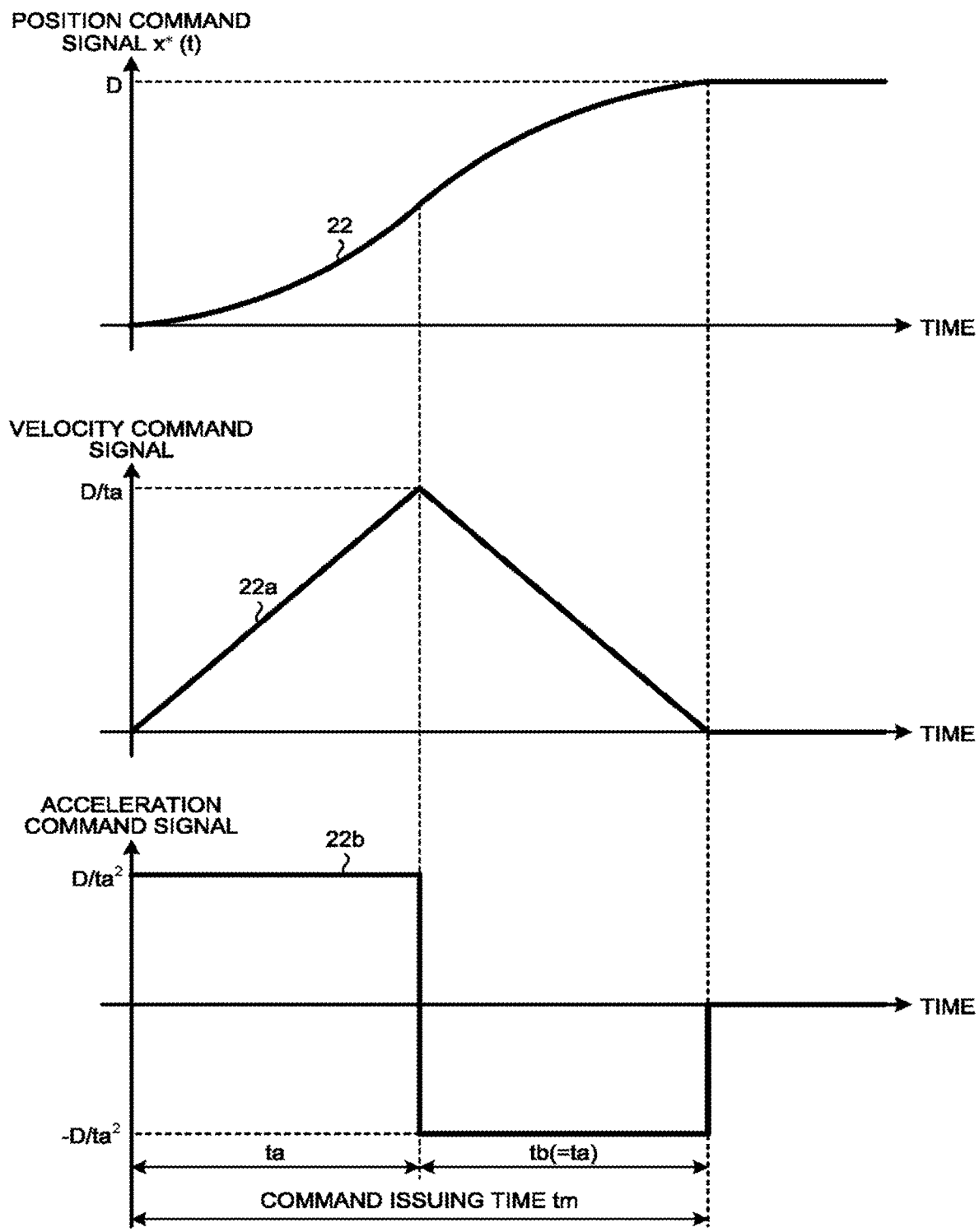
FIG. 2 is a set of graphs each illustrating a waveform of a command signal according to the first embodiment of the present invention.

FIG. 2 is a set of graphs each illustrating the waveform of a command signal according to the first embodiment. The upper graph of FIG. 2 represents the shape of the position command signal 22 used in the first embodiment; the middle graph represents the shape of a velocity command signal 22a, which is a first derivative of the position command signal 22; and the lower graph represents the shape of an acceleration command signal 22b, which is a second derivative of the position command signal 22. In the first embodiment, the velocity command signal 22a is the first derivative of the position command signal 22 and has a triangular shape with an acceleration time ta equal to a deceleration time tb. The velocity command signal 22a increases linearly during an accelerating operation and decelerates linearly during a decelerating operation.

Here, the acceleration time refers to the time it takes for the velocity command signal 22a to reach the maximum value from zero, and the deceleration time refers to the time it takes for the velocity command signal 22a to reach zero from the maximum value. The position command signal 22 is generated on the basis of the position command signal parameter 21, which is a parameter that determines the shape of the position command signal 22. The first embodiment uses the acceleration time ta in FIG. 2 as the position command signal parameter 21. A reference symbol D in FIG. 2 represents the set movement distance. In this case, with the use of the position command signal parameter ta, the acceleration of a target moving the set movement distance D during the acceleration time is expressed as $D/ta^2$. Moreover, because the acceleration time ta is equal to the deceleration time tb in the first embodiment, the acceleration during the deceleration time is expressed as $-D/ta^2$. Note that in the first embodiment, the position command signal 22, which is a command for performing positioning control, cannot be uniquely determined from just the set movement distance D and the information indicating the fact that the velocity command signal 22a has a triangular shape such that the acceleration time ta is equal to the deceleration time tb, but it can be uniquely determined by further specifying the position command signal parameter 21.

The allowable positioning error 23 is specified and input in advance to the allowable positioning error input unit 12, the allowable positioning error being the tolerance of the error between the target position of the mechanical load 2 when it is moved over the set movement distance D and the detected position of the mechanical load 2 at the end of positioning control. The allowable positioning error 23 is a value determined by the specifications on the positioning accuracy of the machine that has the mechanical load 2, and it is set to a low value when the positioning accuracy is to be further increased or set to a large value when such high accuracy is not required.

When a positioning operation over the set movement distance D is performed, it is determined that the positioning accuracy required for positioning control is satisfied when the motor 1 or the mechanical load 2 fluctuates or vibrates within the allowable positioning error 23. Positioning control is thus performed while allowing vibration within the allowable positioning error 23 instead of performing the positioning operation while completely suppressing vibration, whereby the positioning time can be shortened.

The allowable positioning error 23 is externally input in advance by the operator, and the allowable positioning error input unit 12 outputs the allowable positioning error 23, which is input thereto, to the position command signal parameter determining unit 14. Note that the tolerance of the residual vibration amplitude, which is the magnitude of the residual vibration of the motor 1 or the mechanical load 2, can also be used as the allowable positioning error 23.

The residual vibration information recording unit 13 uses a plurality of position command signals 22 having different position command parameter 21 in order to store the residual vibration information 24 in association with the residual vibration amplitude generated at the time of the execution of positioning control and the position command signal parameters 21 at the time of execution. The residual vibration information 24 on each of the plurality of the position command signal parameters 21 is stored.

The position command signal parameter determining unit 14 calculates the position command signal parameter 21 on the basis of the allowable positioning error 23 input to the allowable positioning error input unit 12 and the plurality of pieces of the residual vibration information 24 stored in the residual vibration information recording unit 13. Specifically, the position command signal parameter determining unit 14 interpolates the relation between the position command signal parameter 21 and the residual vibration amplitude included in the residual vibration information 24, thereby calculating and determining the position command signal parameter 21 for generating the position command signal 22 for which residual vibration amplitude falls within the allowable positioning error 23.

On the basis of the position command signal 22 output by the position command signal generating unit 11 and the detected position signal 25 detected by the position sensor 4, the drive control unit 15 supplies a drive current 26 to the motor 1 such that the detected position signal 25 follows the position command signal 22. Specifically, for example, the drive control unit 15 calculates, by performing PID control on the difference between the position command signal 22 and the detected position signal 2, a current value to be fed to the motor 1 so as to supply the calculated value as the drive current 26. In addition to this example, the drive control unit 15 can be configured in any way that allows the detected position signal 25 to follow the position command signal 22.

Figure 3:
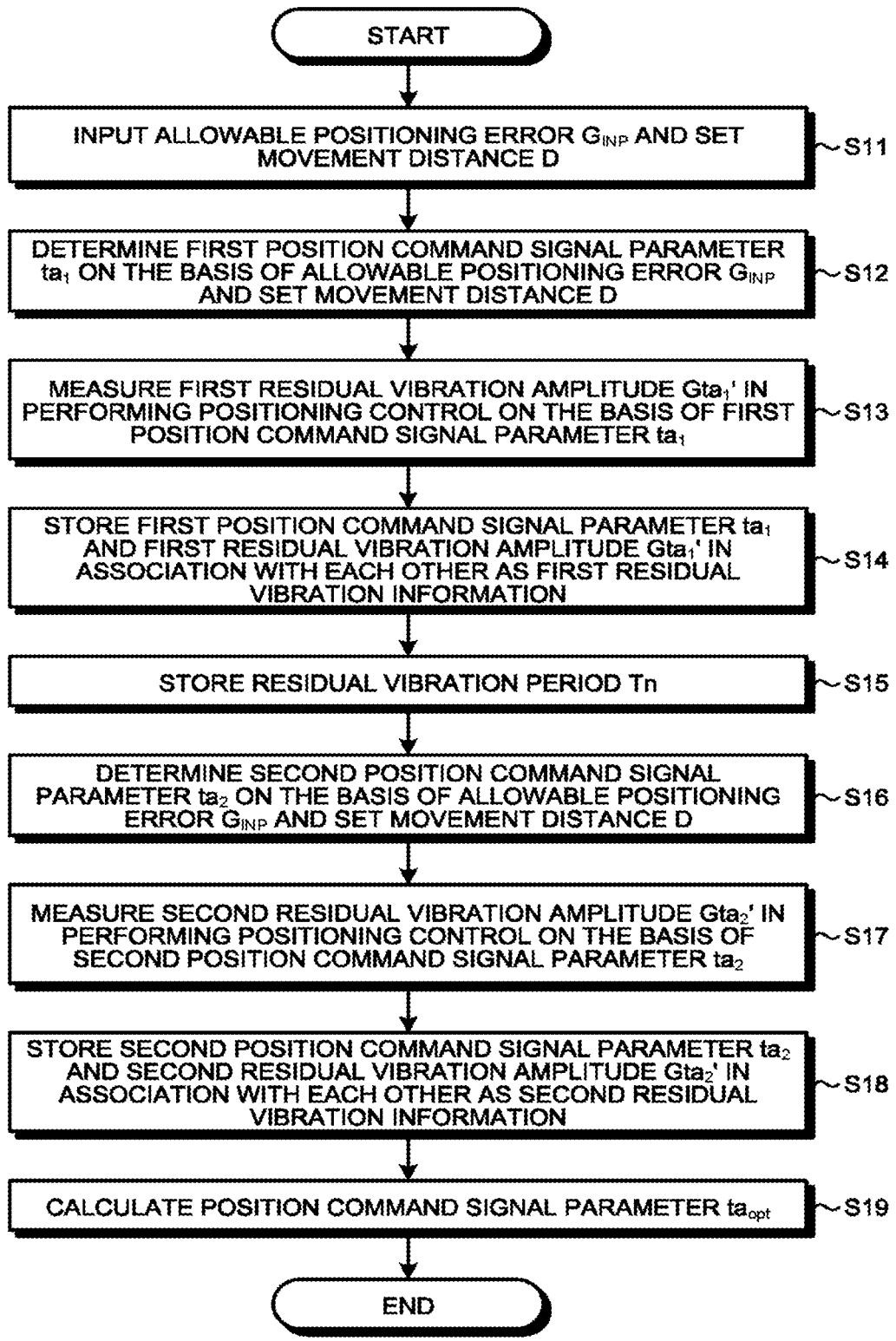
FIG. 3 is a flowchart illustrating operation procedures of the positioning controller according to the first embodiment of the present invention.

Next, the operation of the positioning controller 10 will be described. FIG. 3 is a flowchart illustrating operation procedures of the positioning controller according to the first embodiment. Here, the processing of the allowable positioning error input unit 12, the residual vibration information recording unit 13, and the position command signal parameter determining unit 14 will be particularly described in detail.

At step S11, an operator inputs a predetermined allowable positioning error $G_{INP}$ to the allowable positioning error input unit 12. The operator also inputs a predetermined set movement distance D to the position command signal generating unit 11. Here, the allowable positioning error $G_{INP}$ is the same as the allowable positioning error 23 described above. Alternatively, instead of inputting the allowable positioning error $G_{INP}$ and the set movement distance D as occasion demands, a storage unit can be configured to be in the allowable positioning error input unit 12 to store the allowable positioning error $G_{INP}$ and the set movement distance D in advance and thus the allowable positioning error $G_{INP}$ and the set movement distance D stored in the storage unit can be read during the procedure of step S11.

From steps S12 to S18, the residual vibration information recording unit 13 performs a preliminary operation for storing the residual vibration information 24 before performing actual positioning control.

Specifically, at step S12, a first position command signal parameter $ta_1$ for performing positioning control is determined. An example of the first position command signal parameter $ta_1$ is the position command signal parameter 21 for which residual vibration amplitude exceeds the allowable positioning error $G_{INP}$ (23). As a specific example, the first position command signal parameter is preferably set to the acceleration time of the position command signal 22 when the maximum torque that can be output by the motor 1 is used to move a target over the set movement distance D by accelerating and decelerating the total inertia of the motor 1 and the mechanical load 2, or it is set to the lowest value that can be set as the position command signal parameter 21. In either case, it is desirable to set the position command signal parameter 21 to a short time period so as to facilitate vibration excitation and to perform positioning control.

At step S13, the drive control unit 15 performs positioning control by using the position command signal 22 corresponding to the first position command signal parameter $ta_1$. The residual vibration information recording unit 13 also measures a first residual vibration amplitude $Gta_1'$ generated at this time. Here, a residual vibration amplitude $Gta'$ is an actual measured value of the maximum value of the residual vibration amplitude. At step S14, the residual vibration information recording unit 13 stores the first position command signal parameter $ta_1$ and the first residual vibration amplitude $Gta_1'$ in association with each other as first residual vibration information 24. At step S15, the residual vibration information recording unit 13 stores a period Tn [s] of the residual vibration corresponding to the first residual vibration amplitude $Gta_1'$.

At step S16, a second position command signal parameter $ta_2$ for performing positioning control is determined. An example of the second position command signal parameter $ta_2$ is the position command signal parameter 21 for which residual vibration amplitude is within the allowable positioning error $G_{INP}$ (23). As a specific example, the second position command signal parameter $ta_2$ can be set to the same value as the residual vibration period Tn. The residual vibration amplitude becomes the minimum in this case, which is described later in detail.

At step S17, the drive control unit 15 performs positioning control by using the position command signal 22 corresponding to the second position command signal parameter $ta_2$. The residual vibration information recording unit 13 also measures a second residual vibration amplitude $Gta_2'$ generated at this time. At step S18, the residual vibration information recording unit 13 stores the second position command signal parameter $ta_2$ and the second residual vibration amplitude $Gta_2'$ in association with each other as second residual vibration information 24.

At step S19, on the basis of the first residual vibration information 24 and the second residual vibration information 24 stored in the residual vibration information recording unit 13, the position command signal parameter determining unit 14 uses Expression 1 below to calculate a position command signal parameter $ta_{opt}$ for which residual vibration amplitude is within the allowable positioning error $G_{INP}$ (23) and, at the same time, allows the positioning time to be shortened.

$$ta_{opt} = \frac{G_{INP} - Gta_1'}{Gta_1' - Gta_2'}(ta_1 - ta_2) + ta_1 \qquad [\text{Expression 1}]$$

The position command signal parameter $ta_{opt}$ is calculated as described above by the processing illustrated in the flowchart of FIG. 3 and thus it is possible to suppress the residual vibration amplitude within the allowable positioning error $G_{INP}$ (23), the residual vibration amplitude being generated at the time of performing positioning control over the set movement distance. With the residual vibration amplitude falling within the allowable positioning error $G_{INP}$ (23), because the positioning accuracy required for positioning control is satisfied even when vibration remains, it is possible to obtain the position command signal parameter $ta_{opt}$ (21) for which positioning time can be shortened.

Next, an effect of the first embodiment will be described, or in other words an explanation will be given as to why the configuration illustrated in the block diagram of FIG. 1 and the processing illustrated in the flowchart of FIG. 3 can calculate and determine the position command signal parameter $ta_{opt}$ (21) for which the positioning time can be shortened.

First, as a background to the description, an analysis is made to clarify the relation between the position command signal parameter ta used in the first embodiment and the residual vibration amplitude. As described above, the velocity command signal 22a, which is the first derivative of the position command signal 22 used in the first embodiment has a triangular shape with the acceleration time ta equal to the deceleration time tb, as illustrated in FIG. 2. A Laplace transform representation X* (s) of a signal x* (t) with respect to time t of the position command signal 22 is expressed by the following Expression 2 on the basis of the position command signal parameter ta and the set movement distance D. Here, "s" represents a Laplace operator.

$$X^*(s) = \frac{1}{s^3} \frac{D}{ta^2} (1 - 2e^{-ta \cdot s} + e^{-2ta \cdot s})$$ [Expression 2]

However, where x (t) represents a response of the detected position signal with respect to time t when performing positioning control on the mechanical load 2 that is affected by the residual vibration, then a Laplace transform representation X (s) of x (t) can be approximated by the following Expression 3 while using a transfer characteristic of a secondary system representing a transfer characteristic pertaining to vibration and the Laplace transform representation X* (s) of the position command signal x* (t).

Symbols $\zeta$ and $\omega_n$ represent the damping ratio and the frequency of residual vibration [rad/s], respectively.

$$X(s) = \frac{\omega_n^2}{s^2 + 2\zeta\omega_n s + \omega_n^2} X^*(s)$$ [Expression 3]

By substituting Expression 2 into Expression 3 and performing an inverse Laplace transformation, the detected position signal x (t) is expressed by the following Expression 4 after the position command signal is initiated and reaches the set movement distance D.

$$X(t) = \left[\frac{D}{ta^2} Z_1 \sqrt{\{\beta + Z_2\alpha\}^2 + \{\alpha - Z_2\beta\}^2}\right]$$ [Expression 4]

$$e^{-\zeta\omega_n t} \sin(\omega_d t + \psi) + D$$

Note that $\alpha$, $\beta$, $\omega_d$, $Z_1$, $Z_2$, $\Psi$, and the like are expressed by the following Expressions 5 by using the position command signal parameter ta, the residual vibration frequency $\omega_n$, and the damping ratio $\zeta$.

$$\alpha = 1 - 2e^{\zeta\omega_n ta}\cos\omega_d(ta) + e^{2\zeta\omega_n ta}\cos\omega_d(2ta)$$ [Expression 5]
$$\beta = -2e^{\zeta\omega_n ta}\sin\omega_d(ta) + e^{\zeta\omega_n T_0}\sin\omega_d(2ta)$$

$$\omega_d = \sqrt{1-\zeta^2}\,\omega_n, \; Z_1 = \frac{1-4\zeta^2}{\omega_n^2}, \; Z_2 = \frac{3\zeta - 4\zeta^3}{(1-4\zeta^2)\sqrt{1-\zeta^2}}$$

$$\psi = \begin{cases} \pi - \arcsin\left(\frac{\{\alpha - Z_2\beta\}}{\sqrt{\{\beta + Z_2\alpha\}^2 + \{\alpha - Z_2\beta\}^2}}\right) & (\beta + Z_2\alpha < 0) \\ \arcsin\left(\frac{\{\alpha - Z_2\beta\}}{\sqrt{\{\beta + Z_2\alpha\}^2 + \{\alpha - Z_2\beta\}^2}}\right) & (\beta + Z_2\alpha \geq 0) \end{cases}$$

The result is that the detected position signal x (t) takes on a vibrational behavior centered on the set movement distance D and the amplitude is the value expressed in square brackets [ ] of Expression 4. An analytical value Gta of the maximum value of the residual vibration amplitude of the detected position signal x (t) when performing positioning control is expressed by the following Expression 6 by using the position command signal parameter ta, the set movement distance D, the residual vibration frequency $\omega_n$, and the damping ratio $\zeta$. The analytical value Gta of the maximum value of the residual vibration amplitude is hereinafter simply referred to as a residual vibration amplitude Gta.

$$Gta = \frac{D}{ta^2} Z_1 \sqrt{\{\beta + Z_2\alpha\}^2 + \{\alpha - Z_2\beta\}^2}$$ [Expression 6]

Figure 4:
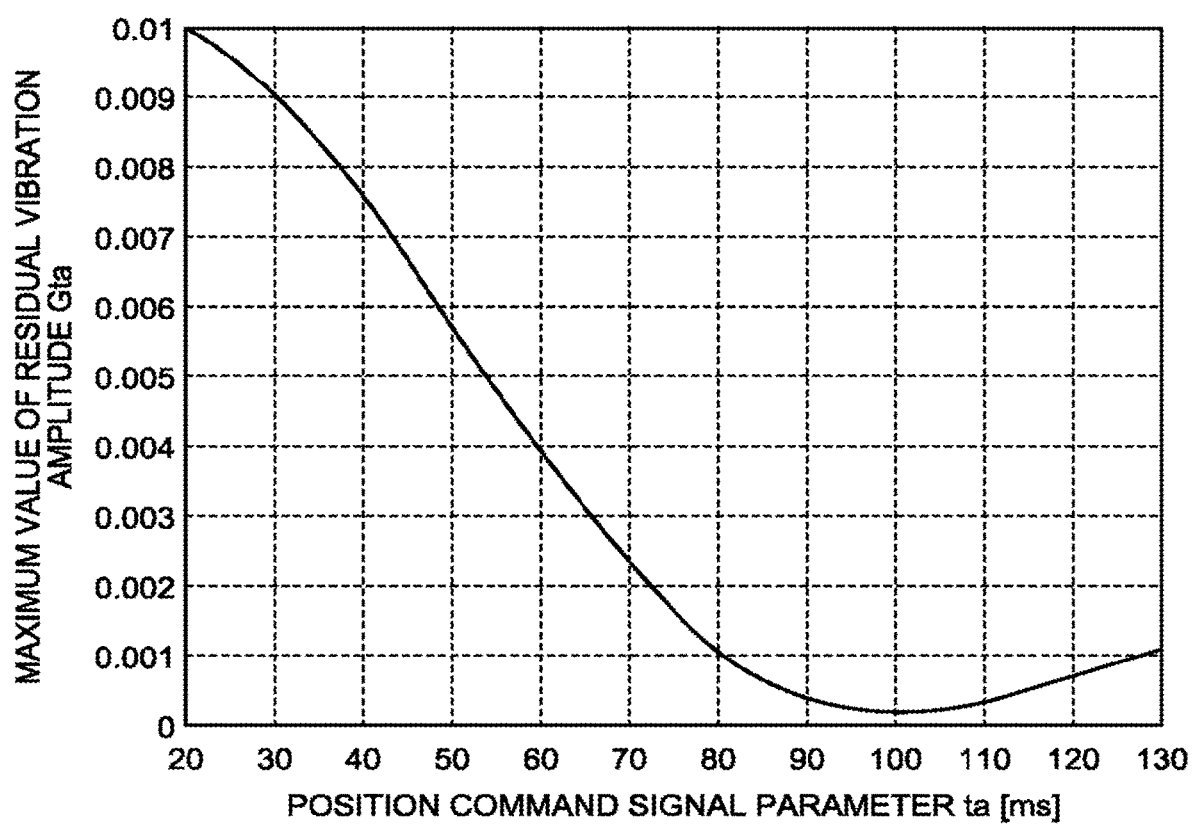
FIG. 4 is a graph illustrating the relation between a position command signal parameter and residual vibration amplitude according to the first embodiment of the present invention.

In order to understand the relation between the residual vibration amplitude Gta and the position command signal parameter ta, FIG. 4 illustrates the relation between the residual vibration amplitude Gta and the position command signal parameter ta when the residual vibration period Tn=100 ms ($\omega_n=2\pi$/Tn [rad/s]), the damping ratio $\zeta$=0.1, and the set movement distance D=10 mm are each substituted into the above Expression 6.

As illustrated in FIG. 4, the residual vibration is minimum when the position command signal parameter ta is equal to the residual vibration period of 100 ms or when ta=Tn. In the range of the position command signal parameter ta≤the residual vibration period Tn, there is a characteristic monotonic decrease of the residual vibration amplitude as the position command signal parameter ta increases. Although FIG. 4 illustrates the example with the residual vibration period Tn=100 ms, the damping ratio $\zeta$=0.1, and the set movement distance D=10 mm, this characteristic relation between the position command signal parameter and the residual vibration amplitude is widely established regardless of the values of the residual vibration period, the damping ratio, and the set movement distance.

The residual vibration amplitude Gta can be theoretically calculated by Expression 6, but an actual positioning controller is affected by various factors such as the gain value of the drive control unit 15 and viscous friction between the motor 1 and the machine, whereby the residual vibration amplitude Gta, which is the analytical value theoretically calculated by Expression 6, does not completely correspond quantitatively with the residual vibration amplitude Gta', which is the actual measured value obtained when performing actual positioning control.

However, the aforementioned tendency of the change in the residual vibration amplitude with respect to the position command signal parameter ta, namely the characteristic where the residual vibration amplitude decreases monotonically as the position command signal parameter ta increases, holds true not only for the theoretical analysis but also for the actual measured value of the residual vibration amplitude and the position command signal parameter 21.

In the first embodiment, the position command signal parameter 21 corresponds to the acceleration time ta of the position command signal 22. Because acceleration time ta is equal to the deceleration time tb of the position command signal 22 in the first embodiment, a decrease in the position command signal parameter ta causes a reduction in both the acceleration time ta and the deceleration time tb of the position command signal 22, thereby shortening a command issuing time tm (FIG. 2), which is the time it takes for the command to reach a target position from the start of positioning. The positioning time can thus be shortened when a decrease in the position command signal parameter ta does not cause the residual vibration amplitude to exceed the allowable positioning error 23.

An increase in the position command signal parameter ta causes the residual vibration amplitude Gta' to decrease monotonically in the actual measured value. This characteristic can be used to obtain the position command signal parameter 21 for which residual vibration amplitude matches the allowable positioning error 23. Positioning control using the position command signal parameter 21 can achieve the objective of shortening the positioning time as much as possible while suppressing the residual vibration amplitude within the allowable positioning error 23.

The residual vibration information recording unit 13 stores a plurality of pieces of the residual vibration information 24 while associating the residual vibration amplitude Gta', which is measured when positioning control on the basis of the position command signal parameter ta is performed, with the corresponding position command signal parameter ta.

Therefore, with the use of the characteristic where the residual vibration amplitude Gta' decreases monotonically as the position command signal parameter ta increases, it is easy to calculate and determine the position command signal parameter 21 for which residual vibration amplitude matches the allowable positioning error 23 from the plurality of pieces of the residual vibration information 24 stored in the residual vibration information recording unit 13.

Specifically, the plurality of pieces of the residual vibration information 24 is used to obtain an interpolation function representing the relation between the position command signal parameter ta and the residual vibration amplitude Gta', and this interpolation function is then used to calculate the position command signal parameter 21 for which the residual vibration amplitude Gta' matches the allowable positioning error 23. The interpolation function can be any function that expresses the characteristic where the residual vibration amplitude decreases monotonically as the position command signal parameter 21 increases, a specific example being a function such as linear interpolation.

A linear interpolation function expressing the relation between the position command signal parameter ta and the residual vibration amplitude Gta' is expressed by the following Expression 7, in which two pieces of the residual vibration information 24 can be used as the plurality of pieces of the residual vibration information 24 as in the first embodiment, the two pieces of the residual vibration information being the first residual vibration amplitude $Gta_1'$, which is the maximum value of the residual vibration amplitude measured when positioning control is performed by using the first position command signal parameter $ta_1$, and the second residual vibration amplitude $Gta_2'$, which is the maximum value of the residual vibration amplitude measured when positioning control is performed by using the second position command signal parameter $ta_2$.

$$ta = \frac{Gta' - Gta_1'}{Gta_1' - Gta_2'}(ta_1 - ta_2) + ta_1 \qquad \text{[Expression 7]}$$

Consequently, the position command signal parameter $ta_{opt}$ for which the residual vibration amplitude matches the allowable positioning error $G_{INP}$ can be calculated by substituting $G_{INP}$ for Gta' in Expression 7, which is expressed by Expression 1 above.

The processing from steps S12 to S14 in the flowchart of FIG. 3 corresponds to the processing performed by the residual vibration information recording unit 13 in order to obtain the first position command signal parameter $ta_1$ and the first residual vibration amplitude $Gta_1'$ used to calculate the position command signal parameter 21 for which the residual vibration amplitude matches the allowable positioning error 23.

The processing from steps S16 to S18 in the flowchart of FIG. 3 corresponds to the processing performed by the residual vibration information recording unit 13 in order to obtain the second position command signal parameter $ta_2$ and the second residual vibration amplitude $Gta_2'$ used to calculate the position command signal parameter 21 for which residual vibration amplitude matches the allowable positioning error 23.

The processing of step S19 in the flowchart of FIG. 3 corresponds to the processing performed by the position command signal parameter determining unit 14 in order to calculate and determine the position command signal parameter $ta_{opt}$ for which the residual vibration amplitude matches the allowable positioning error $G_{INP}$.

Moreover, in order to calculate the position command signal parameter $ta_{opt}$ for which the residual vibration amplitude matches the allowable positioning error $G_{INP}$, the linear interpolation expressed by Expression 1 above uses, as the two pieces of the residual vibration information 24, the first position command signal parameter $ta_1$ for which the first residual vibration amplitude $Gta_1'$ exceeds the allowable positioning error 23 and the second position command signal parameter $ta_2$ for which the second residual vibration amplitude $Gta_2'$ is less than the allowable positioning error 23. These first and second position command signal parameters $ta_1$ and $ta_2$ are used so as to be able to calculate the position command signal parameter 21 more accurately. The reason for this will now be explained.

When the first position command signal parameter $ta_1$ for which the first residual vibration amplitude $Gta_1'$ exceeds the allowable positioning error $G_{INP}$ and the second position command signal parameter $ta_2$ for which the second residual vibration amplitude $Gta_2'$ is less than the allowable positioning error $G_{INP}$ are known, the position command signal parameter 21 for which residual vibration amplitude matches the allowable positioning error $G_{INP}$ falls between $ta_1$ and $ta_2$ due to the characteristic where the residual vibration amplitude decreases monotonically as the position command signal parameter 21 increases.

Consequently, the position command signal parameter 21 between $ta_1$ and $ta_2$ can be more accurately calculated by using the linear interpolation function so that the residual vibration amplitude matches the allowable positioning error 23.

At step S14 of the flowchart in FIG. 3 according to the first embodiment, the residual vibration information recording unit 13 stores, as the residual vibration information 24, the position command signal parameter 21 for which residual vibration amplitude exceeds the allowable positioning error 23 and the residual vibration amplitude corresponding to the position command signal parameter 21. At step S18, the residual vibration information recording unit 13 further stores, as the residual vibration information 24, the position command signal parameter 21 for which the residual vibration amplitude is less than the allowable positioning error 23 and the residual vibration amplitude corresponding to the position command signal parameter 21. On the basis of these pieces of information, the position command signal parameter 21 for which the residual vibration amplitude matches the allowable positioning error 23 is calculated at step S19, and thus the position command signal parameter 21 capable of shortening the positioning time can be calculated accurately.

According to the first embodiment as described above, the positioning time can be shortened by determining the position command signal parameter 21 for which the residual vibration amplitude being generated is within the allowable positioning error 23. Moreover, the residual vibration information recording unit 13 of the first embodiment uses, as the two pieces of the residual vibration information 24, the first position command signal parameter $ta_1$ for which first residual vibration amplitude $Gta_1'$ exceeds the allowable positioning error 23 and the second position command signal parameter $ta_2$ for which second residual vibration amplitude $Gta_2'$ is less than the allowable positioning error 23, thereby calculating the position command signal parameter 21 more accurately.

The residual vibration information recording unit 13 of the first embodiment stores the residual vibration information for the smallest residual vibration amplitude Gta as the second residual vibration information 24 and thus it is possible to calculate the position command signal parameter 21 more accurately and shorten the positioning time.

In the first embodiment, the relation between the position command signal parameter ta and the residual vibration amplitude Gta' being generated is interpolated on the basis of the residual vibration information 24, whereby the position command signal parameter 21 for which the residual vibration amplitude matches the allowable positioning error 23 can be calculated easily. Although the first embodiment employs linear interpolation as a method of interpolating the relation between the position command signal parameter ta and the residual vibration amplitude Gta', it is possible to use any interpolation method using the monotonically decreasing characteristic such as polynomial interpolation, or it is possible to use interpolation using a trigonometric function that has a monotonically decreasing characteristic.

Although the first embodiment has described the configuration and an effect that uses the acceleration time ta of the position command signal 22 as the position command signal parameter 21, the deceleration time tb of the position command signal 22 can also be used as the position command signal parameter 21 by itself for the same effect. This is because the command signal illustrated in FIG. 2 has the acceleration time ta equal to the deceleration time tb.

The position command signal generating unit 11 of the first embodiment generates the position command signal 22 such that the velocity command signal 22a, which is the first derivative of the position command signal 22, has a triangular shape with the acceleration time ta equal to the deceleration time tb, whereby a decrease in the position command signal parameter ta causes a reduction in both the acceleration time ta and the deceleration time tb of the position command signal 22, and thus shortens the command issuing time tm, which is the time it takes for the command to reach the target position from the start of positioning. The positioning time can thus be shortened when the decrease in the position command signal parameter ta does not cause the residual vibration amplitude to exceed the allowable positioning error 23.

The first embodiment uses the acceleration time ta of the position command signal 22 as the position command signal parameter 21 so that the position command signal is easily generated such that the velocity command signal 22a, which is the first derivative of the position command signal 22, has a triangular shape with the acceleration time ta equal to the deceleration time tb.

In the first embodiment, the residual vibration information 24 is obtained with the position command signal parameter 21 in which the acceleration time ta of the position command signal 22 corresponds to the residual vibration period, and thus the second residual vibration information 24 in which the residual vibration amplitude is less than the allowable positioning error 23 can be obtained.

Second Embodiment

A second embodiment of the present invention will now be described. In the first embodiment a description is given of a configuration in which the position command signal 22 is used, the first derivative of which is the velocity command signal 22a, which has a triangular shape with the acceleration time ta equal to the deceleration time tb. However, it is also possible to use a different command signal.
The second embodiment describes an example of using a command signal having different shape.

Figure 5:
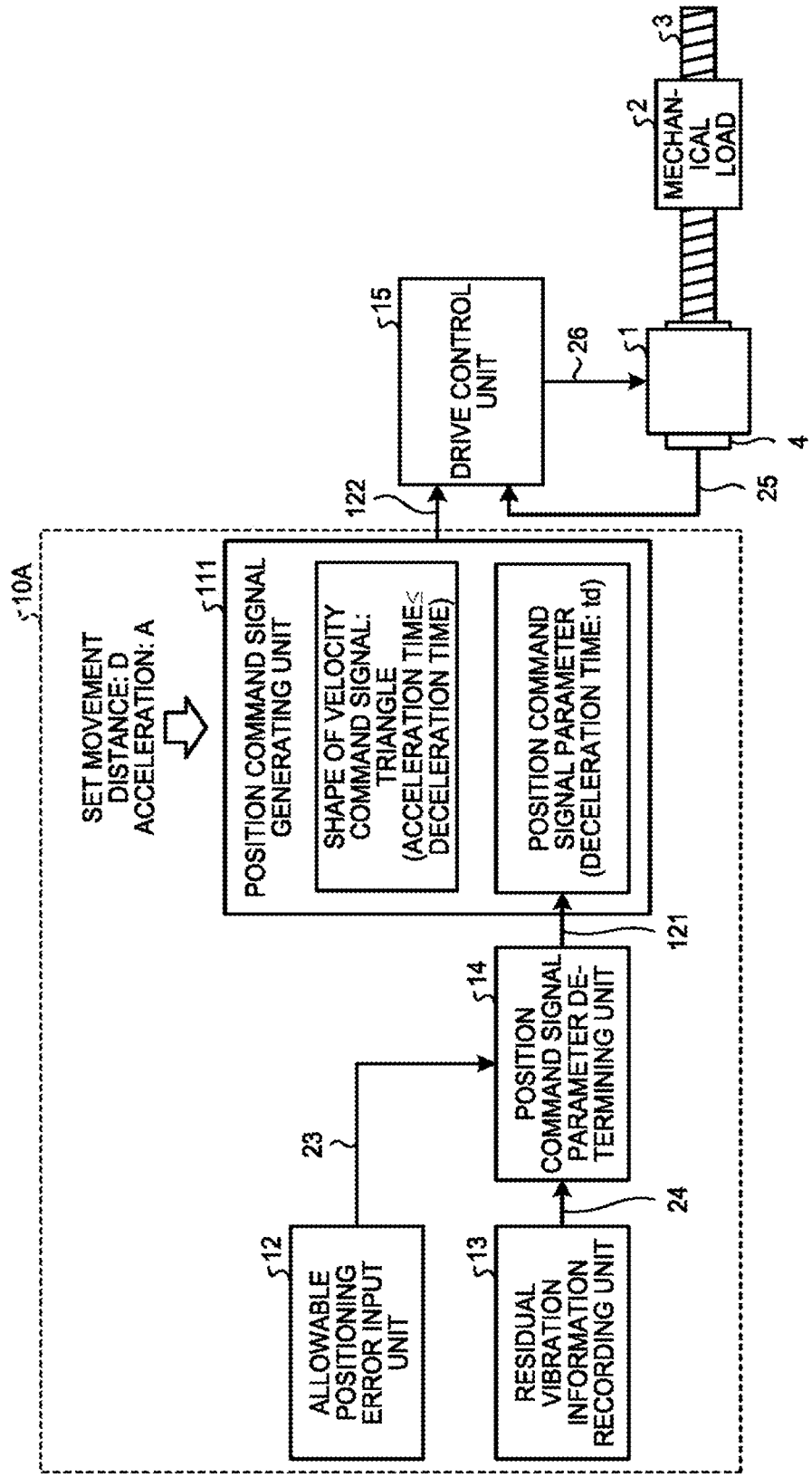
FIG. 5 is a block diagram of a positioning controller according to a second embodiment of the present invention.

FIG. 5 is a block diagram illustrating a positioning controller according to the second embodiment of the present invention. A positioning controller 10A of the second embodiment includes a position command signal generating unit 111 configured differently from that of the first embodiment. The details that are common with the positioning controller 10 of the first embodiment will be denoted by the same reference numerals and are not described in detail, and only differences between the embodiments will be described.

The positioning controller 10A includes the position command signal generating unit 111 as illustrated in FIG. 5. The position command signal generating unit 111 generates a position command signal 122 and outputs it to a drive control unit 15, the position command signal being generated on the basis of a set movement distance D externally input and acceleration A during an accelerating operation of an acceleration command signal 122b (FIG. 6), which is a second derivative of the position command signal 122.

Figure 6:
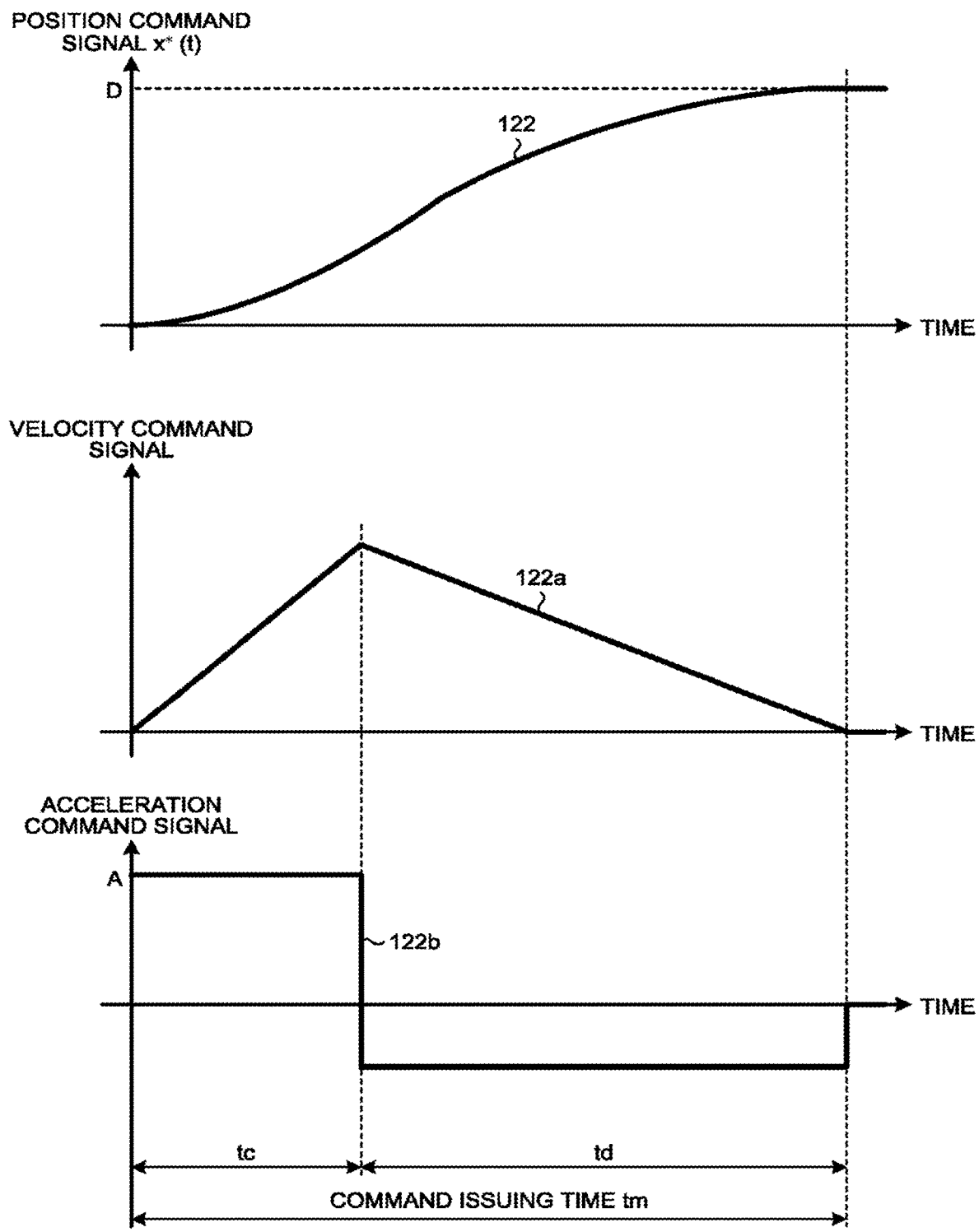
FIG. 6 is a set of graphs each illustrating the waveform of a command signal according to the second embodiment of the present invention.

FIG. 6 is a set of graphs each illustrating a waveform of a command signal according to the second embodiment. The upper graph of FIG. 6 represents the shape of the position command signal 122 used in the second embodiment; the middle graph represents the shape of a velocity command signal 122a, which is a first derivative of the position command signal 122; and the lower graph represents the shape of the acceleration command signal 122b, which is the second derivative of the position command signal 122. In the second embodiment, the velocity command signal 122a is the first derivative of the position command signal 122 and has a triangular shape with an acceleration time tc shorter than or equal to a deceleration time td. The velocity command signal 122a increases linearly during an accelerating operation and decelerates linearly during a decelerating operation. The position command signal 122 is generated on the basis of a position command signal parameter 121, which is a parameter determining the shape of the position command signal 122. The second embodiment uses the deceleration time td in FIG. 6 as the position command signal parameter 121. Moreover, a reference character D in FIG. 6 represents the set movement distance, and a reference character A represents the acceleration during the accelerating operation. Note that in the second embodiment, the position command signal 122, which is a command for performing positioning control, cannot be uniquely determined from just the set movement distance D, the acceleration A during the accelerating operation, and the information indicating the fact that the velocity command signal 122a has a triangular shape with the acceleration time tc shorter than or equal to the deceleration time td; however, it can be uniquely determined by further specifying the position command signal parameter 121.

Figure 7:
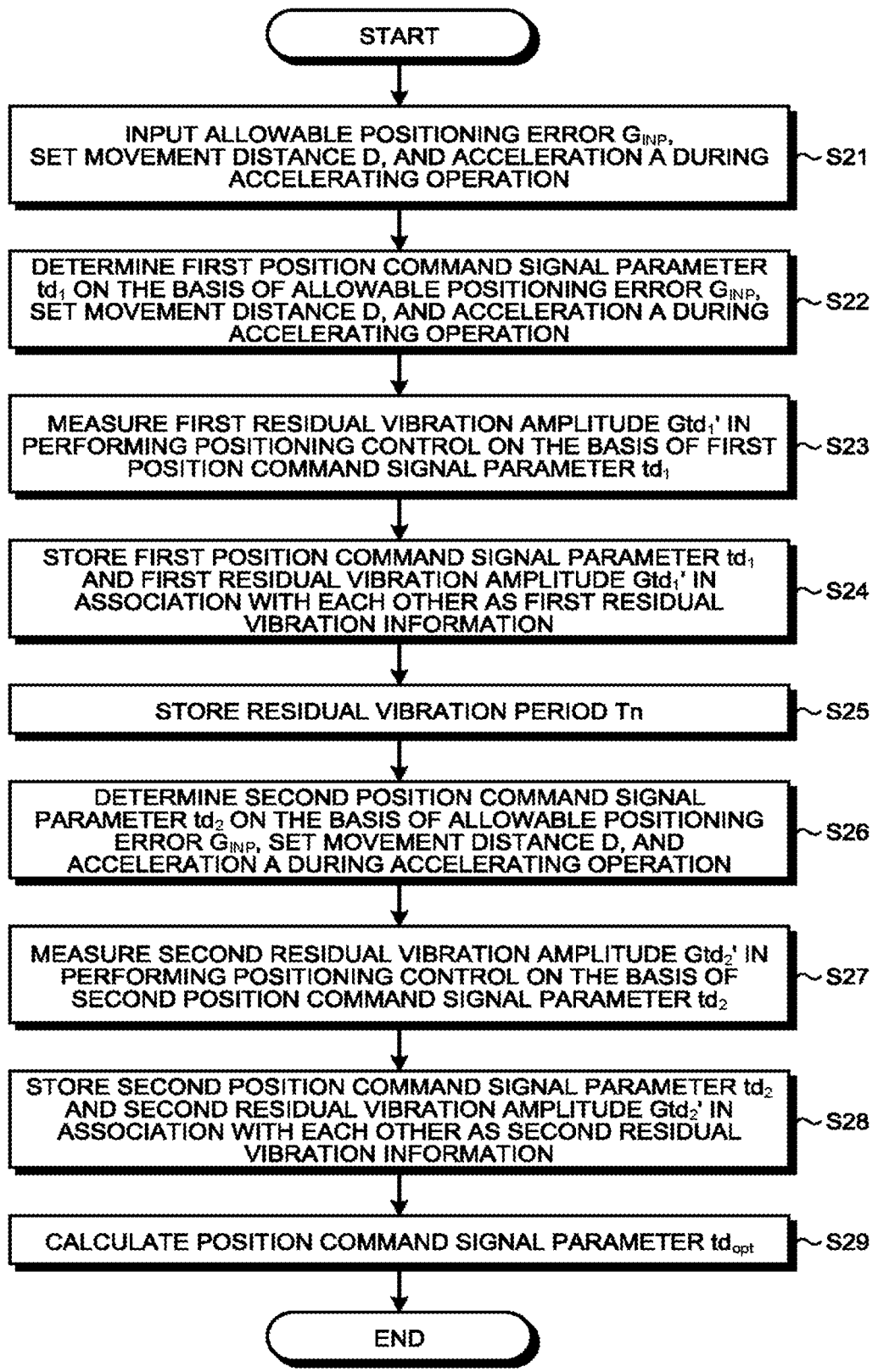
FIG. 7 is a flowchart illustrating operation procedures of the positioning controller according to the second embodiment of the present invention.

FIG. 7 is a flowchart illustrating operation procedures of the positioning controller according to the second embodiment. At step S21, an operator inputs a predetermined allowable positioning error $G_{INP}$ to an allowable positioning error input unit 12. The operator further inputs, to the position command signal generating unit 111, the predetermined set movement distance D and the acceleration A during the accelerating operation of the acceleration command signal 122b.

At step S22, a first position command signal parameter $td_1$ for positioning control is determined. As with the first embodiment, an example of the first position command signal parameter $td_1$ is the position command signal parameter 121 for which a residual vibration amplitude exceeds the allowable positioning error $G_{INP}$ (23). Specifically, the parameter can be the deceleration time of the position command signal when the acceleration time tc is set equal to the deceleration time td or when the deceleration time td is set as short as possible. It is also preferable to set the parameter to the lowest value that can be set as the position command signal parameter 121. In either case, it is desirable to set the position command signal parameter 121 short so as to facilitate vibration excitation and perform positioning control.

At step S23, the drive control unit 15 performs positioning control by using the position command signal 122 corresponding to the first position command signal parameter $td_1$. Moreover, a residual vibration information recording unit 13 measures a first residual vibration amplitude $Gtd_1'$ generated at this time. A residual vibration amplitude Gtd' is an actual measured value of the maximum value of the residual vibration amplitude. At step S24, the residual vibration information recording unit 13 stores the first position command signal parameter $td_1$ and the first residual vibration amplitude $Gtd_1'$ in association with each other as first residual vibration information 24. At step S25, the residual vibration information recording unit 13 stores a period Tn [s] of the residual vibration corresponding to the first residual vibration amplitude $Gtd_1'$.

At step S26, a second position command signal parameter $td_2$ for positioning control is determined. An example of the second position command signal parameter $td_2$ is the position command signal parameter 121 for which the residual vibration amplitude is within the allowable positioning error $G_{INP}$ (23). As a specific example, the second position command signal parameter $td_2$ can be set to the same value as the residual vibration period Tn.

At step S27, the drive control unit 15 performs positioning control by using the position command signal 122 corresponding to the second position command signal parameter $td_2$. The residual vibration information recording unit 13 also measures a second residual vibration amplitude $Gtd_2'$ generated at this time. At step S28, the residual vibration information recording unit 13 stores the second position command signal parameter $td_2$ and the second residual vibration amplitude $Gtd_2'$ in association with each other as second residual vibration information 24. At step S29, on the basis of the first residual vibration information 24 and the second residual vibration information 24 stored in the residual vibration information recording unit 13, a position command signal parameter determining unit 14 uses Expression 8 below to calculate a position command signal parameter $td_{opt}$ for which residual vibration amplitude is within the allowable positioning error $G_{INP}$ (23) and, at the same time, allows the positioning time to be shortened.

$$td_{opt} = \frac{G_{INP} - Gtd_1'}{Gtd_1' - Gtd_2'}(td_1 - td_2) + td_1 \quad \text{[Expression 8]}$$

The position command signal parameter $td_{opt}$ is calculated as described above by the processing illustrated in the flowchart of FIG. 7 and thus it is possible to suppress the residual vibration amplitude within the allowable positioning error $G_{INP}$ (23), the residual vibration amplitude being generated when performing positioning control over the set movement distance. Because the residual vibration amplitude falls within the allowable positioning error $G_{INP}$ (23), the positioning accuracy required for positioning control is satisfied even when vibration remains so it is possible to obtain the position command signal parameter $td_{opt}$ (121) for which positioning time can be shortened.

Effects of the second embodiment will now be described. First, an analysis is made to clarify the relation between the position command signal parameter td used in the second embodiment and the residual vibration amplitude. As described above, the velocity command signal 122a, which is the first derivative of the position command signal 122 and is used in the second embodiment, has a triangular shape with the acceleration time tc having a value less than or equal to the deceleration time td, as illustrated in FIG. 6. A Laplace transform representation X* (s) of a signal x* (t) with respect to time t of the position command signal 122 is expressed by the following Expression 9 on the basis of the position command signal parameter td, the set movement distance D, and the acceleration A during the accelerating operation. Here, "s" represents a Laplace operator.

$$X^*(s) = \frac{A}{s^3}\left(1 - \frac{2}{2-p^2}e^{-\frac{p^2}{2-p^2}td \cdot s} + \frac{p^2}{2-p^2}e^{-\frac{2}{2-p^2}td \cdot s}\right) \quad \text{[Expression 9]}$$

In this case, "p" is expressed by the following Expression 10 using the position command signal parameter td, the set movement distance D, and the acceleration A during the accelerating operation.

$$p = -\sqrt{\frac{A}{4D}}\,td + \sqrt{\frac{A}{4D}td^2 - 2} \quad \text{[Expression 10]}$$

The relation between a detected position signal x (t) and the position command signal x* (t) at the time of performing positioning control on a mechanical load 2 affected by the residual vibration can be approximated by Expression 4 as described in the first embodiment; and, by substituting Expression 9 into Expression 4 and executing an inverse Laplace transformation, the detected position signal x (t) is expressed by the following Expression 11 after the position command signal is initiated and reaches the set movement distance D.

$$x(t) = \left[ AZ_1 \sqrt{\{\beta + Z_2\alpha\}^2 + \{\alpha - Z_2\beta\}^2} \right] e^{-\zeta\omega_n t} \sin(\omega_d t + \psi) + D \quad \text{[Expression 11]}$$

Note that $\alpha$, $\beta$, $\omega_d$, $Z_1$, $Z_2$, $\Psi$, and the like are expressed by the following Expressions 12 by using the position command signal parameter td, a residual vibration frequency $\omega_n$, and a damping ratio $\zeta$.

$$\alpha = 1 - \frac{2}{2-p^2} e^{\zeta\omega_p \frac{p^2}{2-p^2} td} \cos\omega_d\left(\frac{p^2}{2-p^2} td\right) + \frac{p^2}{2-p^2} e^{\zeta\omega_p \frac{2}{2-p^2} td} \cos\omega_d\left(\frac{2}{2-p^2} td\right)$$

$$\beta = -\frac{2}{2-p^2} e^{\zeta\omega_p \frac{p^2}{2-p^2} td} \sin\omega_d\left(\frac{p^2}{2-p^2} td\right) + \frac{p^2}{2-p^2} e^{2\zeta\omega_p \frac{2}{2-p^2} td} \sin\omega_d\left(\frac{2}{2-p^2} td\right)$$

$$\omega_d = \sqrt{1-\zeta^2}\,\omega_n,\; Z_1 = \frac{1-4\zeta^2}{\omega_n^2},\; Z_2 = \frac{3\zeta - 4\zeta^2}{(1-4\zeta^2)\sqrt{1-\zeta^2}}$$

$$\psi = \begin{cases} \pi - \arcsin\left(\dfrac{\{\alpha - Z_2\beta\}}{\sqrt{\{\beta + Z_2\alpha\}^2 + \{\alpha - Z_2\beta\}^2}}\right) & (\beta + Z_2\alpha < 0) \\ \arcsin\left(\dfrac{\{\alpha - Z_2\beta\}}{\sqrt{\{\beta + Z_2\alpha\}^2 + \{\alpha - Z_2\beta\}^2}}\right) & (\beta + Z_2\alpha \geq 0) \end{cases}$$

[Expression 12]

The result is that the detected position signal x (t) takes on a vibrational behavior centered on the set movement distance D and with the amplitude being the value expressed in square brackets [ ] of Expression 11. An analytical value Gtd of the maximum value of the residual vibration amplitude of the detected position signal x (t) in performing positioning control is expressed by the following Expression 13 by using the position command signal parameter td, the set movement distance D, the acceleration A during the accelerating operation, the residual vibration frequency $\omega_n$, and the damping ratio $\zeta$. The analytical value Gtd of the maximum value of the residual vibration amplitude is hereinafter simply referred to as a residual vibration amplitude Gtd.

$$Gtd = AZ_1 \sqrt{\{\beta + Z_2\alpha\}^2 + \{\alpha - Z_2\beta\}^2} \quad \text{[Expression 13]}$$

Figure 8:
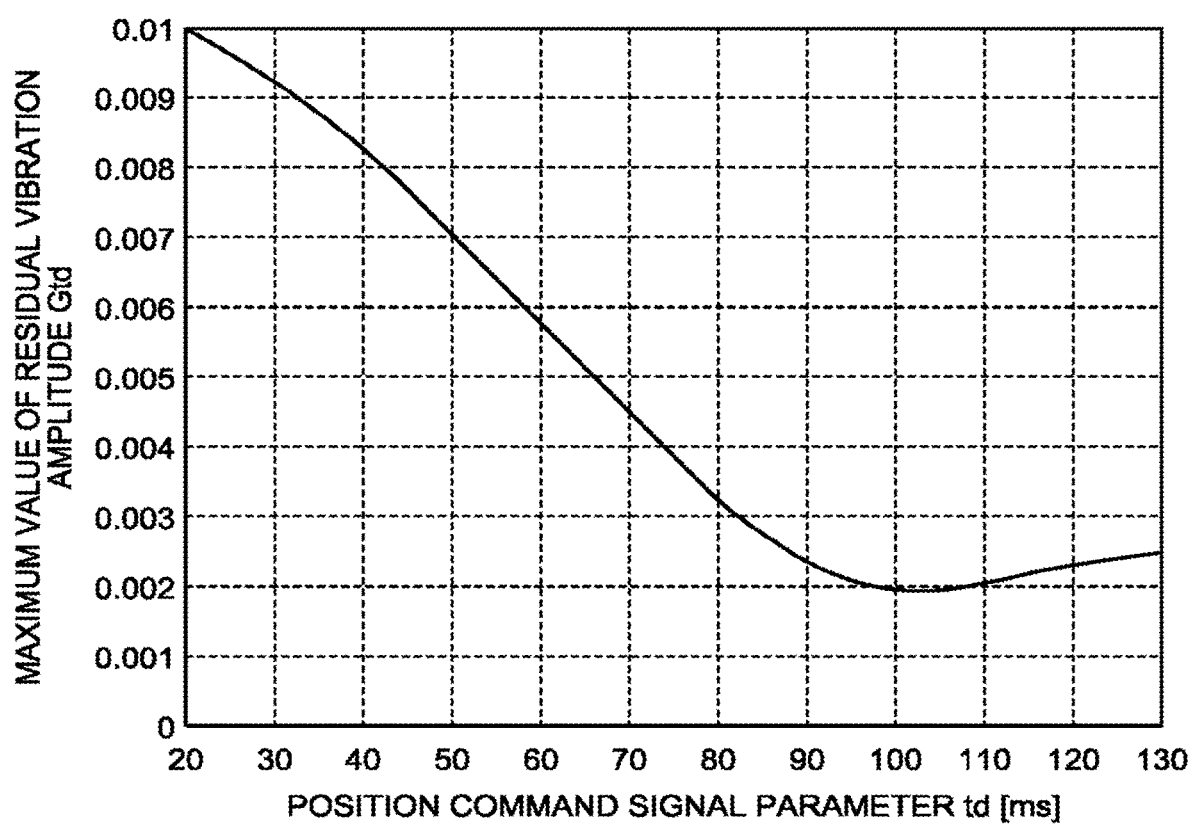
FIG. 8 is a graph illustrating the relation between a position command signal parameter and residual vibration amplitude according to the second embodiment of the present invention.

In order to understand the relation between the residual vibration amplitude Gtd and the position command signal parameter td, FIG. 8 illustrates the relation between the residual vibration amplitude Gtd and the position command signal parameter td when the residual vibration period Tn=100 ms ($\omega_n=2\pi/\text{Tn}$ [rad/s]), the damping ratio $\zeta=0.1$, the set movement distance D=10 mm, and the acceleration A=3.0 G during the accelerating operation are substituted into the above Expression 13.

As illustrated in FIG. 8, the second embodiment is also adapted such that the residual vibration is minimum when the position command signal parameter td is equal to the residual vibration period of 100 ms or when td=Tn. In the range of the position command signal parameter td≤the residual vibration period Tn, the residual vibration amplitude decreases monotonically as the position command signal parameter td increases. Although FIG. 8 illustrates an example with the residual vibration period Tn=100 ms ($\omega_n=2\pi/\text{Tn}$ [rad/s]), the damping ratio $\zeta=0.1$, the set movement distance D=10 mm, and the acceleration A=3.0 G during the accelerating operation, the relation between the position command signal parameter and the residual vibration amplitude is a characteristic that is widely established as being independent from the values of the residual vibration period, the damping ratio, the set movement distance, and the acceleration during the accelerating operation. The characteristic where the residual vibration amplitude decreases monotonically as the position command signal parameter td increases when using the position command signal 122 of the second embodiment as described above also holds true for actual measured values due to a reason similar to that according to the first embodiment.

Figure 9:
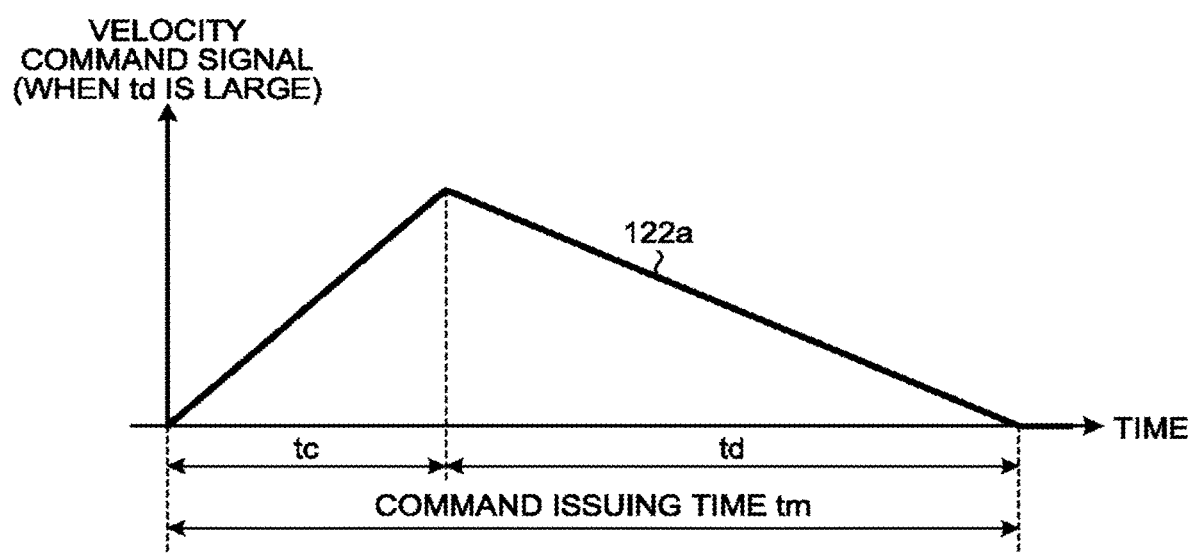
FIG. 9 is a graph illustrating the relation between the position command signal parameter and command issuing time of a command signal according to the second embodiment of the present invention.
Figure 10:
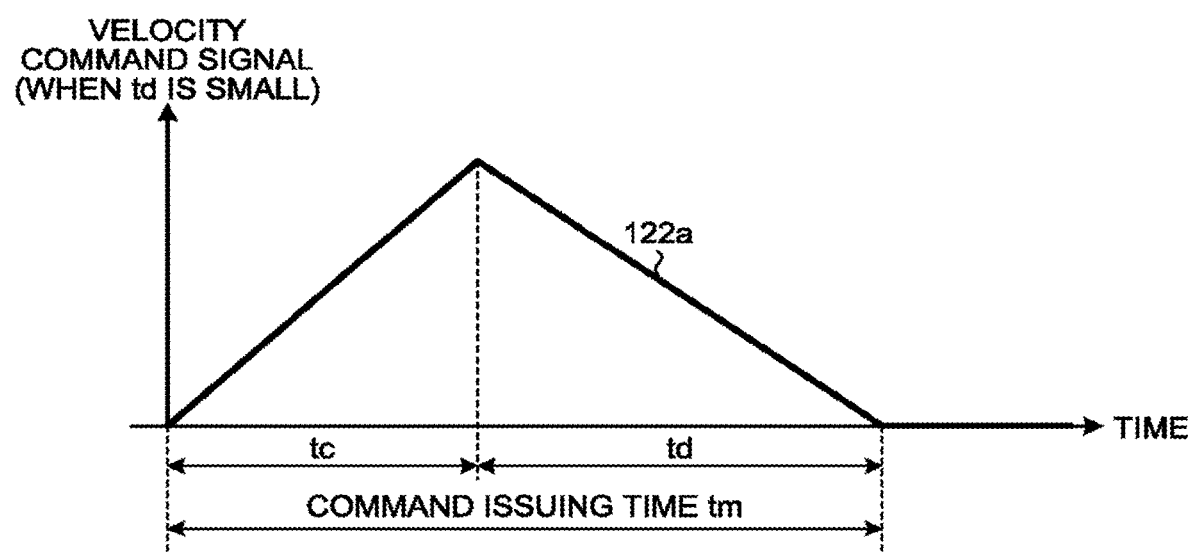
FIG. 10 is a graph illustrating another relation between the position command signal parameter and command issuing time of the command signal according to the second embodiment of the present invention.

In the second embodiment, the position command signal parameter 121 corresponds to the deceleration time td of the position command signal 122. FIG. 9 illustrates a change in the velocity command signal when the position command signal parameter td is large, and FIG. 10 illustrates a change in the velocity command signal when the position command signal parameter td is small. As illustrated in FIGS. 9 and 10, a decrease in the position command signal parameter td causes a reduction in the deceleration time of the command signal, thereby shortening the command issuing time tm.

The positioning time can thus be shortened when the decrease in the position command signal parameter td does not cause the residual vibration amplitude to exceed the allowable positioning error 23.

An increase in the position command signal parameter td causes the residual vibration amplitude to decrease monotonically in the actual measured values. This characteristic can be used to obtain the position command signal parameter 121 for which residual vibration amplitude matches the allowable positioning error 23. The positioning control can thus be performed by using the position command signal parameter 121 so as to be able to achieve the objective of shortening the positioning time as much as possible while suppressing the residual vibration amplitude such that it is within the allowable positioning error 23.

As with the first embodiment, the residual vibration information recording unit 13 stores a plurality of pieces of the residual vibration information 24 while associating the residual vibration amplitude, which is measured at the time of performing positioning control on the basis of the position command signal parameter td, with the corresponding position command signal parameter td. Consequently, with the use of the characteristic where the residual vibration amplitude decreases monotonically as the position command signal parameter td increases, it is possible to easily calculate and determine the position command signal parameter 121 for which residual vibration amplitude matches the allowable positioning error 23 from the plurality of pieces of the residual vibration information 24 stored in the residual vibration information recording unit 13.

A linear interpolation function expressing the relation between the position command signal parameter td and the residual vibration amplitude Gtd' is expressed by the following Expression 14 when two pieces of the residual vibration information 24 can be used as the plurality of pieces of the residual vibration information 24, the two pieces of the residual vibration information being the first residual vibration amplitude $Gtd_1'$, which is the maximum value of the residual vibration amplitude measured when positioning control is performed with the first position command signal parameter $td_1$, and the second residual vibration amplitude $Gtd_2'$, which is the maximum value of the residual vibration amplitude measured when positioning control is performed with the second position command signal parameter $td_2$.

$$td = \frac{Gtd' - Gtd_1'}{Gtd_1' - Gtd_2'}(td_1 - td_2) + td_1 \qquad \text{[Expression 14]}$$

Accordingly, the position command signal parameter $td_{opt}$ of which residual vibration amplitude matches the allowable positioning error $G_{INP}$ can be calculated by substituting $G_{INP}$ for Gtd' in Expression 14, which is expressed by Expression 8 above.

Here, the processing from steps S22 to S24 in the flowchart of FIG. 7 corresponds to the processing performed by the residual vibration information recording unit 13 to obtain the first residual vibration amplitude $Gtd_1'$ and the first position command signal parameter $td_1$ used to calculate the position command signal parameter 121 of which residual vibration amplitude matches the allowable positioning error 23.

The processing from steps S26 to S28 in the flowchart of FIG. 7 corresponds to the processing performed by the residual vibration information recording unit 13 to obtain the second residual vibration amplitude $Gtd_2'$ and the second position command signal parameter $td_2$ used to calculate the position command signal parameter 121 of which residual vibration amplitude matches the allowable positioning error 23.

The processing of step S29 in the flowchart of FIG. 7 corresponds to the processing performed by the position command signal parameter determining unit 14 to calculate and determine the position command signal parameter $td_{opt}$ of which residual vibration amplitude matches the allowable positioning error $G_{INP}$.

In the second embodiment, the velocity command signal 122a which is the first derivative of the position command signal 122 has the triangular shape as with the first embodiment, but the acceleration time tc has the value smaller than or equal to the deceleration time td. Accordingly, as for the position command signal 122 with the value of the acceleration time tc smaller than or equal to the deceleration time td, there is the same merit as that of calculating the position command signal parameter 121 of which residual vibration amplitude being generated is within the allowable positioning error 23 and the positioning time can be shortened.

The position command signal generating unit 111 of the second embodiment uses the deceleration time td of the position command signal 122 as the position command signal parameter 121 so as to thus be able to easily determine the shape of the position command signal 122, where the velocity command signal 122a, which is the first derivative of the position command signal 122, has the triangular shape with the acceleration time tc shorter than or equal to the deceleration time td.

Although the second embodiment employs linear interpolation as a method of interpolating the relation between the position command signal parameter td and the residual vibration amplitude Gtd being generated on the basis of the residual vibration information 24, there can be employed any interpolation method using the monotonically decreasing characteristic such as polynomial interpolation or interpolation using a trigonometric function having the monotonically decreasing characteristic.

The triangular velocity command signal with the acceleration A constant during the accelerating operation and the value of the acceleration time tc smaller than or equal to the deceleration time td, if subjected to time reversal operation, can be turned into a triangular velocity command signal with deceleration A (acceleration−A) constant during the decelerating operation and the value of the deceleration time td smaller than or equal to the acceleration time tc. Since Fourier transforms of the commands differ only by the conjugate multiplication, the commands have frequency components being the same in magnitude and also have the same influence on the easiness of vibration excitation. Therefore, although the second embodiment has described the configuration and the effect using the deceleration time td as the position command signal parameter 121 while setting the acceleration A during the accelerating operation to be constant, the similar effect can also be given by setting the deceleration A (acceleration−A) during the decelerating operation to be constant and using the acceleration time tc as the position command signal parameter 121.

Third Embodiment

Figure 11:
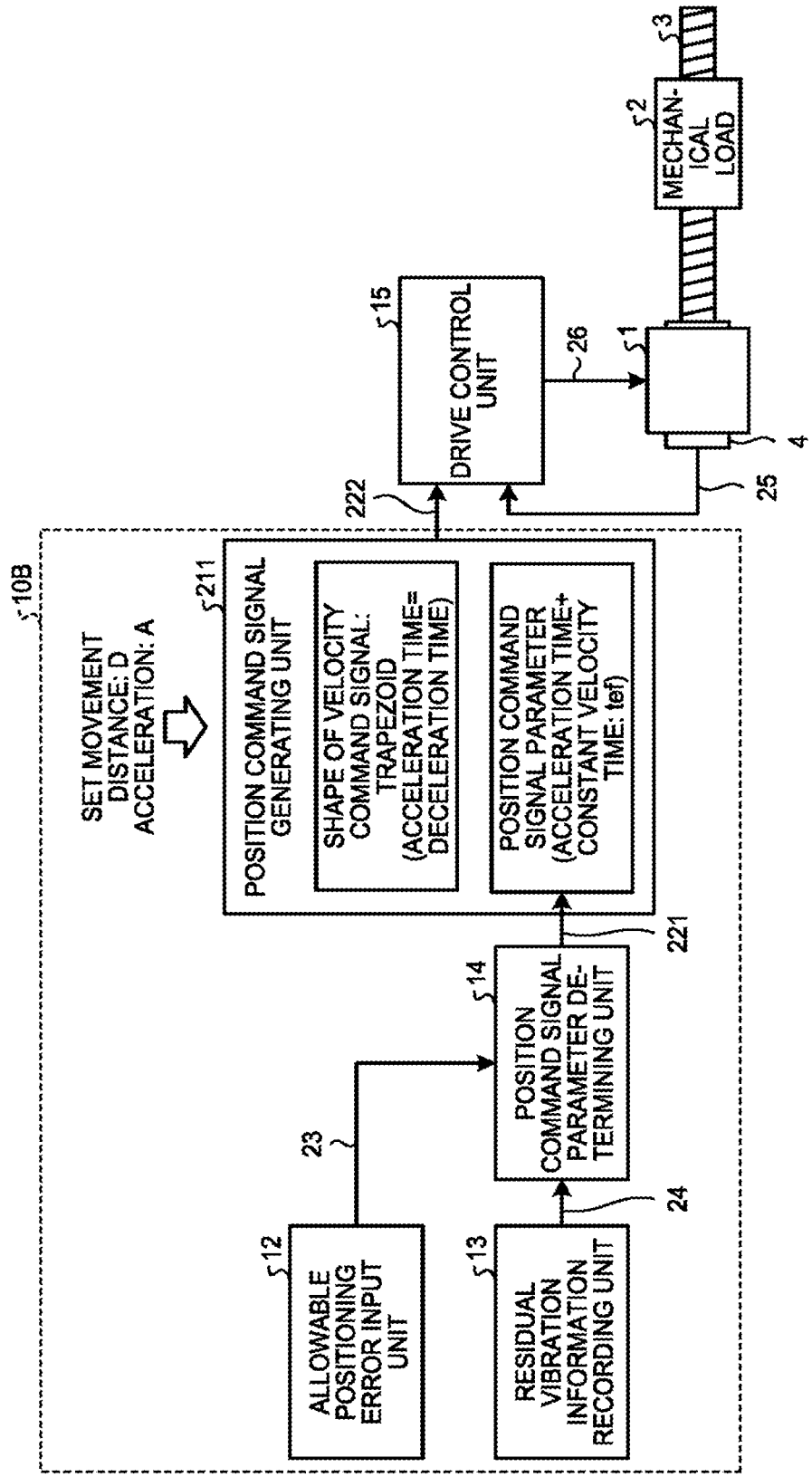
FIG. 11 is a block diagram of a positioning controller according to a third embodiment of the present invention.

A third embodiment of the present invention will be described. FIG. 11 is a block diagram illustrating the structure of a positioning controller according to the third embodiment of the present invention. A positioning controller 10B of the third embodiment includes a position command signal generating unit 211 structured differently. Contents overlapped with the positioning controller 10 of the first embodiment will be denoted by the same reference numerals and not be described in detail, whereby a difference between the embodiments will be described.

As illustrated in FIG. 11, the positioning controller 10B includes the position command signal generating unit 211 that generates a position command signal 222 and outputs it to a drive control unit 15, the position command signal being generated on the basis of a set movement distance D input from the outside and acceleration A during an accelerating operation of an acceleration command signal 222b (FIG. 12) which is a second derivative of the position command signal 222.

Figure 12:
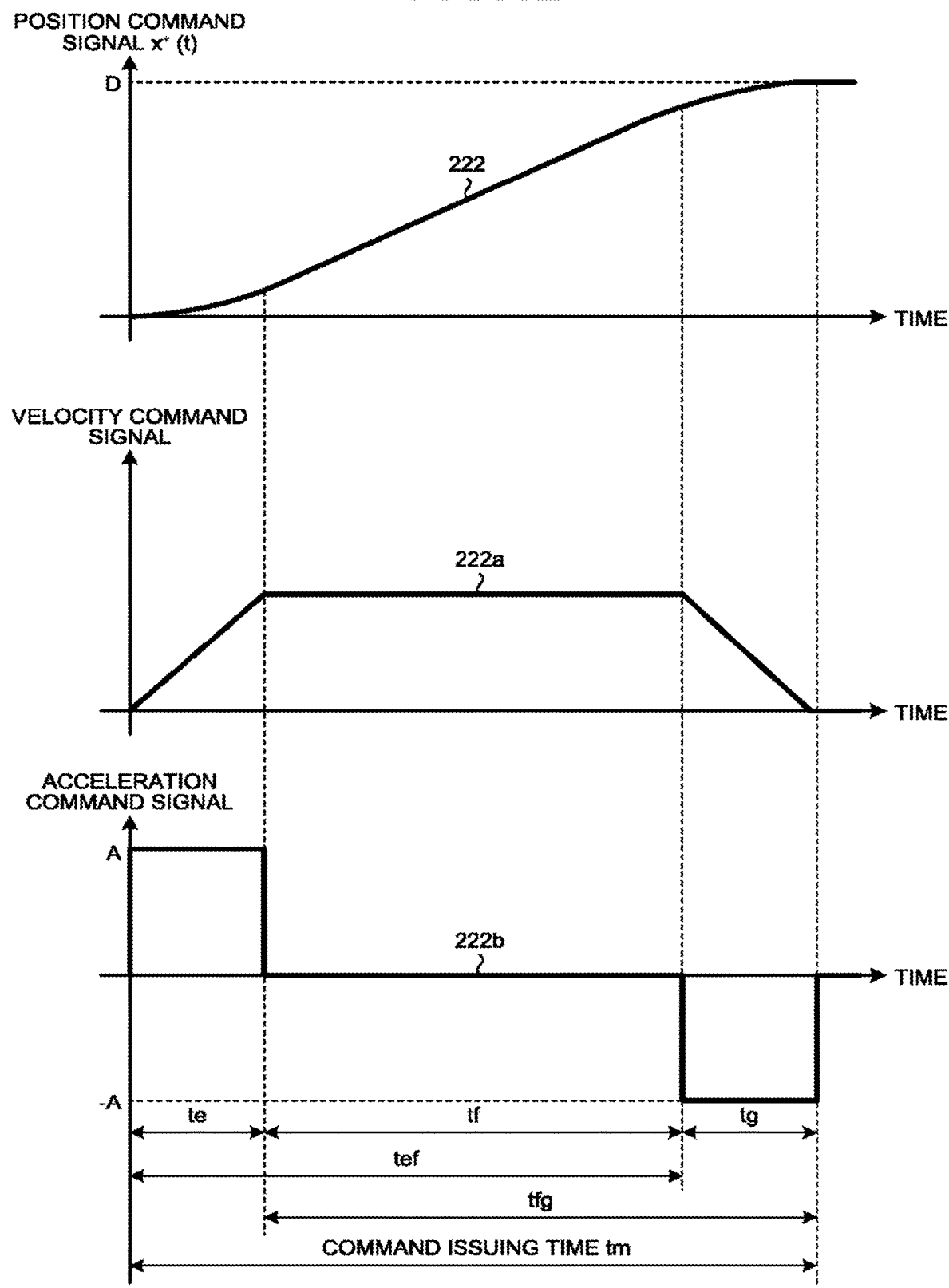
FIG. 12 is a set of graphs each illustrating the waveform of a command signal according to the third embodiment of the present invention.

FIG. 12 is a set of graphs each illustrating a waveform of a command signal according to the third embodiment. Specifically, an upper graph of FIG. 12 represents the shape of the position command signal 222 used in the third embodiment, a middle graph represents the shape of a velocity command signal 222a which is a first derivative of the position command signal 222, and a lower graph represents the shape of the acceleration command signal 222b which is the second derivative of the position command signal 222. In the third embodiment, the velocity command signal 222a being the first derivative of the position command signal 222 has a trapezoidal shape with a constant velocity time tf as well as an acceleration time te equal to a deceleration time tg; and the velocity command signal 222a increases linearly during an accelerating operation, is unchanged during a constant velocity operation, and decelerates linearly during a decelerating operation. Here, the constant velocity time tf refers to a time during which the velocity does not change after the velocity command signal reaches the maximum value from zero and it reaches zero from the maximum value. The position command signal 222 is generated on the basis of a position command signal parameter 221 which is a parameter determining the shape of the position command signal 222. The third embodiment uses a sum tef of the acceleration time te and the constant velocity time tf in FIG. 12 as the position command signal parameter 221. Moreover, a reference character D in FIG. 12 represents the set movement distance, and a reference character A represents the acceleration during the accelerating operation. Note that in the third embodiment, the position command signal 222 which is a command for performing positioning control cannot be uniquely determined from just the set movement distance D, the acceleration A during the accelerating operation, and the information that the velocity command signal 222a has the trapezoidal shape with the acceleration time te equal to the deceleration time tg, but it can be uniquely determined by further specifying the position command signal parameter 221.

Figure 13:
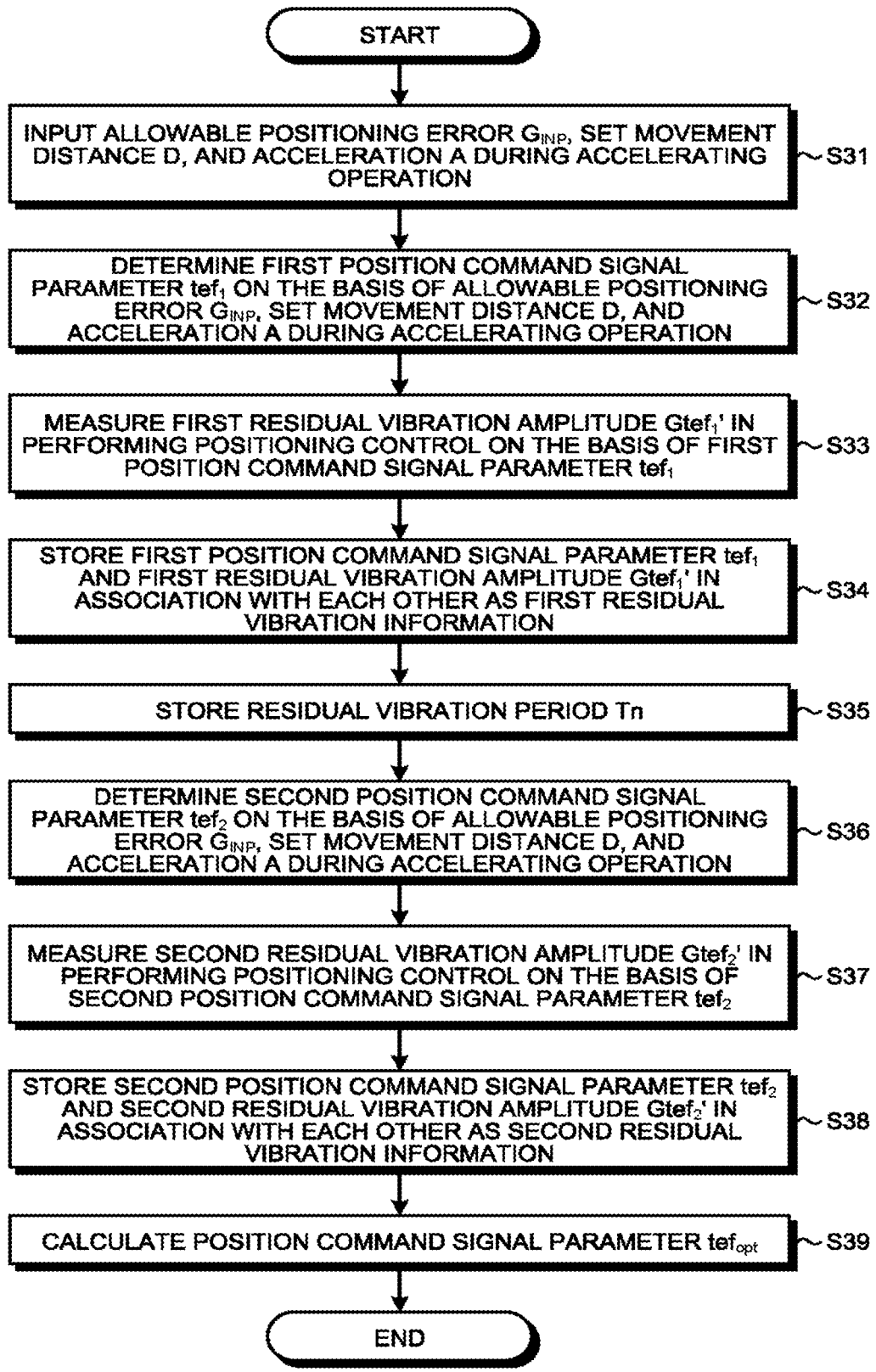
FIG. 13 is a flowchart illustrating operation procedures of the positioning controller according to the third embodiment of the present invention.

FIG. 13 is a flowchart illustrating operation procedures of the positioning controller according to the third embodiment. At step S31, an operator inputs a predetermined allowable positioning error $G_{INP}$ to an allowable positioning error input unit 12. The operator further inputs, to the position command signal generating unit 211, the predetermined set movement distance D and the acceleration A during the accelerating operation of the acceleration command signal 222b.

At step S32, a first position command signal parameter $tef_1$ for positioning control is determined. As with the first embodiment, an example of the first position command signal parameter $tef_1$ is the position command signal parameter 221 with which a residual vibration amplitude exceeds the allowable positioning error $G_{INP}$ (23). As a specific example, the parameter can be the sum of the acceleration time and the constant velocity time of the position command signal 222 when the constant velocity time tf is set as short as possible. It is desirable to set short the sum tef of the acceleration time te and the constant velocity time tf which is the position command signal parameter 221 so as to facilitate vibration excitation and perform positioning control.

At step S33, the drive control unit 15 performs positioning control by using the position command signal 222 corresponding to the first position command signal parameter $tef_1$. Moreover, a residual vibration information recording unit 13 measures a first residual vibration amplitude $Gtef_1'$ generated at this time. Here, a residual vibration amplitude Gtef' is an actual measured value of the maximum value of the residual vibration amplitude. At step S34, the residual vibration information recording unit 13 stores the first position command signal parameter $tef_1$ and the first residual vibration amplitude $Gtef_1'$ in association with each other as first residual vibration information 24. At step S35, the residual vibration information recording unit 13 stores a period Tn [s] of the residual vibration corresponding to the first residual vibration amplitude $Gtef_1'$.

At step S36, a second position command signal parameter $tef_2$ for positioning control is determined. An example of the second position command signal parameter $tef_2$ is the position command signal parameter 221 of which residual vibration amplitude is within the allowable positioning error $G_{INP}$ (23). As a specific example, the second position command signal parameter $tef_2$ can be set to the same value as the residual vibration period Tn.

At step S37, the drive control unit 15 performs positioning control by using the position command signal 222 corresponding to the second position command signal parameter $tef_2$. Moreover, the residual vibration information recording unit 13 measures a second residual vibration amplitude $Gtef_2'$ generated at this time.

At step S38, the residual vibration information recording unit 13 stores the second position command signal parameter $tef_2$ and the second residual vibration amplitude $Gtef_2'$ in association with each other as second residual vibration information 24. At step S39, on the basis of the first residual vibration information 24 and the second residual vibration information 24 stored in the residual vibration information recording unit 13, a position command signal parameter determining unit 14 uses the following Expression 15 to calculate a position command signal parameter $tef_{opt}$ of which residual vibration amplitude is within the allowable positioning error $G_{INP}$ (23) and at the same time the positioning time can be shortened.

$$tef_{opt} = \frac{G_{INP} - Gtef_1'}{Gtef_1' - Gtef_2'}(tef_1 - tef_2) + tef_1 \qquad \text{[Expression 15]}$$

The position command signal parameter $tef_{opt}$ is calculated as described above by the processing illustrated in the flowchart of FIG. 13 so as to thus be able to suppress the residual vibration amplitude within the allowable positioning error $G_{INP}$ (23), the residual vibration amplitude being generated at the time of performing positioning control to the set movement distance. With the residual vibration amplitude falling within the allowable positioning error $G_{INP}$ (23), the positioning accuracy required for positioning control is satisfied even when vibration remains so as to thus be able to obtain the position command signal parameter $tef_{opt}$ (121) of which positioning time can be shortened.

Effects of the third embodiment will now be described. First, an analysis is made to clarify the relation between the position command signal parameter tef used in the third embodiment and the residual vibration amplitude. As described above, the velocity command signal 222a which is the first derivative of the position command signal 222 used in the third embodiment has the trapezoidal shape with the constant velocity time tf as well as the acceleration time te equal to the deceleration time tg as illustrated in FIG. 12. A Laplace transform representation $X^*(s)$ of a signal $x^*(t)$ with respect to time t of the position command signal 222 is expressed by the following Expression 16 on the basis of the position command signal parameter tef, the set movement distance D, and the acceleration A during the accelerating operation. Here, "s" represents a Laplace operator.

$$X^*(s) = \frac{A}{s^3}\left(1 - e^{-\frac{2q^2}{1-q}tef \cdot s} + e^{-\frac{1-q-4q^2}{1-q}tef \cdot s}\right) \qquad \text{[Expression 16]}$$

In this case, "q" is expressed by the following Expression 17 using the position command signal parameter tef, the set movement distance D, and the acceleration A during the accelerating operation.

$$q = \frac{1}{2tef\sqrt{A/D} + 1} \quad \text{[Expression 17]}$$

On the other hand, the relation between a detected position signal x (t) and the position command signal x* (t) at the time of performing positioning control on a mechanical load 2 affected by residual vibration can be approximated by Expression 4 as described in the first embodiment so that, by substituting Expression 16 into Expression 4 and executing an inverse Laplace transformation, the detected position signal x (t) is expressed by the following Expression 18 after the position command signal is initiated and reaches the set movement distance D.

$$x(t) = \left[ AZ_1 \sqrt{\{\beta + Z_2\alpha\}^2 + \{\alpha - Z_2\beta\}^2} \right] \quad \text{[Expression 18]}$$
$$e^{-\zeta\omega_n t}\sin(\omega_d t + \psi) + D$$

Note that $\alpha$, $\beta$, $\omega_d$, $Z_1$, $Z_2$, $\Psi$, and the like are expressed by the following Expressions 19 using the position command signal parameter tef, a residual vibration frequency $\omega_n$, and a damping ratio $\zeta$.

$$\alpha = 1 - e^{\zeta\omega_p \frac{2q^2}{1-q} tef} \cos\omega_d\left(\zeta\omega_p \frac{2q^2}{1-q} tef\right) + \quad \text{[Expression 19]}$$
$$e^{\zeta\omega_p \frac{4q^2+q-1}{1-q} tef} \cos\omega_d\left(\frac{4q^2+q-1}{1-q} tef\right)$$

$$\beta = -e^{\zeta\omega_p \frac{2q^2}{1-q} tef} \sin\omega_d\left(\zeta\omega_p \frac{2q^2}{1-q} tef\right) +$$
$$e^{\zeta\omega_p \frac{4q^2+q-1}{1-q} tef} \sin\omega_d\left(\frac{4q^2+q-1}{1-q} tef\right)$$

$$\omega_d = \sqrt{1-\zeta^2}\,\omega_n, \; Z_1 = \frac{1-4\zeta^2}{\omega_n^2}, \; Z_2 = \frac{3\zeta - 4\zeta^2}{(1-4\zeta^2)\sqrt{1-\zeta^2}}$$

$$\psi =$$
$$\begin{cases} \pi - \arcsin\left(\frac{\{\alpha - Z_2\beta\}}{\sqrt{\{\beta + Z_2\alpha\}^2 + \{\alpha - Z_2\beta\}^2}}\right) & (\beta + Z_2\alpha < 0) \\ \arcsin\left(\frac{\{\alpha - Z_2\beta\}}{\sqrt{\{\beta + Z_2\alpha\}^2 + \{\alpha - Z_2\beta\}^2}}\right) & (\beta + Z_2\alpha \geq 0) \end{cases}$$

As a result, the detected position signal x (t) takes on a vibrational behavior centered on the set movement distance D and with the amplitude being the value expressed in square brackets [ ] of Expression 18. An analytical value Gtef of the maximum value of the residual vibration amplitude of the detected position signal x (t) in performing positioning control is expressed by the following Expression 20 while using the position command signal parameter tef, the set movement distance D, the acceleration A during the accelerating operation, the residual vibration frequency $\omega_n$, and the damping ratio $\zeta$. The analytical value Gtef of the maximum value of the residual vibration amplitude is hereinafter simply referred to as a residual vibration amplitude Gtef.

$$Gtef = AZ_1\sqrt{\{\beta + Z_2\alpha\}^2 + \{\alpha - Z_2\beta\}^2} \quad \text{[Expression 20]}$$

Figure 14:
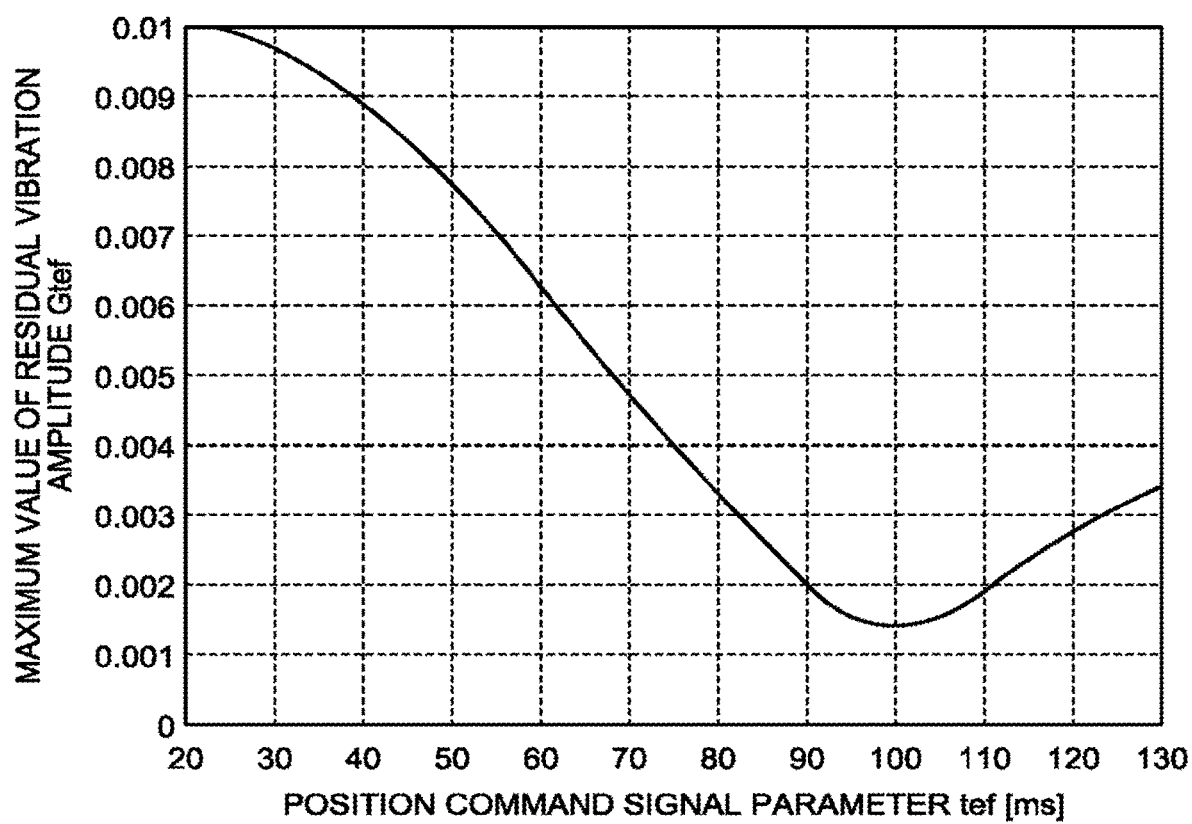
FIG. 14 is a graph illustrating the relation between the sum of the acceleration time and the constant velocity time of a position command signal and residual vibration amplitude according to the third embodiment of the present invention.

In order to understand the relation between the residual vibration amplitude Gtef and the position command signal parameter tef, FIG. 14 illustrates the relation between the residual vibration amplitude Gtef and the position command signal parameter tef when the residual vibration period Tn=100 ms ($\omega_n=2\pi/$Tn [rad/s]), the damping ratio $\zeta=0.1$, the set movement distance D=10 mm, and the acceleration A=3.0 G during the accelerating operation are each substituted into the above Expression 20.

As illustrated in FIG. 14, the third embodiment is also adapted such that the residual vibration is minimum when the position command signal parameter tef is equal to the residual vibration period of 100 ms, or when tef=Tn. In the range of the position command signal parameter tef≤the residual vibration period Tn, the residual vibration amplitude decreases monotonically as the position command signal parameter tef increases. Although FIG. 14 illustrates the example with the residual vibration period Tn=100 ms ($\omega_n=2\pi/$Tn [rad/s]), the damping ratio $\zeta=0.1$, the set movement distance D=10 mm, and the acceleration A=3.0 G during the accelerating operation, the characteristic between the position command signal parameter and the residual vibration amplitude is a characteristic that is widely established independently from the values of the residual vibration period, the damping ratio, the set movement distance, and the acceleration during the accelerating operation. The characteristic that the residual vibration amplitude decreases monotonically as the position command signal parameter tef increases in using the position command signal 222 of the third embodiment as described above also holds true for an actual measured value due to the reason similar to that of the first embodiment.

Figure 15:
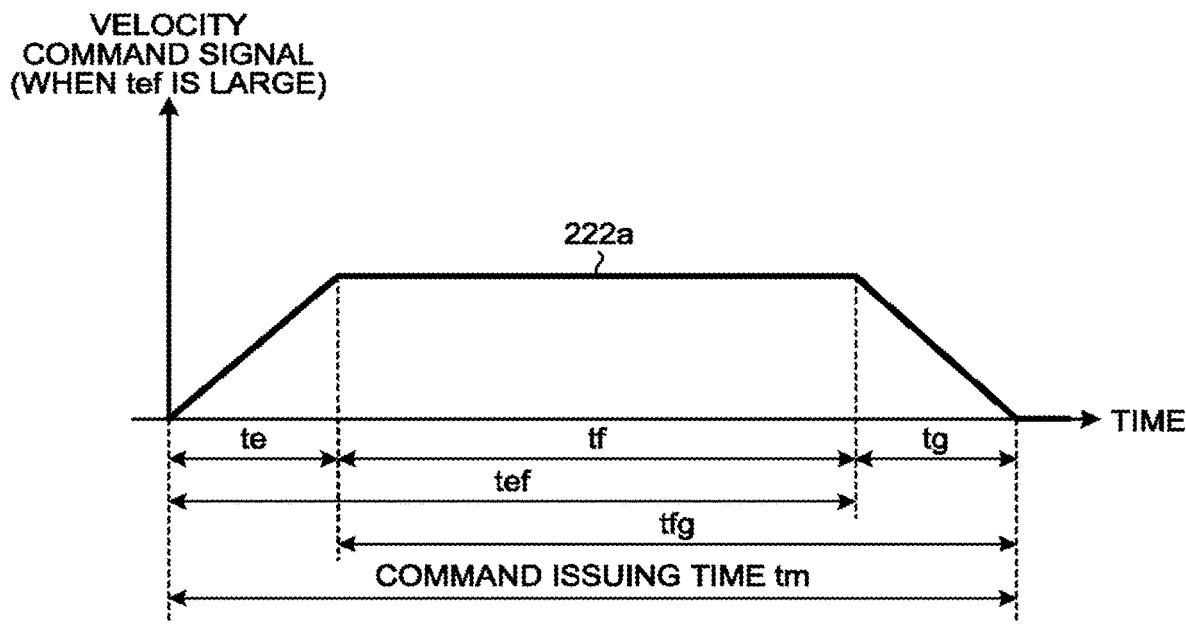
FIG. 15 is a graph illustrating the relation between a position command signal parameter and a command issuing time according to the third embodiment of the present invention.
Figure 16:
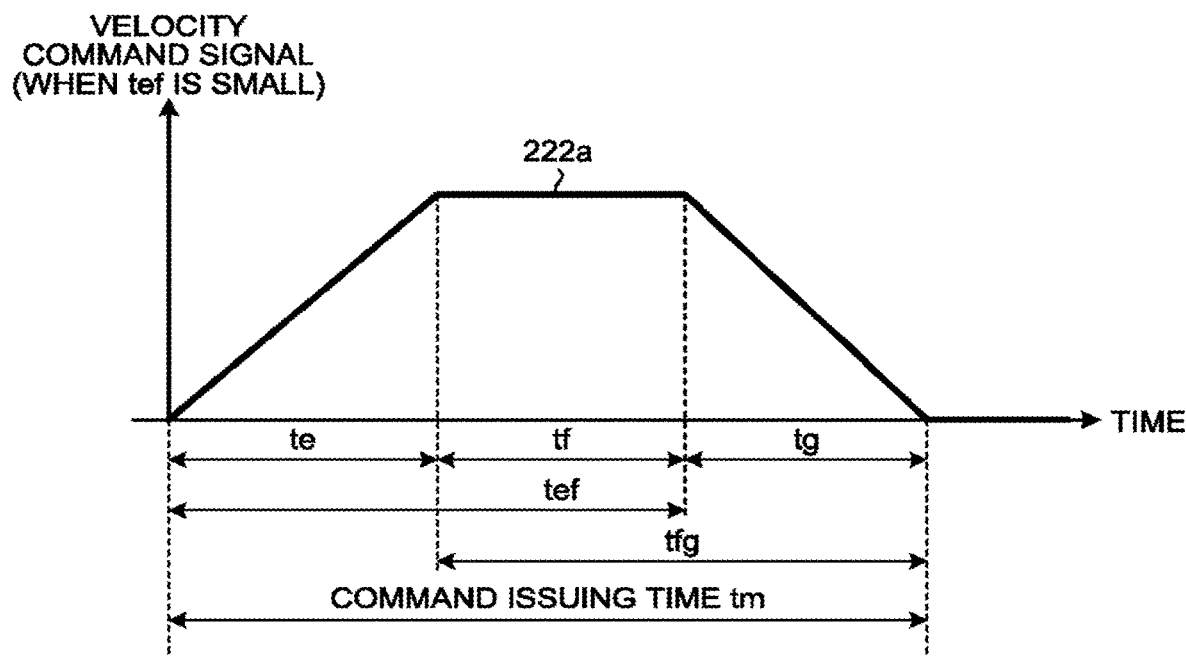
FIG. 16 is a graph illustrating another relation between the position command signal parameter and the command issuing time of a command signal according to the third embodiment of the present invention.

In the third embodiment, the position command signal parameter 221 corresponds to the sum tef of the acceleration time te and the constant velocity time tf of the position command signal 222. FIG. 15 illustrates a change in the velocity command signal when the position command signal parameter tef is large, and FIG. 16 illustrates a change in the velocity command signal when the position command signal parameter tef is small. As illustrated in FIGS. 15 and 16, a decrease in the position command signal parameter tef causes reduction in the sum of the acceleration time te and the constant velocity time tf of the command signal, thereby shortening a command issuing time tm. The positioning time can thus be shortened when the decrease in the position command signal parameter tef does not cause the residual vibration amplitude to exceed the allowable positioning error 23.

An increase in the position command signal parameter tef causes the residual vibration amplitude to decrease monotonically in the actual measured value. This characteristic is used so as to be able to obtain the position command signal parameter 221 of which residual vibration amplitude matches the allowable positioning error 23. Positioning control can thus be performed by using the position command signal parameter 221 so as to be able to achieve the objective of shortening the positioning time as much as possible while suppressing the residual vibration amplitude within the allowable positioning error 23.

As with the first embodiment, the residual vibration information recording unit 13 stores a plurality of pieces of the residual vibration information 24 while associating the residual vibration amplitude, which is measured at the time of performing positioning control on the basis of the position command signal parameter tef, with the corresponding position command signal parameter tef. Accordingly, with the use of the characteristic that the residual vibration amplitude decreases monotonically as the position command signal parameter tef increases, can be easily calculated and determined the position command signal parameter 221 of which residual vibration amplitude matches the allowable positioning error 23 from the plurality of pieces of the residual vibration information 24 stored in the residual vibration information recording unit 13.

A linear interpolation function expressing the relation between the position command signal parameter tef and the residual vibration amplitude Gtef' is expressed by the following Expression 21, when two pieces of the residual vibration information 24 can be used as the plurality of pieces of the residual vibration information 24, the two pieces of the residual vibration information being the first residual vibration amplitude $Gtef_1'$ which is the maximum value of the residual vibration amplitude measured when positioning control is performed with the first position command signal parameter $tef_1$ and the second residual vibration amplitude $Gtef_2'$ which is the maximum value of the residual vibration amplitude measured when positioning control is performed with the second position command signal parameter $tef_2$.

$$tef = \frac{Gtef' - Gtef_1'}{Gtef_1' - Gtef_2'}(tef_1 - tef_2) + tef_1 \qquad \text{[Expression 21]}$$

Accordingly, the position command signal parameter $tef_{opt}$ of which residual vibration amplitude matches the allowable positioning error $G_{INP}$ can be calculated by substituting $G_{INP}$ for Gtef' in Expression 21, which is expressed by Expression 15 above.

Here, the processing from steps S32 to S34 in the flowchart of FIG. 13 corresponds to the processing performed by the residual vibration information recording unit 13 so as to obtain the first position command signal parameter $tef_1$ and the first residual vibration amplitude $Gtef_1'$ used to calculate the position command signal parameter 221 of which residual vibration amplitude matches the allowable positioning error 23.

The processing from steps S36 to S38 in the flowchart of FIG. 13 corresponds to the processing performed by the residual vibration information recording unit 13 so as to obtain the second position command signal parameter $tef_2$ and the second residual vibration amplitude $Gtef_2'$ used to calculate the position command signal parameter 221 of which residual vibration amplitude matches the allowable positioning error 23.

The processing of step S39 in the flowchart of FIG. 13 corresponds to the processing performed by the position command signal parameter determining unit 14 to calculate the position command signal parameter $tef_{opt}$ of which residual vibration amplitude matches the allowable positioning error $G_{INP}$.

In the third embodiment, the velocity command signal 222*a* which is the first derivative of the position command signal 222 has the trapezoidal shape with the constant velocity time tf as well as the acceleration time te equal in value to the deceleration time tg. Accordingly, as for such a position command signal 222, can be calculated the position command signal parameter 221 of which residual vibration amplitude being generated is within the allowable positioning error 23 and at the same time the positioning time can be shortened.

Although the third embodiment employs linear interpolation as a method of interpolating the relation between the position command signal parameter tef and the residual vibration amplitude Gtef' being generated on the basis of the residual vibration information 24, there can be employed any interpolation method using the monotonically decreasing characteristic such as polynomial interpolation or interpolation using a trigonometric function with the monotonically decreasing characteristic.

Although the third embodiment has described the configuration and the effect using the sum tef of the acceleration time te and the constant velocity time tf of the position command signal 222 as the position command signal parameter 221, a sum tfg of the deceleration time tg and the constant velocity time tf can also be used as the position command signal parameter 221 so as to be able to produce exactly the same effect since, with the command signal in FIG. 12 having the acceleration time te equal to the deceleration time tg, and the sum tef of the acceleration time te and the constant velocity time tf is also equal to the sum tfg of the deceleration time tg and the constant velocity time tf.

Although the first, second, and third embodiments have illustrated the example of using two sets of the residual vibration information 24 in which the residual vibration amplitude being the magnitude of residual vibration is associated with the position command signal parameter, three or more sets of the residual vibration information 24 can be used as well. In this case, an interpolation function corresponding to Expression 21 or the like and expressing the relation between the position command signal parameter and the residual vibration amplitude can be calculated by using the least squares method or the like that can carry out the embodiments in a similar manner and produce a similar effect.

Fourth Embodiment

A fourth embodiment of the present invention will now be described. The first embodiment uses the position command signal 22, the first derivative of which being the velocity command signal 22*a* has the triangular shape with the acceleration time ta equal to the deceleration time tb. Although the first embodiment uses the acceleration time ta of the position command signal 22 as the position command signal parameter 21 determining the shape of the position command signal 22, another position command signal parameter can also be used. The fourth embodiment describes an example of using another position command signal parameter 321.

Figure 17:
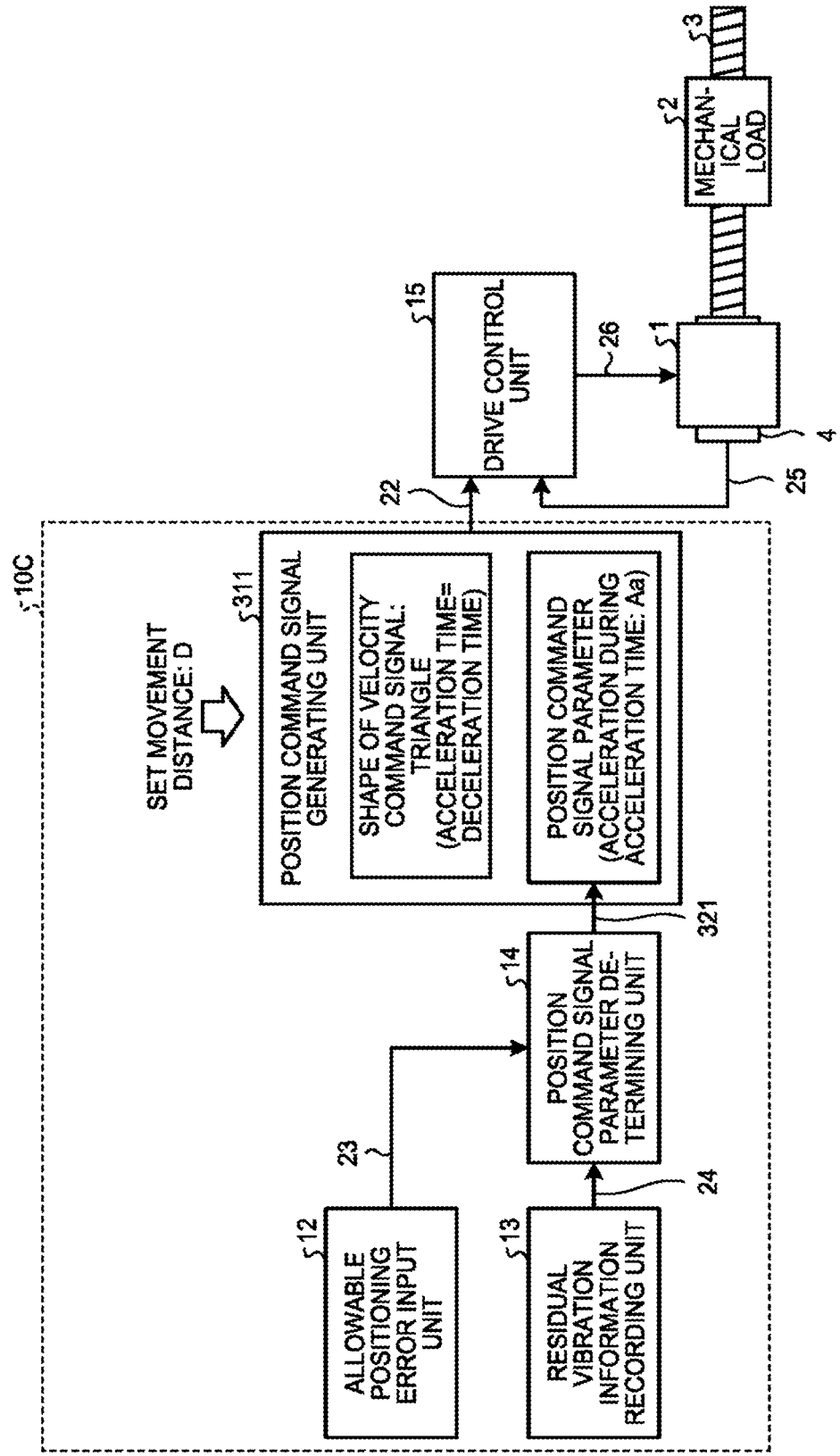
FIG. 17 is a block diagram of a positioning controller according to a fourth embodiment of the present invention.

FIG. 17 is a block diagram illustrating a positioning controller according to the fourth embodiment of the present invention. A positioning controller 10C of the fourth embodiment includes a position command signal generating unit 311 structured differently from that of the first embodiment. Contents overlapped with the positioning controller 10 of the first embodiment will be denoted by the same reference numerals and are not described in detail, whereby a difference between the embodiments will be described.

The positioning controller 10C includes the position command signal generating unit 311 as illustrated in FIG. 17. The position command signal generating unit 311 generates a position command signal 22 on the basis of a set movement distance D input from the outside so as to output to a drive control unit 15.

Figure 18:
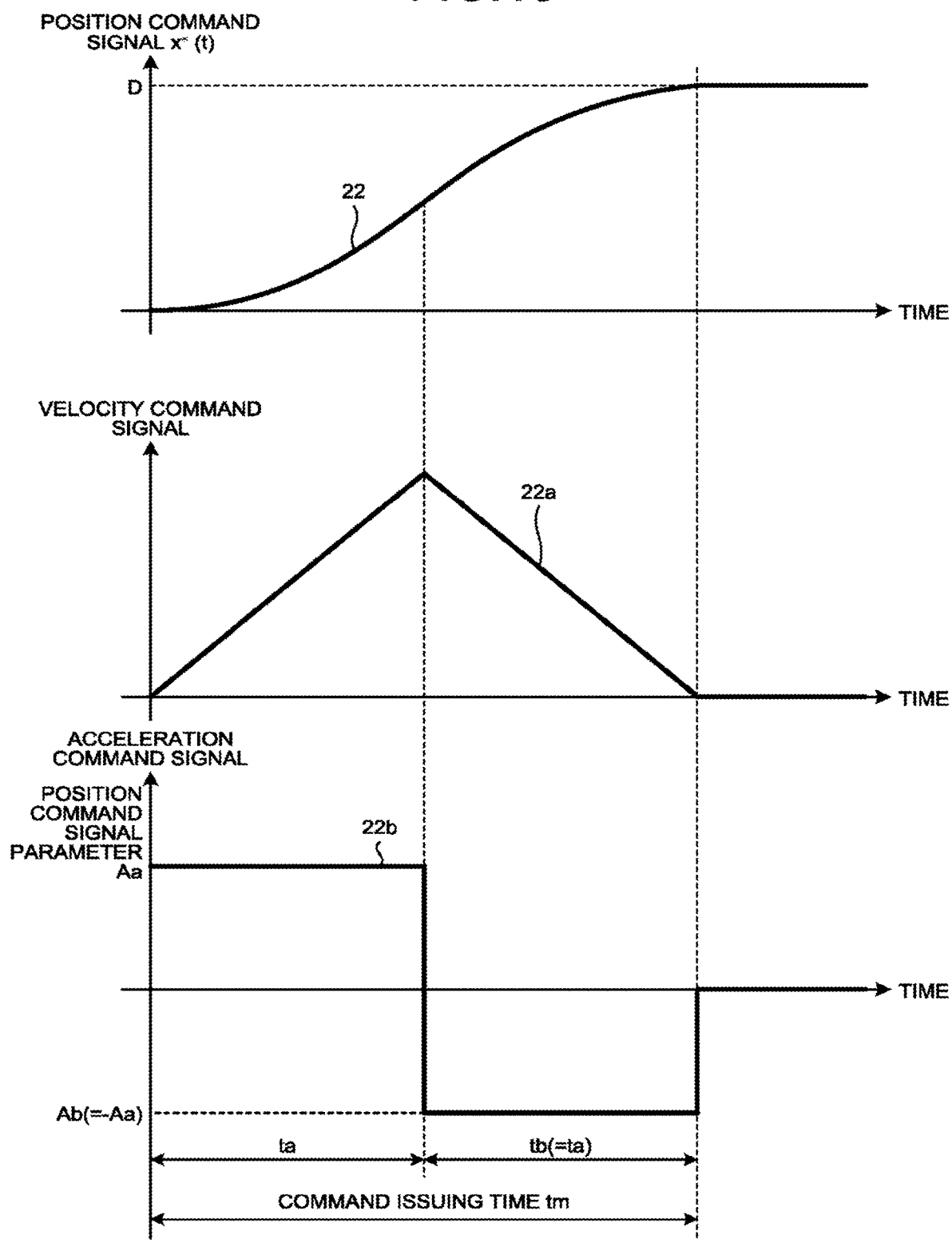
FIG. 18 is a set of graphs each illustrating the waveform of a command signal according to the fourth embodiment of the present invention.

FIG. 18 is a set of graphs each illustrating a waveform of a command signal according to the fourth embodiment. The shape of the position command signal 22 used in the fourth embodiment is similar to that of the first embodiment, where a velocity command signal 22a being a first derivative of the position command signal 22 has a triangular shape with an acceleration time ta equal to a deceleration time tb. The velocity command signal 22a increases linearly during an accelerating operation and decelerates linearly during a decelerating operation. In FIG. 18, a reference character Aa represents acceleration during the accelerating operation, and a reference character Ab represents acceleration during the decelerating operation. There is the relation Ab=−Aa between the acceleration Aa during the accelerating operation and the acceleration Ab during the decelerating operation. Moreover, the position command signal 22 is generated on the basis of the position command signal parameter 321 which is a parameter determining the shape of the position command signal 22. The fourth embodiment uses the acceleration Aa during the accelerating operation in FIG. 18 as the position command signal parameter 321. A reference character D in FIG. 18 represents the set movement distance. Note that in the fourth embodiment, the position command signal 22 which is a command for performing positioning control cannot be uniquely determined from just the set movement distance D and the information that the velocity command signal 22a has the triangular shape with the acceleration time ta equal to the deceleration time tb, but it can be uniquely determined by further specifying the position command signal parameter 321. Specifically, the set movement distance D and the acceleration Aa during the accelerating operation being the position command signal parameter 321 are used so as to be able to calculate each of the acceleration time ta and the deceleration time tb in FIG. 18 as ta=tb=√(D/Aa)=(D/Aa)$^{1/2}$.

Figure 19:
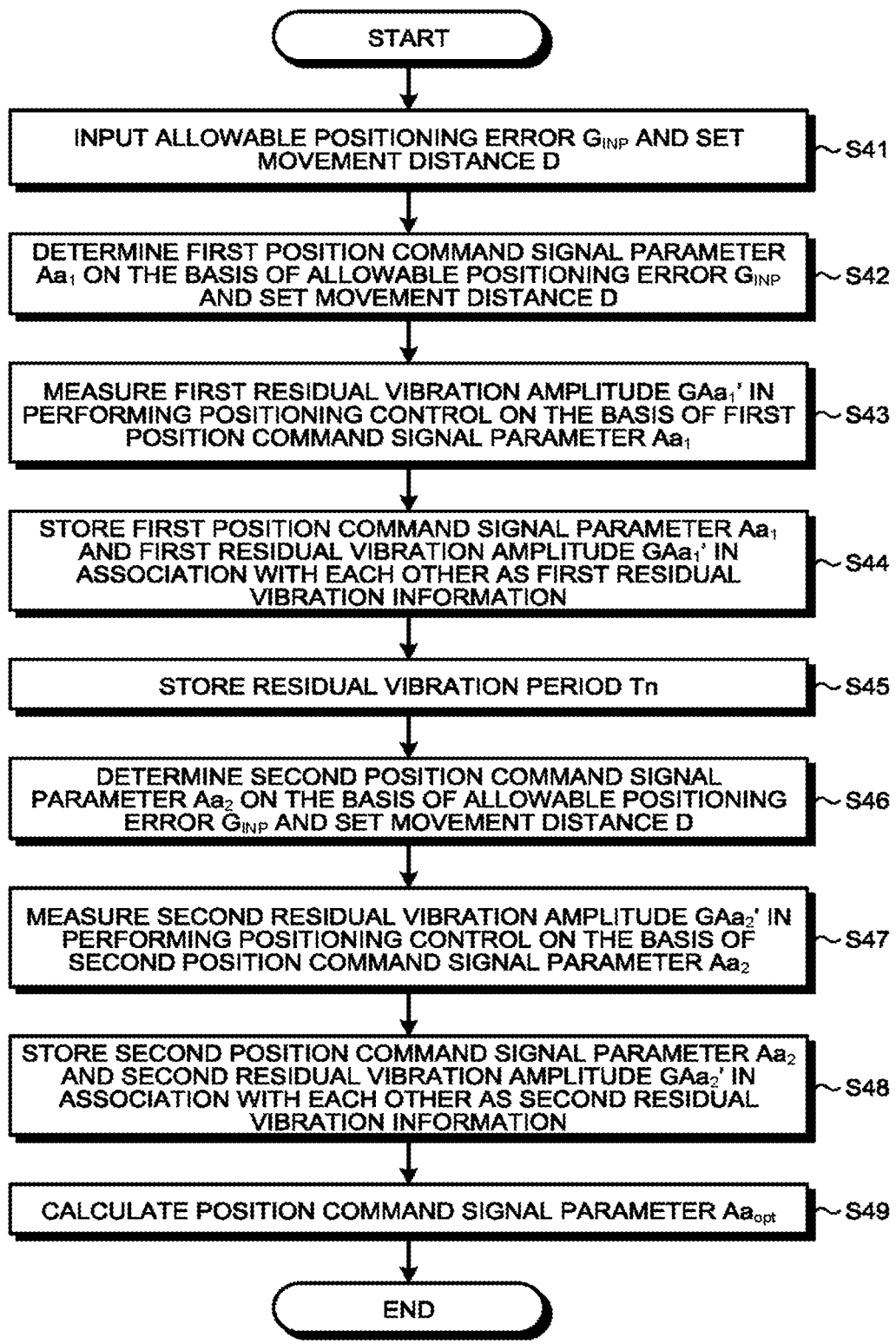
FIG. 19 is a flowchart illustrating operation procedures of the positioning controller according to the fourth embodiment of the present invention.

FIG. 19 is a flowchart illustrating operation procedures of the positioning controller according to the fourth embodiment. At step S41, an operator inputs a predetermined allowable positioning error $G_{INP}$ to an allowable positioning error input unit 12. The operator also inputs a predetermined set movement distance D to the position command signal generating unit 311.

At step S42, a first position command signal parameter $Aa_1$ for positioning control is determined. As with the first embodiment, an example of the first position command signal parameter $Aa_1$ is the position command signal parameter 321 with which a residual vibration amplitude exceeds the allowable positioning error $G_{INP}$ (23). As a specific example, the parameter is preferably set to the acceleration during the accelerating operation of the position command signal 22 when the maximum torque that can be output by a motor 1 is used to move a target over the set movement distance D by accelerating and decelerating the total inertia of the motor 1 and a mechanical load 2, or set to the maximum value that can be set as the position command signal parameter 321. In either case, it is desirable to set the position command signal parameter 321 large so as to facilitate vibration excitation and perform positioning control.

At step S43, the drive control unit 15 performs positioning control by using the position command signal 22 corresponding to the first position command signal parameter $Aa_1$. Moreover, a residual vibration information recording unit 13 measures a first residual vibration amplitude $GAa_1'$ generated at this time. Here, a residual vibration amplitude GAa' is an actual measured value of the maximum value of the residual vibration amplitude. At step S44, the residual vibration information recording unit 13 stores the first position command signal parameter $Aa_1$ and the first residual vibration amplitude $GAa_1'$ in association with each other as first residual vibration information 24. At step S45, the residual vibration information recording unit 13 stores a period Tn [s] of the residual vibration corresponding to the first residual vibration amplitude $GAa_1'$.

At step S46, a second position command signal parameter $Aa_2$ for positioning control is determined. An example of the second position command signal parameter $Aa_2$ is the position command signal parameter 321 of which residual vibration amplitude is within the allowable positioning error $G_{INP}$ (23). As a specific example, the second position command signal parameter $Aa_2$ can be set to the acceleration ($Aa_2=D/Tn^2$) during the accelerating operation when the acceleration time ta has the same value as the residual vibration period Tn.

At step S47, the drive control unit 15 performs positioning control by using the position command signal 22 corresponding to the second position command signal parameter $Aa_2$. Moreover, the residual vibration information recording unit 13 measures a second residual vibration amplitude $GAa_2'$ generated at this time. At step S48, the residual vibration information recording unit 13 stores the second position command signal parameter $Aa_2$ and the second residual vibration amplitude $GAa_2'$ in association with each other as second residual vibration information 24. At step S49, on the basis of the first residual vibration information 24 and the second residual vibration information 24 stored in the residual vibration information recording unit 13, a position command signal parameter determining unit 14 uses Expression 22 below to calculate a position command signal parameter $Aa_{opt}$ of which residual vibration amplitude is within the allowable positioning error $G_{INP}$ (23) and at the same time the positioning time can be shortened.

$$Aa_{opt} = \frac{G_{INP} - GAa_1'}{GAa_1' - GAa_2'}(Aa_1 - Aa_2) + Aa_1 \qquad \text{[Expression 22]}$$

The position command signal parameter $Aa_{opt}$ is calculated as described above by the processing illustrated in the flowchart of FIG. 19 to thus be able to suppress the residual vibration amplitude within the allowable positioning error $G_{INP}$ (23), the residual vibration amplitude being generated at the time of performing positioning control to the set movement distance. With the residual vibration amplitude falling within the allowable positioning error $G_{INP}$ (23), the positioning accuracy required for positioning control is satisfied even when vibration remains to thus be able to obtain the position command signal parameter $Aa_{opt}$ (321) of which positioning time can be shortened.

Effects of the fourth embodiment will now be described. First, an analysis is made to clarify the relation between the position command signal parameter Aa used in the fourth embodiment and the residual vibration amplitude. As described above, the velocity command signal 22a which is the first derivative of the position command signal 22 used in the fourth embodiment has the triangular shape with the acceleration time equal to the deceleration time as illustrated in FIG. 18. A Laplace transform representation X* (s) of a signal x* (t) with respect to time t of the position command signal 22 is expressed by the following Expression 23 on the basis of the position command signal parameter Aa and the set movement distance D. Here, "s" represents a Laplace operator.

$$X^*(s) = \frac{1}{s^3} Aa \left( 1 - 2e^{-\sqrt{\frac{D}{Aa}} \cdot s} + e^{-2\sqrt{\frac{D}{Aa}} \cdot s} \right) \quad \text{[Expression 23]}$$

On the other hand, the relation between a detected position signal x (t) and the position command signal x* (t) at the time of performing positioning control on the mechanical load 2 affected by residual vibration can be approximated by Expression 4 as described in the first embodiment so that, by substituting Expression 23 into Expression 4 and executing an inverse Laplace transformation, the detected position signal x (t) is expressed by the following Expression 24 after the position command signal is initiated and reaches the set movement distance D.

$$x(t) = \left[ Aa \cdot Z_1 \sqrt{\{\beta + Z_2\alpha\}^2 + \{\alpha - Z_2\beta\}^2} \right] \quad \text{[Expression 24]}$$
$$e^{-\zeta\omega_n t} \sin(\omega_d t + \psi) + D$$

Note that $\alpha$, $\beta$, $\omega_d$, $Z_1$, $Z_2$, $\Psi$, and the like are expressed by the following Expressions 25 using the position command signal parameter Aa, a residual vibration frequency $\omega_n$, and a damping ratio $\zeta$.

$$\alpha = 1 - 2e^{\zeta\omega_n \sqrt{\frac{D}{Aa}}} \cos\omega_d\left(\sqrt{\frac{D}{Aa}}\right) + \quad \text{[Expression 25]}$$
$$e^{\zeta\omega_n \sqrt{\frac{D}{Aa}}} \cos\omega_d\left(2\sqrt{\frac{D}{Aa}}\right)$$
$$\beta = -2e^{\zeta\omega_n \sqrt{\frac{D}{Aa}}} \sin\omega_d\left(\sqrt{\frac{D}{Aa}}\right) + e^{\zeta\omega_n T_0} \sin\omega_d\left(2\sqrt{\frac{D}{Aa}}\right)$$
$$\omega_d = \sqrt{1 - \zeta^2}\, \omega_n, \quad Z_1 = \frac{1 - 4\zeta^2}{\omega_n^2}, \quad Z_2 = \frac{3\zeta - 4\zeta^2}{(1 - 4\zeta^2)\sqrt{1 - \zeta^2}}$$
$$\psi =$$
$$\begin{cases} \pi - \arcsin\left( \dfrac{\{\alpha - Z_2\beta\}}{\sqrt{\{\beta + Z_2\alpha\}^2 + \{\alpha - Z_2\beta\}^2}} \right) & (\beta + Z_2\alpha < 0) \\ \arcsin\left( \dfrac{\{\alpha - Z_2\beta\}}{\sqrt{\{\beta + Z_2\alpha\}^2 + \{\alpha_2 - Z_2\beta\}^2}} \right) & (\beta + Z_2\alpha \geq 0) \end{cases}$$

As a result, the detected position signal x (t) takes on a vibrational behavior centered on the set movement distance D and with the amplitude being the value expressed in square brackets [ ] of Expression 24. An analytical value GAa of the maximum value of the residual vibration amplitude of the detected position signal x (t) in performing positioning control is expressed by the following Expression 26 while using the position command signal parameter Aa, the set movement distance D, the residual vibration frequency $\omega_n$, and the damping ratio $\zeta$. The analytical value GAa of the maximum value of the residual vibration amplitude is hereinafter simply referred to as a residual vibration amplitude GAa.

$$GAa = Aa \cdot Z_1 \sqrt{\{\beta + Z_2\alpha\}^2 + \{\alpha - Z_2\beta\}^2} \quad \text{[Expression 26]}$$

Figure 20:
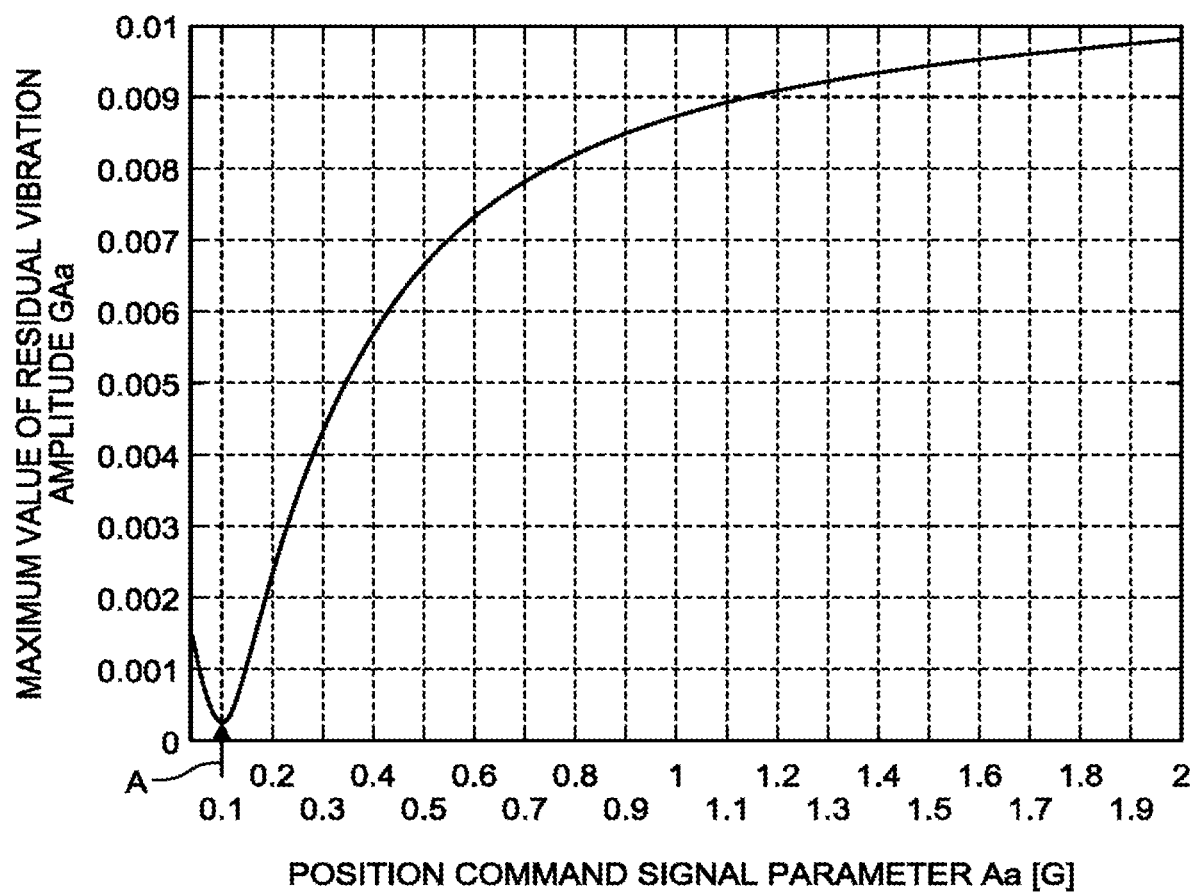
FIG. 20 is a graph illustrating the relation between the position command signal parameter of a command signal and residual vibration amplitude according to the fourth embodiment of the present invention.

In order to understand the relation between the residual vibration amplitude GAa and the position command signal parameter Aa, FIG. 20 illustrates the relation between the residual vibration amplitude GAa and the position command signal parameter Aa when the residual vibration period Tn=100 ms ($\omega_n$=2π/Tn [rad/s]), the damping ratio $\zeta$=0.1, and the set movement distance D=10 mm are each substituted into the above Expression 6.

As illustrated in FIG. 20, the residual vibration is minimum when the position command signal parameter Aa takes the same value as the acceleration at the time the acceleration time ta is equal to the residual vibration period 100 ms, or when Aa=D/Tn² (the position indicated by a symbol A in FIG. 20). There is a characteristic in the range of the position command signal parameter Aa≥D/Tn² that the residual vibration amplitude increases monotonically as the position command signal parameter Aa increases. Although FIG. 20 illustrates the example with the residual vibration period Tn=100 ms, the damping ratio $\zeta$=0.1, and the set movement distance D=10 mm, the characteristic between the position command signal parameter and the residual vibration amplitude is a characteristic that is widely established independently from the values of the residual vibration period, the damping ratio, and the set movement distance.

The characteristic that the residual vibration amplitude increases monotonically as the position command signal parameter Aa increases in using the position command signal 22 of the fourth embodiment also holds true for an actual measured value for the reason similar to that of the first embodiment.

In the fourth embodiment, the position command signal parameter 321 corresponds to the acceleration Aa during the accelerating operation of the position command signal 22. The position command signal 22 in the fourth embodiment has the acceleration time ta equal to the deceleration time tb and has the relation Ab=−Aa between the acceleration Aa during the accelerating operation and the acceleration Ab during the decelerating operation, so that an increase in the position command signal parameter Aa causes reduction in both the acceleration time ta and the deceleration time tb of the position command signal 22, thereby shortening a command issuing time tm (FIG. 18) which is the time it takes for the command to reach a target position from the start of positioning. The positioning time can thus be shortened when the increase in the position command signal parameter Aa does not cause the residual vibration amplitude to exceed the allowable positioning error 23.

An increase in the position command signal parameter Aa causes the residual vibration amplitude GAa' so as to increase monotonically in the actual measured value. This characteristic is used so as to be able to obtain the position command signal parameter 321 of which residual vibration amplitude matches the allowable positioning error 23. Accordingly, positioning control can be performed by using the position command signal parameter 321 so as to be able to achieve the object of shortening the positioning time as much as possible while suppressing the residual vibration amplitude within the allowable positioning error 23.

As with the first embodiment, the residual vibration information recording unit 13 stores a plurality of pieces of the residual vibration information 24 while associating the residual vibration amplitude GAa', which is measured at the time of performing positioning control on the basis of the position command signal parameter Aa, with the corresponding position command signal parameter Aa. Accordingly, with the use of the characteristic that the residual vibration amplitude increases monotonically as the position command signal parameter Aa increases, one can easily calculate and determine the position command signal parameter 321 of which residual vibration amplitude matches the allowable positioning error 23 from the plurality of pieces of the residual vibration information 24 stored in the residual vibration information recording unit 13.

A linear interpolation function expressing the relation between the position command signal parameter Aa and the residual vibration amplitude GAa' is expressed by the following Expression 27 when two pieces of the residual vibration information 24 can be used as the plurality of pieces of the residual vibration information 24, the two pieces of the residual vibration information being the first residual vibration amplitude $GAa_1'$ which is the maximum value of the residual vibration amplitude measured when positioning control is performed with the first position command signal parameter $Aa_1$ and the second residual vibration amplitude $GAa_2'$ which is the maximum value of the residual vibration amplitude measured when positioning control is performed with the second position command signal parameter $Aa_2$.

$$Aa = \frac{GAa' - GAa_1'}{GAa_1' - GAa_2'}(Aa_1 - Aa_2) + Aa_1 \qquad \text{[Expression 27]}$$

Accordingly, the position command signal parameter $Aa_{opt}$ of which residual vibration amplitude matches the allowable positioning error $G_{INP}$ can be calculated by substituting $G_{INP}$ for GAa' in Expression 27 and expressed by Expression 22 above.

Here, the processing from steps S42 to S44 in the flowchart of FIG. 19 corresponds to the processing performed by the residual vibration information recording unit 13 to obtain the first position command signal parameter $Aa_1$ and the first residual vibration amplitude $GAa_1'$ used to calculate the position command signal parameter 321 of which residual vibration amplitude matches the allowable positioning error 23.

The processing from steps S46 to S48 in the flowchart of FIG. 19 corresponds to the processing performed by the residual vibration information recording unit 13 to obtain the second position command signal parameter $Aa_2$ and the second residual vibration amplitude $GAa_2'$ used to calculate the position command signal parameter 321 of which residual vibration amplitude matches the allowable positioning error 23.

The processing of step S49 in the flowchart of FIG. 19 corresponds to the processing performed by the position command signal parameter determining unit 14 to calculate and determine the position command signal parameter $Aa_{opt}$ of which residual vibration amplitude matches the allowable positioning error $G_{INP}$.

In the fourth embodiment, the velocity command signal 22a which is the first derivative of the position command signal 22 has the triangular shape with the acceleration time ta equal to the deceleration time tb as with the first embodiment, where the position command signal parameter 321 is the acceleration Aa during accelerating operation of the position command signal 22. In this case as well, there can be calculated the position command signal parameter 321 of which residual vibration amplitude being generated is within the allowable positioning error 23 and at the same time the positioning time can be shortened.

Although the fourth embodiment employs linear interpolation as a method of interpolating the relation between the position command signal parameter Aa and the residual vibration amplitude GAa being generated on the basis of the residual vibration information 24, there can be employed any interpolation method using the monotonically increasing characteristic such as polynomial interpolation or interpolation using a trigonometric function with the monotonically increasing characteristic.

Although the fourth embodiment has described the configuration and the effect using the acceleration Aa during the accelerating operation of the position command signal 22 as the position command signal parameter 321, the acceleration Ab during the decelerating operation of the position command signal 22 can also be used as the position command signal parameter 321 so as to be able to produce exactly the same effect, since the command signal illustrated in FIG. 18 has the acceleration time ta equal to the deceleration time tb, and the relation Ab=−Aa is satisfied between the acceleration Aa during the accelerating operation and the acceleration Ab during the decelerating operation.

The position command signal generating unit 311 of the fourth embodiment uses the acceleration Aa during the accelerating operation of the position command signal 22 as the position command signal parameter 321 to thus be able to easily determine the shape of the position command signal 22 such that the velocity command signal 22a, which is the first derivative of the position command signal 22, has the triangular shape with the acceleration time ta equal to the deceleration time tb.

Fifth Embodiment

A fifth embodiment of the present invention will now be described. The second embodiment uses the position command signal 122, the first derivative of which being the velocity command signal 122a has the triangular shape with the acceleration time tc shorter than or equal to the deceleration time td. Although the second embodiment uses the deceleration time td of the position command signal 122 as the position command signal parameter determining the shape of the position command signal 122, another command signal parameter can also be used. The fifth embodiment describes an example of using another position command signal parameter 421.

Figure 21:
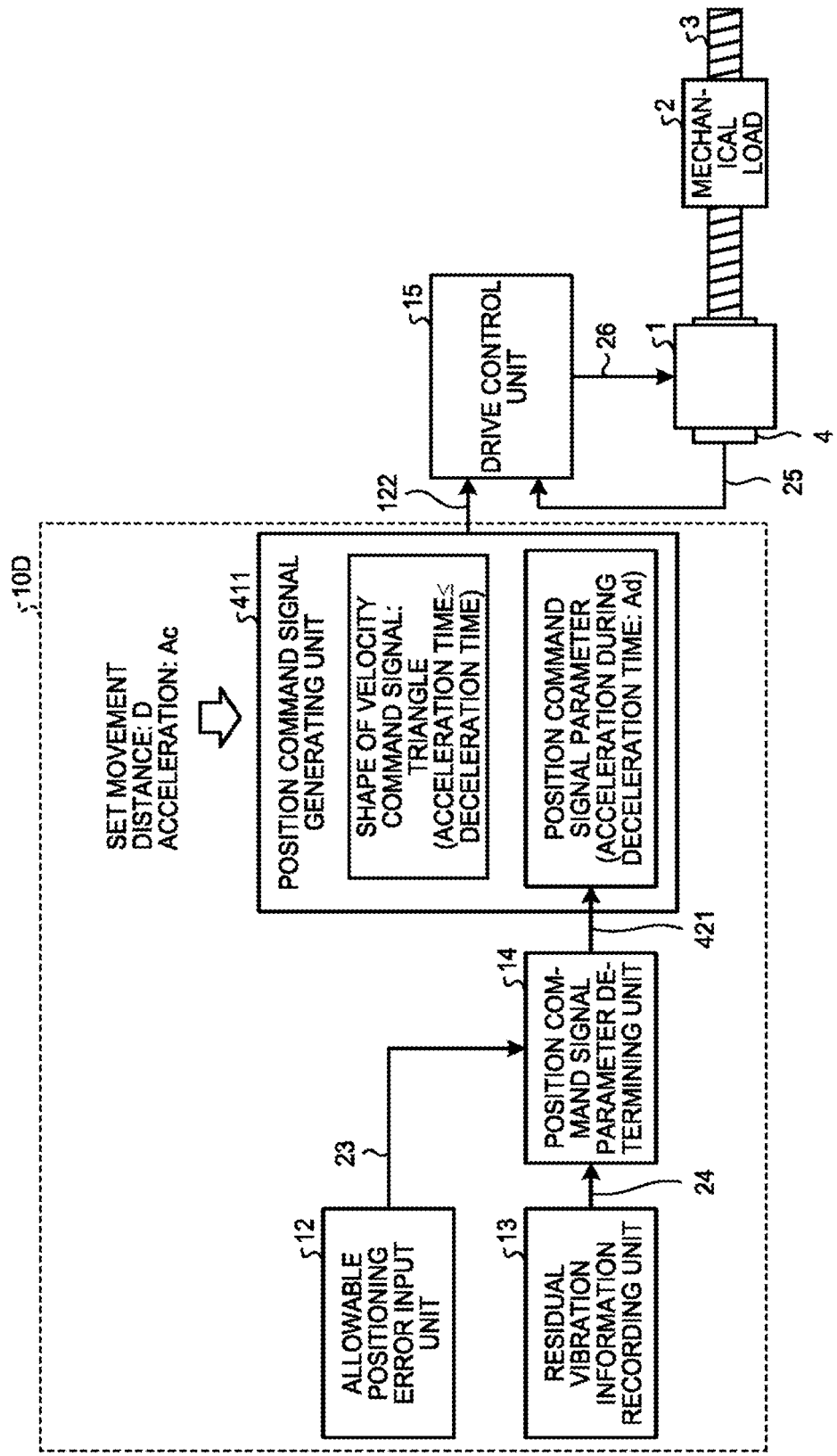
FIG. 21 is a block diagram of a positioning controller according to a fifth embodiment of the present invention.

FIG. 21 is a block diagram illustrating a positioning controller according to the fifth embodiment of the present invention. A positioning controller 10D of the fifth embodiment includes a position command signal generating unit 411 structured differently from that of the second embodiment. Overlaps with the positioning controller 10A of the second embodiment will be denoted by the same reference numerals and not be described in detail, whereby a difference between the embodiments will be described.

The positioning controller 10D includes the position command signal generating unit 411 as illustrated in FIG. 21. The position command signal generating unit 411 generates a position command signal 122 and outputs it to a drive control unit 15, the position command signal being generated on the basis of a set movement distance D input from the outside and acceleration Ac during an accelerating operation of an acceleration command signal 122b (FIG. 22) which is a second derivative of the position command signal 122.

Figure 22:
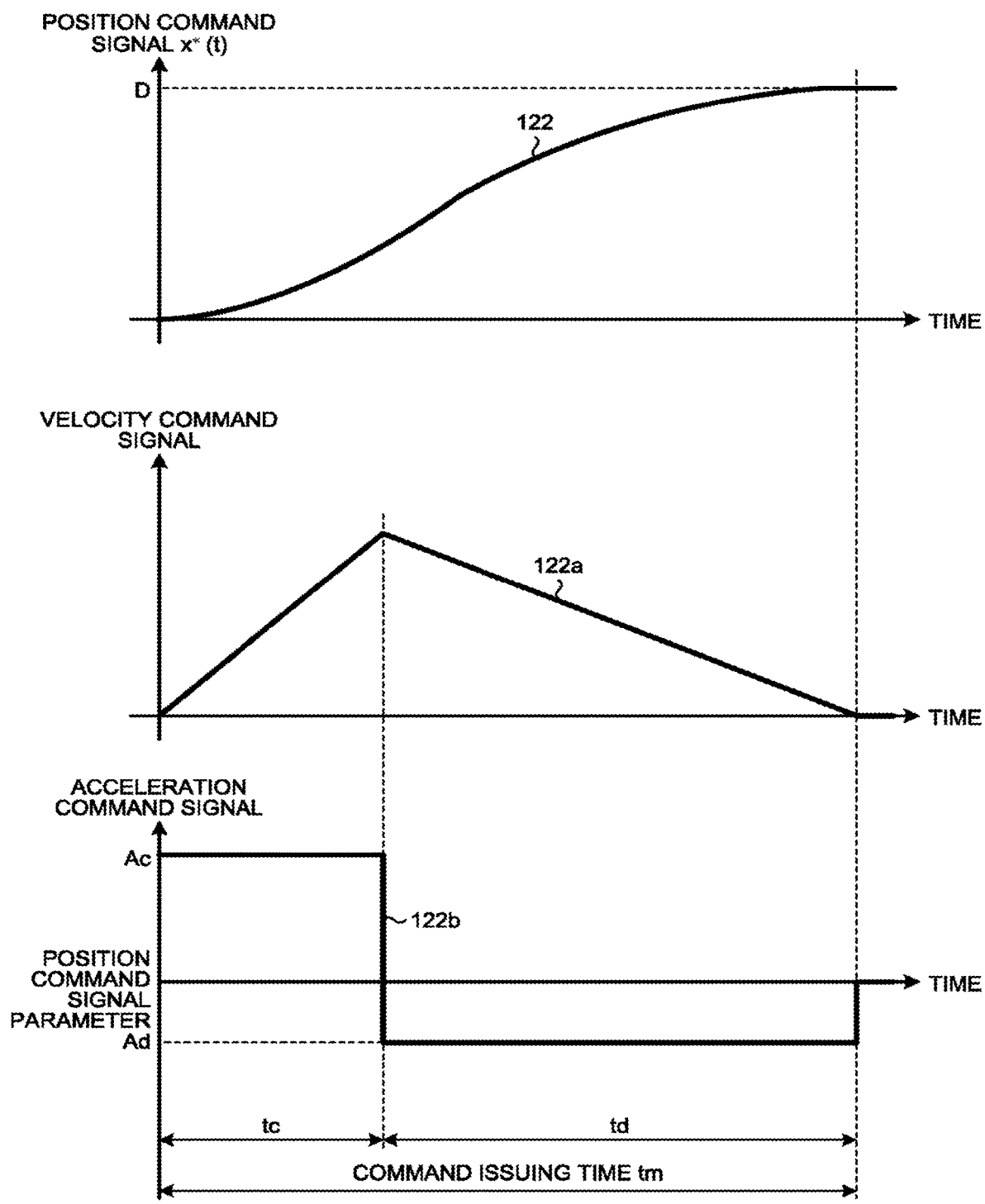
FIG. 22 is a set of graphs each illustrating the waveform of a command signal according to the fifth embodiment of the present invention.

FIG. 22 is a set of graphs each illustrating a waveform of a command signal according to the fifth embodiment. The shape of the position command signal 122 used in the fifth embodiment is similar to that of the second embodiment, where a velocity command signal 122a being a first derivative of the position command signal 122 has a triangular shape with an acceleration time tc having a value smaller than or equal to a deceleration time td. The velocity command signal 122a increases linearly during an accelerating operation and decelerates linearly during a decelerating operation. Moreover, the position command signal 122 is generated on the basis of the position command signal parameter 421 which is a parameter determining the shape of the position command signal 122. The fifth embodiment uses acceleration Ad during the decelerating operation in FIG. 22 as the position command signal parameter 421. Moreover, a reference character D in FIG. 22 represents the set movement distance, and a reference character Ac represents the acceleration during the accelerating operation. Note that in the fifth embodiment, the position command signal 122 which is a command for performing positioning control cannot be uniquely determined from just the set movement distance D, the acceleration Ac during the accelerating operation, and the information that the velocity command signal 122a has the triangular shape with the acceleration time tc shorter than or equal to the deceleration time td, but can be uniquely determined by further specifying the position command signal parameter 421. Specifically, the set movement distance D, the acceleration Ac during the accelerating operation, and the acceleration Ad during the decelerating operation which is the position command signal parameter are used so as to be able to calculate the acceleration time tc and the deceleration time td in FIG. 22 as tc=√(2AdD/(AcAd−Ac²))=(2AdD/(AcAd−Ac²))$^{1/2}$ and td=√(2AcD/(Ad²−AcAd))=(2AcD/(Ad²−AcAd))$^{1/2}$, respectively.

Figure 23:
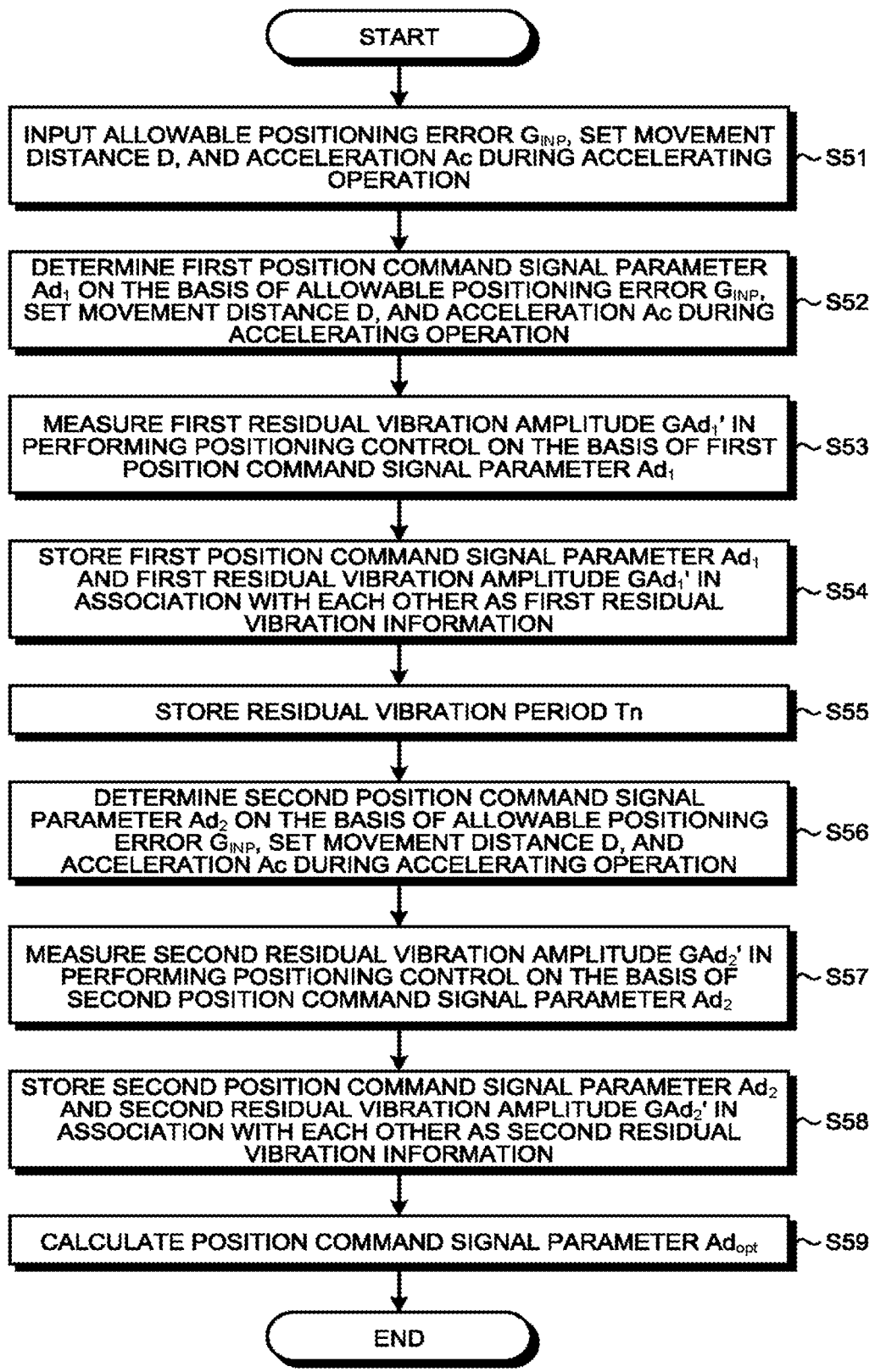
FIG. 23 is a flowchart illustrating operation procedures of the positioning controller according to the fifth embodiment of the present invention.

FIG. 23 is a flowchart illustrating operation procedures of the positioning controller according to the fifth embodiment. At step S51, an operator inputs a predetermined allowable positioning error $G_{INP}$ to an allowable positioning error input unit 12. The operator further inputs, to the position command signal generating unit 411, the predetermined set movement distance D and the acceleration Ac during the accelerating operation of the acceleration command signal 122b.

At step S52, a first position command signal parameter $Ad_1$ for positioning control is determined. As with the first embodiment, an example of the first position command signal parameter $Ad_1$ is the position command signal parameter 421 with which a residual vibration amplitude exceeds the allowable positioning error $G_{INP}$ (23). As a specific example, the parameter can be set to the value of the acceleration during the decelerating operation of the position command signal when the acceleration Ad during the decelerating operation is set equal to the acceleration Ac during the accelerating operation, or when the acceleration Ad during the decelerating operation is set as large as possible. It is also preferable to set the parameter to the maximum value that can be set as the position command signal parameter 421. In either case, it is desirable to set the position command signal parameter 421 large so as to facilitate vibration excitation and perform positioning control.

At step S53, the drive control unit 15 performs positioning control by using the position command signal 122 corresponding to the first position command signal parameter $Ad_1$. Moreover, a residual vibration information recording unit 13 measures a first residual vibration amplitude $GAd_1'$ generated at this time. Here, a residual vibration amplitude GAd' is an actual measured value of the maximum value of the residual vibration amplitude. At step S54, the residual vibration information recording unit 13 stores the first position command signal parameter $Ad_1$ and the first residual vibration amplitude $GAd_1'$ in association with each other as first residual vibration information 24. At step S55, the residual vibration information recording unit 13 stores a period Tn [s] of the residual vibration corresponding to the first residual vibration amplitude $GAd_1'$.

At step S56, a second position command signal parameter $Ad_2$ for positioning control is determined. An example of the second position command signal parameter $Ad_2$ is the position command signal parameter 421 of which residual vibration amplitude is within the allowable positioning error $G_{INP}$ (23). As a specific example, the second position command signal parameter $Ad_2$ can be set to the acceleration during the decelerating operation when the deceleration time td is equal to the residual vibration period Tn.

At step S57, the drive control unit 15 performs positioning control by using the position command signal 122 corresponding to the second position command signal parameter $Ad_2$. Moreover, the residual vibration information recording unit 13 measures a second residual vibration amplitude $GAd_2'$ generated at this time. At step S58, the residual vibration information recording unit 13 stores the second position command signal parameter $Ad_2$ and the second residual vibration amplitude $GAd_2'$ in association with each other as second residual vibration information 24. At step S59, on the basis of the first residual vibration information 24 and the second residual vibration information 24 stored in the residual vibration information recording unit 13, a position command signal parameter determining unit 14 uses the following Expression 28 to calculate a position command signal parameter $Ad_{opt}$ of which residual vibration amplitude is within the allowable positioning error $G_{INP}$ (23) and at the same time the positioning time can be shortened.

$$Ad_{opt} = \frac{G_{INP} - GAd_1'}{GAd_1' - GAd_2'}(Ad_1 - Ad_2) + Ad_1 \qquad \text{[Expression 28]}$$

The position command signal parameter $Ad_{opt}$ is calculated as described above by the processing illustrated in the flowchart of FIG. 23 to thus be able to suppress the residual vibration amplitude within the allowable positioning error $G_{INP}$ (23), the residual vibration amplitude being generated at the time of performing positioning control to the set movement distance. With the residual vibration amplitude falling within the allowable positioning error $G_{INP}$ (23), the positioning accuracy required for positioning control is satisfied even when vibration remains to thus be able to obtain the position command signal parameter $Ad_{opt}$ (421) of which positioning time can be shortened.

Effects of the fifth embodiment will now be described. First, an analysis is made to clarify the relation between the position command signal parameter Ad used in the fifth embodiment and the residual vibration amplitude. As described above, the velocity command signal 122a which is the first derivative of the position command signal 122 used in the fifth embodiment has the triangular shape with the acceleration time to having the value smaller than or equal to the deceleration time td, as illustrated in FIG. 22. A Laplace transform representation X*(s) of a signal x*(t) with respect to time t of the position command signal 122 is expressed by the following Expression 29 on the basis of the position command signal parameter Ad, the set movement distance D, and the acceleration Ac during the accelerating operation. Here, "s" represents a Laplace operator.

$$X^*(s) = \frac{Ac}{s^3}$$ [Expression 29]

$$\left(1 - \frac{Ac+Ad}{Ac}e^{-\sqrt{2D\frac{Ac}{Ad(Ac+Ad)}}\cdot s} + \frac{Ad}{Ac}e^{-\sqrt{2D\frac{Ac+Ad}{AcAd}}\cdot s}\right)$$

On the other hand, the relation between a detected position signal x (t) and the position command signal x* (t) at the time of performing positioning control on a mechanical load 2 affected by residual vibration can be approximated by Expression 4 as described in the first embodiment so that, by substituting Expression 29 into Expression 4 and executing an inverse Laplace transformation, the detected position signal x (t) is expressed by the following Expression 30 after the position command signal is initiated and reaches the set movement distance D.

$$x(t) = \left[Ac \cdot Z_1 \sqrt{\{\beta + Z_2\alpha\}^2 + \{\alpha - Z_2\beta\}^2}\right]$$ [Expression 30]

$$e^{-\zeta\omega_n t}\sin(\omega_d t + \psi) + D$$

Note that $\alpha$, $\beta$, $\omega_d$, $Z_1$, $Z_2$, $\Psi$, and the like are expressed by the following Expressions 31 using the position command signal parameter Ad, a residual vibration frequency $\omega_n$, and a damping ratio $\zeta$.

$$\alpha = 1 - \frac{Ac+Ad}{Ac}e^{\zeta\omega_p\sqrt{2D\frac{Ac}{Ac(Ac+Ad)}}}$$ [Expression 31]

$$\cos\omega_d\left(\sqrt{2D\frac{Ac}{Ac(Ac+Ad)}}\right) +$$

$$\frac{Ad}{Ac}e^{\zeta\omega_p\sqrt{2D\frac{Ac+Ad}{AcAd}}}\cos\omega_d\left(\sqrt{2D\frac{Ac+Ad}{AcAd}}\right)$$

$$\beta = -\frac{Ac+Ad}{Ac}e^{\zeta\omega_p\sqrt{2D\frac{Ac}{Ac(Ac+Ad)}}}\sin$$

$$\omega_d\left(\sqrt{2D\frac{Ac}{Ac(Ac+Ad)}}\right) +$$

$$\frac{AD}{AC}e^{\zeta\omega_p\sqrt{2D\frac{Ac+Ad}{AcAd}}}\sin\omega_d\left(\sqrt{2D\frac{Ac+Ad}{AcAd}}\right)$$

$$\omega_d = \sqrt{1-\zeta^2}\,\omega_n,\, Z_1 = \frac{1-4\zeta^2}{\omega_n^2},\, Z_2 = \frac{3\zeta - 4\zeta^3}{(1-4\zeta^2)\sqrt{1-\zeta^2}}$$

$$\psi =$$

$$\begin{cases} \pi - \arcsin\left(\frac{\{\alpha - Z_2B\}}{\sqrt{\{\beta+Z_2\alpha\}^2 + \{\alpha - Z_2\beta\}^2}}\right) & (\beta + Z_2\alpha < 0) \\ \arcsin\left(\frac{\{\alpha - Z_2\beta\}}{\sqrt{\{\beta+Z_2\alpha\}^2 + \{\alpha - Z_2\beta\}^2}}\right) & (\beta + Z_2\alpha \geq 0) \end{cases}$$

As a result, the detected position signal x (t) takes on a vibrational behavior centered on the set movement distance D and with the amplitude being the value expressed in square brackets [ ] of Expression 30. An analytical value GAd of the maximum value of the residual vibration amplitude of the detected position signal x (t) in performing positioning control is expressed by the following Expression 32 while using the position command signal parameter Ad, the set movement distance D, the acceleration Ac during the accelerating operation, the residual vibration frequency $\omega_n$, and the damping ratio $\zeta$. The analytical value GAd of the maximum value of the residual vibration amplitude is hereinafter simply referred to as a residual vibration amplitude GAd.

$$GAd = Z_1\sqrt{\{\beta + Z_2\alpha\}^2 + \{\alpha - Z_2\beta\}^2}$$ [Expression 32]

Figure 24:
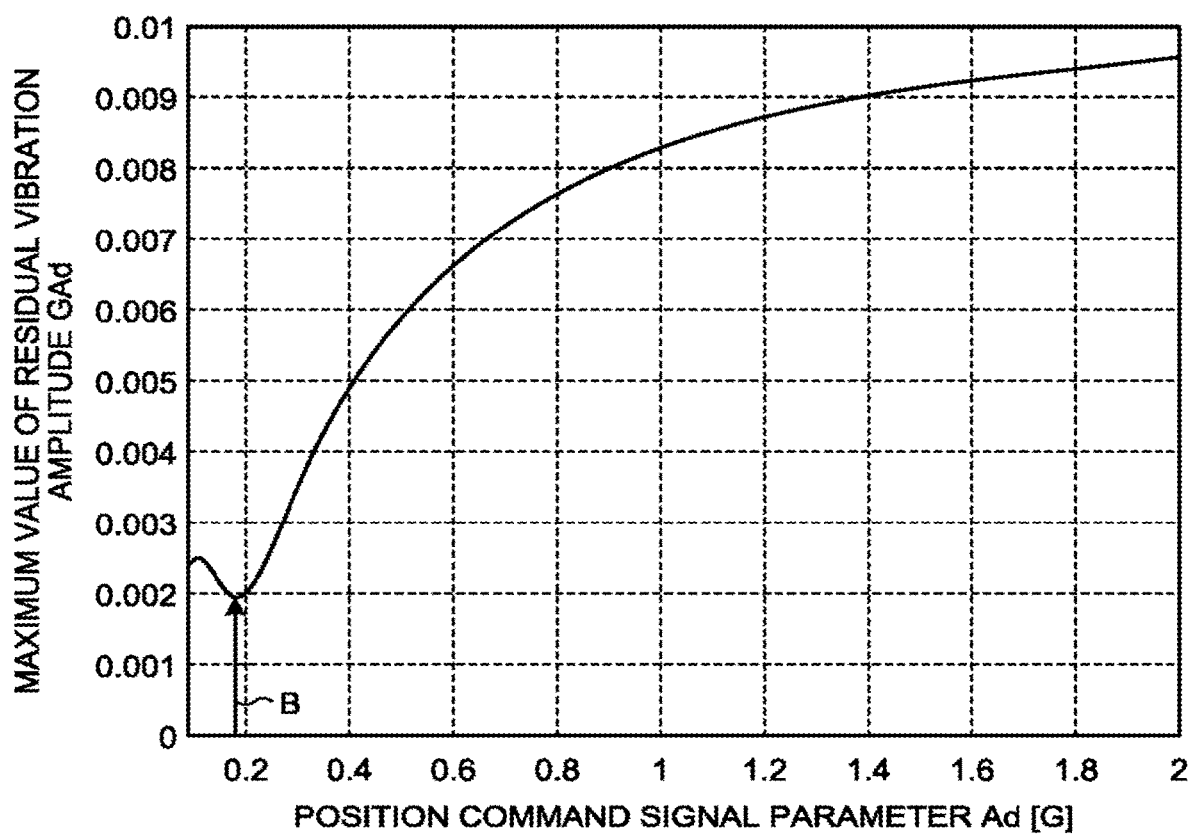
FIG. 24 is a graph illustrating the relation between the position command signal parameter of a command signal and residual vibration amplitude according to the fifth embodiment of the present invention.

In order to understand the relation between the residual vibration amplitude GAd and the position command signal parameter Ad, FIG. 24 illustrates the relation between the residual vibration amplitude GAd and the position command signal parameter Ad when the residual vibration period Tn=100 ms ($\omega_n$=2π/Tn [rad/s]), the damping ratio $\zeta$=0.1, the set movement distance D=10 mm, and the acceleration Ac=3.0 G during the accelerating operation are each substituted into the above Expression 32.

In the fifth embodiment as well, as illustrated in FIG. 24, the residual vibration is minimum when the position command signal parameter Ad takes the same value as the acceleration at the time the deceleration time td is equal to the residual vibration period of 100 ms, or when Ad=(Ac−√(Ac²+8D·Ac/Tn²))/2 (the position indicated by a symbol B in FIG. 24). In a range where the position command signal parameter Ad is larger than the acceleration at the time residual vibration is minimum, the residual vibration amplitude increases monotonically as the position command signal parameter Ad increases. Although FIG. 24 illustrates the example with the residual vibration period Tn=100 ms ($\omega_n$=2π/Tn [rad/s]), the damping ratio $\zeta$=0.1, the set movement distance D=10 mm, and the acceleration Ac=3.0 G during the accelerating operation, the characteristic between the position command signal parameter and the residual vibration amplitude is a characteristic that is widely established independently from the values of the residual vibration period, the damping ratio, the set movement distance, and the acceleration during the accelerating operation. The characteristic that the residual vibration amplitude increases monotonically as the position command signal parameter Ad increases in using the position command signal 122 of the fifth embodiment also holds true for an actual measured value for the reason similar to that according to the first embodiment.

Figure 25:
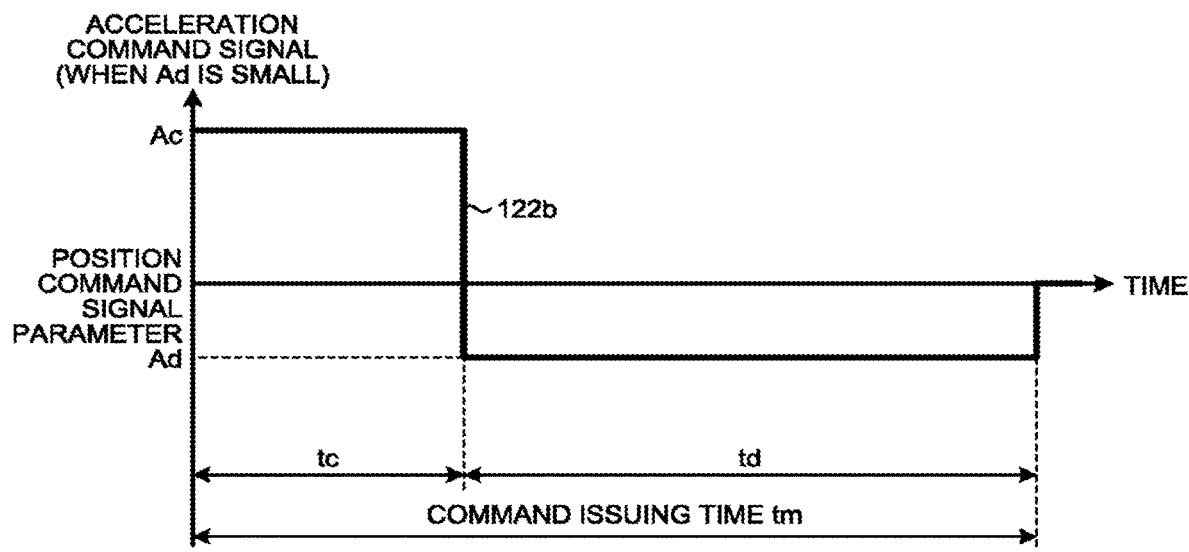
FIG. 25 is a graph illustrating the relation between the position command signal parameter of a command signal and command issuing time according to the fifth embodiment of the present invention.
Figure 26:
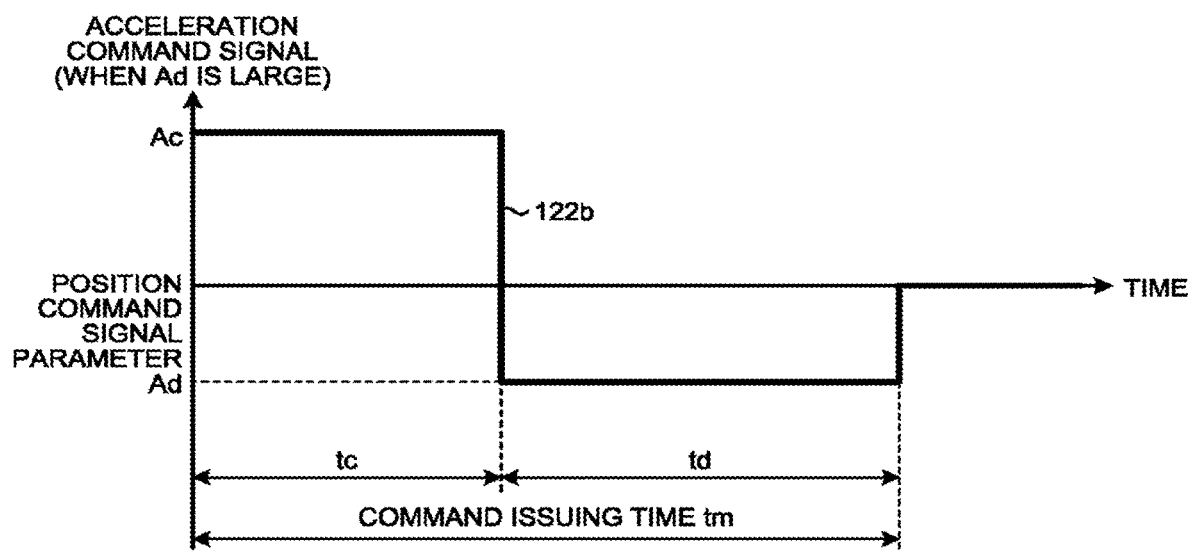
FIG. 26 is a graph illustrating another relation between the position command signal parameter of a command signal and command issuing time according to the fifth embodiment of the present invention.

In the fifth embodiment, the position command signal parameter 421 corresponds to the acceleration Ad during the decelerating operation of the position command signal 122. FIG. 25 illustrates a change in the velocity command signal when the position command signal parameter Ad is small, and FIG. 26 illustrates a change in the velocity command signal when the position command signal parameter Ad is large. As illustrated in FIGS. 25 and 26, an increase in the position command signal parameter Ad causes reduction in the deceleration time td of the command signal, thereby shortening a command issuing time tm. The positioning time can thus be shortened when the increase in the position command signal parameter Ad does not cause the residual vibration amplitude to exceed the allowable positioning error 23.

An increase in the position command signal parameter Ad causes the residual vibration amplitude to increase monotonically in the actual measured value. This characteristic can be used to obtain the position command signal parameter 421 of which residual vibration amplitude matches the allowable positioning error 23. Accordingly, positioning control can be performed by using the position command signal parameter 421 so as to be able to achieve the object of shortening the positioning time as much as possible while suppressing the residual vibration amplitude within the allowable positioning error 23.

As with the first embodiment, the residual vibration information recording unit 13 stores a plurality of pieces of the residual vibration information 24 while associating the residual vibration amplitude, which is measured at the time of performing positioning control on the basis of the position command signal parameter Ad, with the corresponding position command signal parameter Ad. Accordingly, with the use of the characteristic that the residual vibration amplitude increases monotonically as the position command signal parameter Ad increases, one can easily calculate and determine the position command signal parameter 421 of which residual vibration amplitude matches the allowable positioning error 23 from the plurality of pieces of the residual vibration information 24 stored in the residual vibration information recording unit 13.

A linear interpolation function expressing the relation between the position command signal parameter Ad and the residual vibration amplitude GAd' is expressed by the following Expression 33 when two pieces of the residual vibration information 24 can be used as the plurality of pieces of the residual vibration information 24, the two pieces of the residual vibration information being the first residual vibration amplitude $GAd_1'$ which is the maximum value of the residual vibration amplitude measured when positioning control is performed with the first position command signal parameter $Ad_1$ and the second residual vibration amplitude $GAd_2'$ which is the maximum value of the residual vibration amplitude measured when positioning control is performed with the second position command signal parameter $Ad_2$.

$$Ad_{opt} = \frac{GAd' - GAd_1'}{GAd_1' - GAd_2'}(Ad_1 - Ad_2) + Ad_1 \qquad [\text{Expression 33}]$$

Accordingly, the position command signal parameter $Ad_{opt}$ of which residual vibration amplitude matches the allowable positioning error $G_{INP}$ can be calculated by substituting $G_{INP}$ for GAd' in Expression 33 and expressed by Expression 28 above.

Here, the processing from steps S52 to S54 in the flowchart of FIG. 23 corresponds to the processing performed by the residual vibration information recording unit 13 to obtain the first position command signal parameter $Ad_1$ and the first residual vibration amplitude $GAd_1'$ used to calculate the position command signal parameter 421 of which residual vibration amplitude matches the allowable positioning error 23.

The processing from steps S56 to S58 in the flowchart of FIG. 23 corresponds to the processing performed by the residual vibration information recording unit 13 to obtain the second position command signal parameter $Ad_2$ and the second residual vibration amplitude $GAd_2'$ used to calculate the position command signal parameter 421 of which residual vibration amplitude matches the allowable positioning error 23.

The processing of step S59 in the flowchart of FIG. 23 corresponds to the processing performed by the position command signal parameter determining unit 14 to calculate and determine the position command signal parameter $Ad_{opt}$ of which residual vibration amplitude matches the allowable positioning error $G_{INP}$.

In the fifth embodiment, the velocity command signal 122a which is the first derivative of the position command signal 122 has the triangular shape with the acceleration time tc having the value smaller than or equal to the deceleration time td as with the second embodiment, where the position command signal parameter 421 is the acceleration Ad during the decelerating operation of the position command signal 122. In this case as well, there can be calculated the position command signal parameter 421 of which residual vibration amplitude being generated is within the allowable positioning error 23 and at the same time the positioning time can be shortened.

Although the fifth embodiment employs linear interpolation as a method of interpolating the relation between the position command signal parameter Ad and the residual vibration amplitude GAd being generated on the basis of the residual vibration information 24, there can be employed any interpolation method using the monotonically increasing characteristic such as polynomial interpolation or interpolation using a trigonometric function with the monotonically increasing characteristic.

The position command signal generating unit 411 of the fifth embodiment uses the acceleration Ad during the decelerating operation of the position command signal 122 as the position command signal parameter 421 to thus be able to easily determine the shape of the position command signal 122 such that the velocity command signal 122a, which is the first derivative of the position command signal 122, has the triangular shape with the acceleration time tc shorter than or equal to the deceleration time td.

The triangular velocity command signal with the acceleration Ac constant during the accelerating operation and the value of the acceleration time tc smaller than or equal to the deceleration time td can be subjected to time reversal to turn into a triangular velocity command signal with acceleration Ad constant during the decelerating operation and the value of the deceleration time td smaller than or equal to the acceleration time tc. Since Fourier transforms of the commands differ only by the conjugate multiplication, the commands have frequency components being the same in magnitude and also have the same influence on the ease of vibration excitation. Therefore, although the fifth embodiment has described the configuration and the effect using the acceleration Ad during the decelerating operation as the position command signal parameter 421 while fixing the acceleration Ac during the accelerating operation, a similar effect can also be produced by fixing the acceleration Ad during the decelerating operation and using the acceleration Ac during the accelerating operation as the position command signal parameter 421.

Sixth Embodiment

A sixth embodiment of the present invention will now be described. The third embodiment uses the position command signal 222, the first derivative of which being the velocity command signal 222a has the trapezoidal shape with the constant velocity time tf as well as the acceleration time te equal to the deceleration time tg. Although the third embodiment uses the sum of the acceleration time te and the constant velocity time tf of the position command signal as the position command signal parameter determining the shape of the position command signal 222, another position command signal parameter can also be used. The sixth embodiment describes an example of using another position command signal parameter 521.

Figure 27:
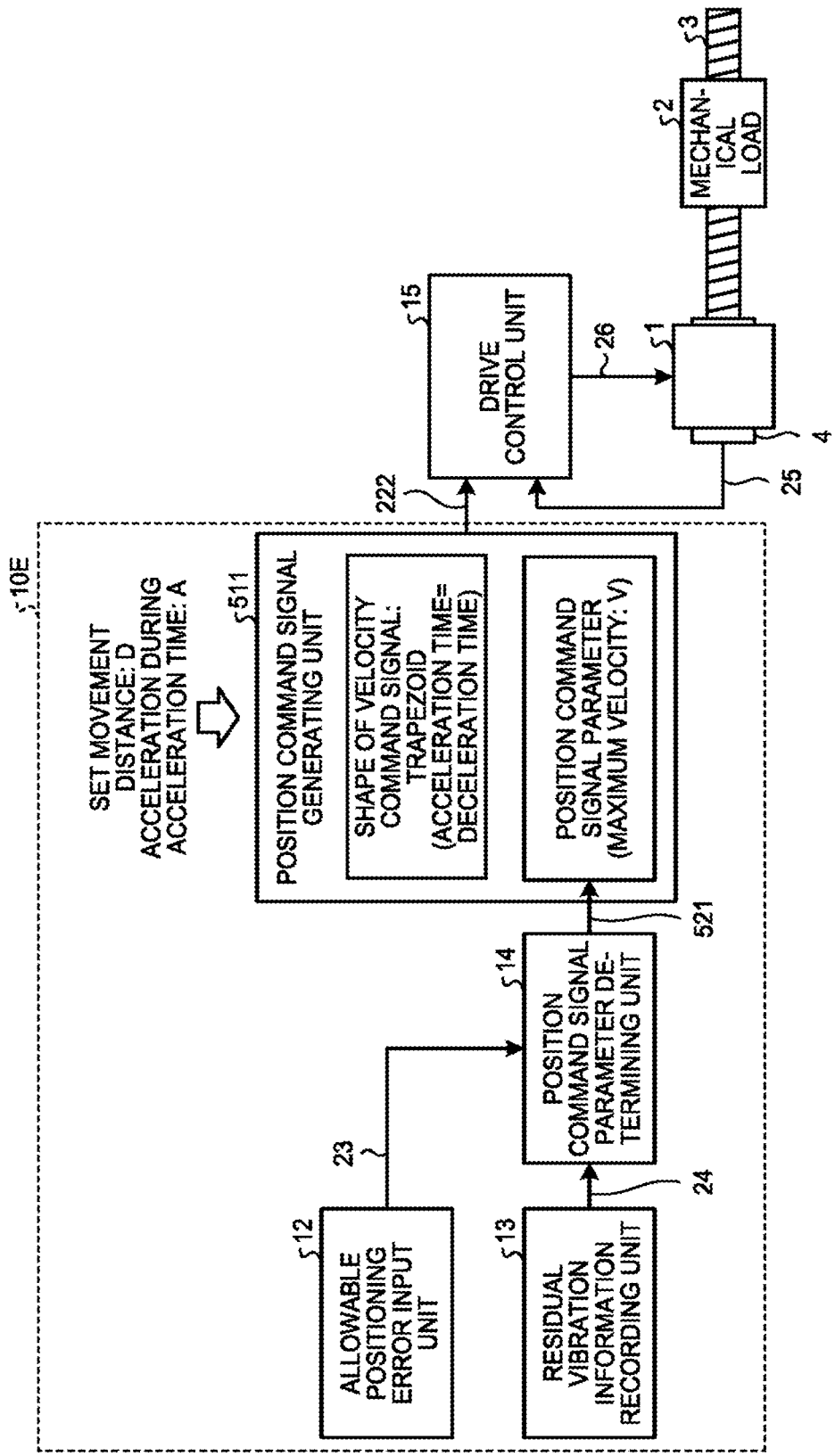
FIG. 27 is a block diagram of a positioning controller according to a sixth embodiment of the present invention.

FIG. 27 is a block diagram illustrating a positioning controller according to the sixth embodiment of the present invention. A positioning controller 10E of the sixth embodiment includes a position command signal generating unit 511 structured differently from that of the first embodiment. Overlaps with the positioning controller 10 of the first embodiment will be denoted by the same reference numerals and not be described in detail, whereby a difference between the embodiments will be described.

The positioning controller 10E includes the position command signal generating unit 511 as illustrated in FIG. 27. The position command signal generating unit 511 generates a position command signal 222 and outputs it to a drive control unit 15, the position command signal being generated on the basis of a set movement distance D input from the outside and acceleration A during an accelerating operation of an acceleration command signal 222b (FIG. 28) which is a second derivative of the position command signal 222.

Figure 28:
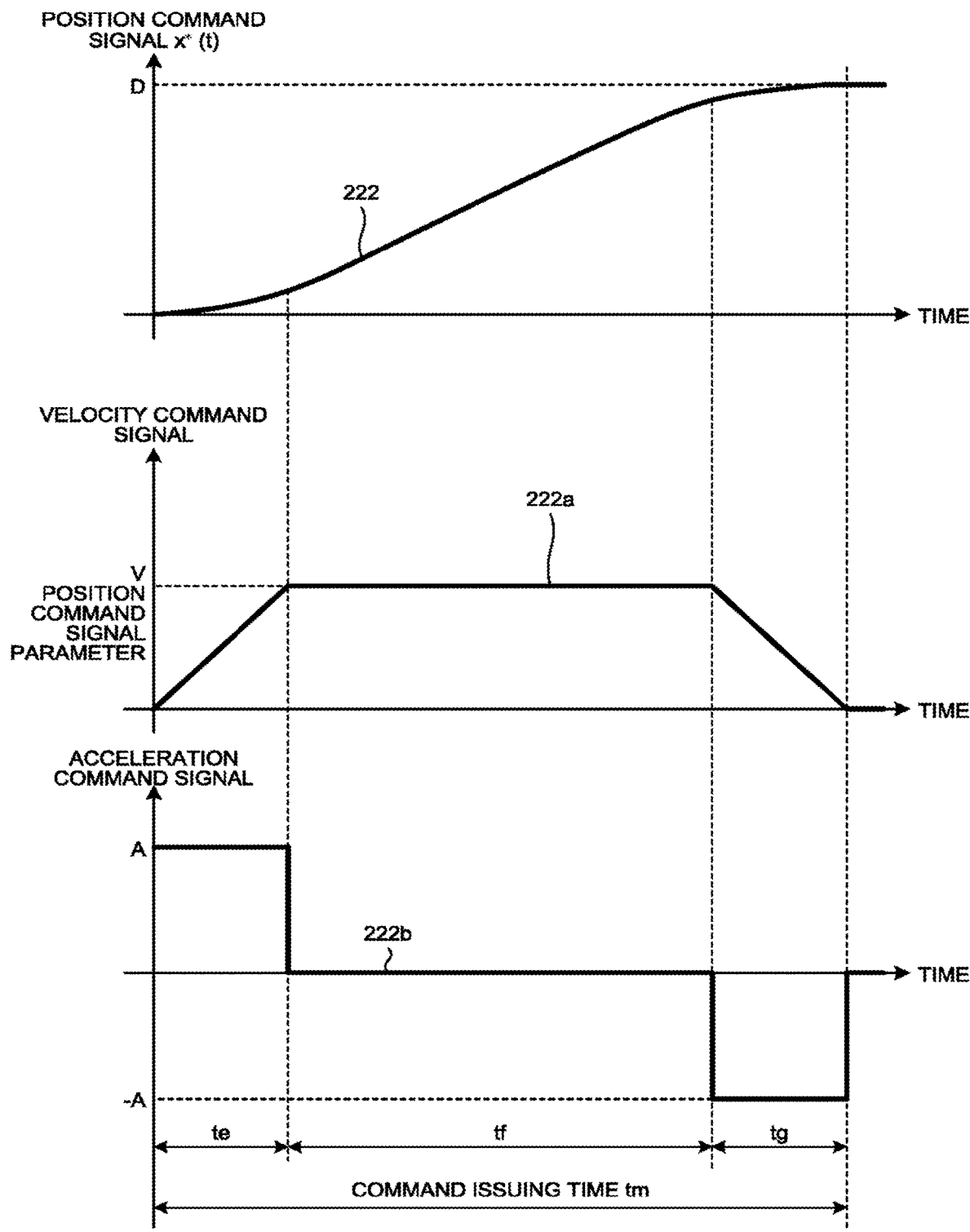
FIG. 28 is a set of graphs each illustrating a waveform of a command signal according to the sixth embodiment of the present invention.

FIG. 28 is a set of graphs each illustrating a waveform of a command signal according to the sixth embodiment. The position command signal 222 used in the sixth embodiment has a shape similar to that of the third embodiment, where the velocity command signal 222a being the first derivative of the position command signal 222 has a trapezoidal shape with a constant velocity time tf as well as an acceleration time te equal to a deceleration time tg. The velocity command signal 222a increases linearly during an accelerating operation, is unchanged during a constant velocity operation, and decelerates linearly during a decelerating operation. Moreover, the position command signal 222 is generated on the basis of the position command signal parameter 521 which is a parameter determining the shape of the position command signal 222. The sixth embodiment uses, as the position command signal parameter 521, maximum velocity V of the velocity command signal 222a being the first derivative of the position command signal 222 in FIG. 28. Moreover, a reference character D in FIG. 28 represents the set movement distance, and a reference character A represents the acceleration during the accelerating operation. Note that in the sixth embodiment, the position command signal 222 which is a command for performing positioning control cannot be uniquely determined from just the set movement distance D, the acceleration A during the accelerating operation, and the information that the velocity command signal 222a has the trapezoidal shape with the acceleration time te equal to the deceleration time tg, but can be uniquely determined by further specifying the position command signal parameter 521. Specifically, the set movement distance D, the acceleration A during the accelerating operation, and the maximum velocity V being the position command signal parameter are used so as to be able to calculate the acceleration time te, the constant velocity time tf, and the deceleration time tg in FIG. 28 as te=V/A, tf=(AD−V²)/AV, and tg=V/A, respectively. With the acceleration time te>0 and the constant velocity time tf≥0, the maximum velocity V takes the value according to the following Expression 34 using the set movement distance D and the acceleration A during the accelerating operation.

$$0 < V \leq \sqrt{AD} \qquad \text{[Expression 34]}$$

Figure 29:
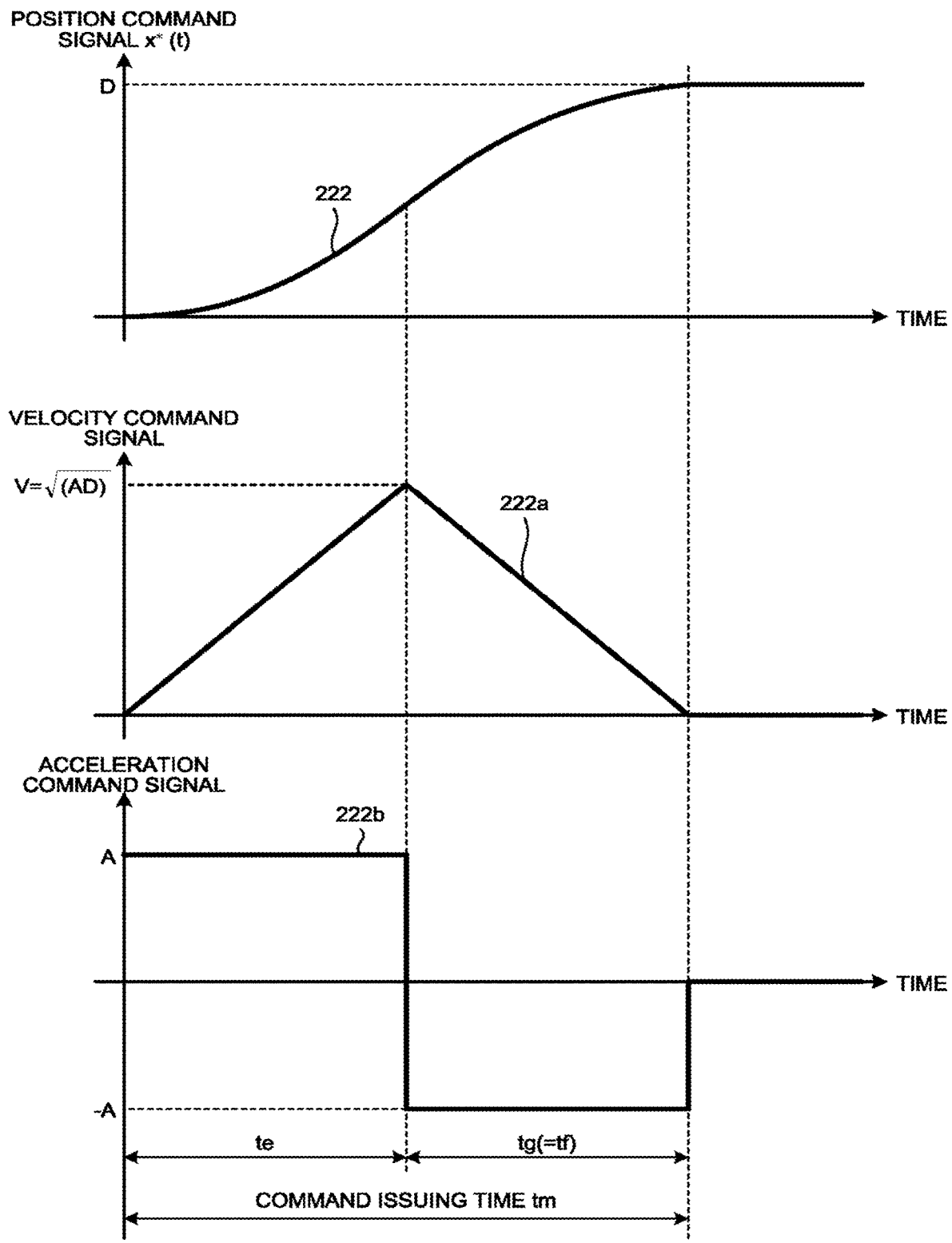
FIG. 29 is a set of graphs each illustrating another waveform of the command signal according to the sixth embodiment of the present invention.

FIG. 29 illustrates the shape of the position command signal 222 when the maximum velocity V=√(AD)=(AD)^{1/2}. The constant velocity time equals tf=0 when V=√(AD), so that the velocity command signal 222a has not a trapezoidal shape but a triangular shape with the acceleration time equal to the constant velocity time, and has the maximum velocity of √(AD).

Figure 30:
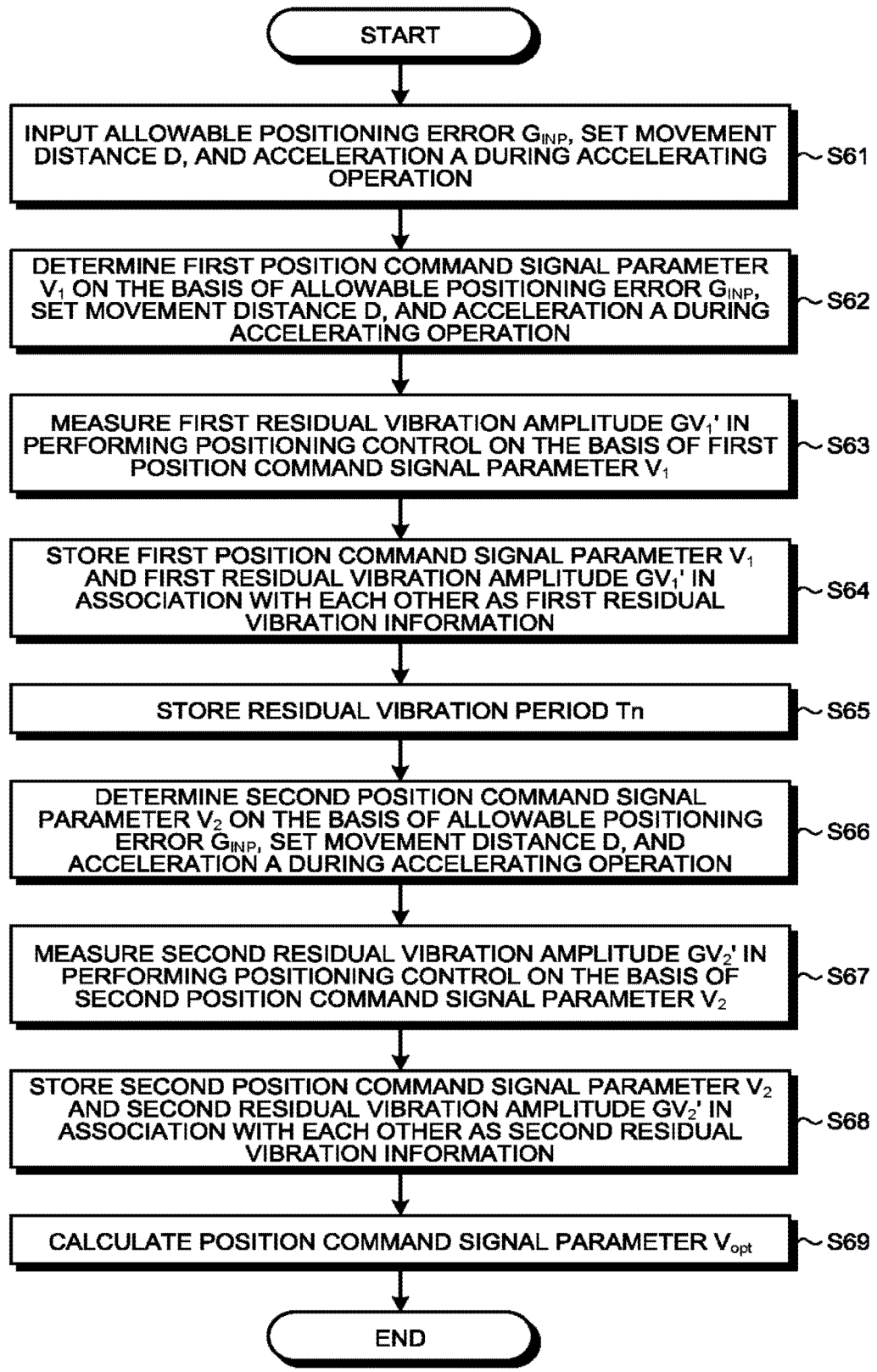
FIG. 30 is a flowchart illustrating operation procedures of the positioning controller according to the sixth embodiment of the present invention.

FIG. 30 is a flowchart illustrating operation procedures of the positioning controller according to the sixth embodiment. At step S61, an operator inputs a predetermined allowable positioning error $G_{INP}$ to an allowable positioning error input unit 12. The operator further inputs, to the position command signal generating unit 511, the predetermined set movement distance D and the acceleration A during the accelerating operation of the acceleration command signal 222b.

At step S62, a first position command signal parameter $V_1$ for positioning control is determined. As with the first embodiment, an example of the first position command signal parameter $V_1$ is the position command signal parameter 521 with which a residual vibration amplitude exceeds the allowable positioning error $G_{INP}$ (23). As a specific example, the parameter can be set to the value of the maximum velocity of the position command signal when the constant velocity time equals tf=0. It is also preferable to set the parameter to the maximum value that can be set as the position command signal parameter 521. In either case, it is desirable to set the position command signal parameter 521 large so as to facilitate vibration excitation and perform positioning control.

At step S63, the drive control unit 15 performs positioning control by using the position command signal 222 corresponding to the first position command signal parameter $V_1$. Moreover, a residual vibration information recording unit 13 measures a first residual vibration amplitude $GV_1'$ generated at this time. Here, a residual vibration amplitude $GV'$ is an actual measured value of the maximum value of the residual vibration amplitude. At step S64, the residual vibration information recording unit 13 stores the first position command signal parameter $V_1$ and the first residual vibration amplitude $GV_1'$ in association with each other as first residual vibration information 24. At step S65, the residual vibration information recording unit 13 stores a period Tn [s] of the residual vibration corresponding to the first residual vibration amplitude $GV_1'$.

At step S66, a second position command signal parameter $V_2$ for positioning control is determined. An example of the second position command signal parameter $V_2$ is the position command signal parameter 521 of which residual vibration amplitude is within the allowable positioning error $G_{INP}$ (23). As a specific example, the second position command signal parameter $V_2$ can be set to a value ($V_2$=D/Tn) of the maximum velocity of the position command signal when a sum tef of the acceleration time te and the constant velocity time tf is equal to the residual vibration period Tn.

At step S67, the drive control unit 15 performs positioning control by using the position command signal 222 corresponding to the second position command signal parameter $V_2$. Moreover, the residual vibration information recording unit 13 measures a second residual vibration amplitude $GV_2'$ generated at this time. At step S68, the residual vibration information recording unit 13 stores the second position command signal parameter $V_2$ and the second residual vibration amplitude $GV_2'$ in association with each other as second residual vibration information 24. At step S69, on the basis of the first residual vibration information 24 and the second residual vibration information 24 stored in the residual vibration information recording unit 13, a position command signal parameter determining unit 14 uses the following Expression 35 to calculate a position command signal parameter $V_{opt}$ of which residual vibration amplitude is within the allowable positioning error $G_{INP}$ (23) and at the same time the positioning time can be shortened.

$$V_{opt} = \frac{G_{INP} - GV_1'}{GV_1' - GV_2'}(V_1 - V_2) + V_1 \quad \text{[Expression 35]}$$

The position command signal parameter $V_{opt}$ is calculated as described above by the processing illustrated in the flowchart of FIG. 30 to thus be able to suppress the residual vibration amplitude within the allowable positioning error $G_{INP}$ (23), the residual vibration amplitude being generated at the time of performing positioning control to the set movement distance. With the residual vibration amplitude falling within the allowable positioning error $G_{INP}$ (23), the positioning accuracy required for positioning control is satisfied even when vibration remains to thus be able to obtain the position command signal parameter $V_{opt}$ (521) of which positioning time can be shortened.

Effects of the sixth embodiment will now be described. First, an analysis is made to clarify the relation between the position command signal parameter V used in the sixth embodiment and the residual vibration amplitude. The velocity command signal 222a which is the first derivative of the position command signal 222 used in the sixth embodiment has the trapezoidal shape with the constant velocity time tf as well as the acceleration time te equal to the deceleration time tg as illustrated in FIG. 28. A Laplace transform representation X* (s) of a signal x* (t) with respect to time t of the position command signal 222 is expressed by the following Expression 36 on the basis of the position command signal parameter V, the set movement distance D, and the acceleration A during the accelerating operation. Here, "s" represents a Laplace operator.

$$X^*(s) = \frac{A}{s^3}\left(1 - e^{-\frac{2q^2}{1-q}\cdot\frac{D}{V}s} + e^{-\frac{1-q-4q^2}{1-q}\cdot\frac{D}{V}s}\right) \quad \text{[Expression 36]}$$

In this case, "q" is expressed by the following Expression 37 using the position command signal parameter V, the set movement distance D, and the acceleration A during the accelerating operation.

$$q = \frac{V}{2\sqrt{AD} + 1} \quad \text{[Expression 37]}$$

On the other hand, the relation between a detected position signal x (t) and the position command signal x* (t) at the time of performing positioning control on a mechanical load 2 affected by residual vibration can be approximated by Expression 4 as described in the first embodiment so that, by substituting Expression 36 into Expression 4 and executing an inverse Laplace transformation, the detected position signal x (t) is expressed by the following Expression 38 after the position command signal is initiated and reaches the set movement distance D.

$$x(t) = \left[AZ_1\sqrt{\{\beta + Z_2\alpha\}^2 + \{\alpha - Z_2\beta\}^2}\right] \quad \text{[Expression 38]}$$
$$e^{-\zeta\omega_n t}\sin(\omega_d t + \psi) + D$$

Note that $\alpha$, $\beta$, $\omega_d$, $Z_1$, $Z_2$, $\Psi$, and the like are expressed by the following Expressions 39 using the position command signal parameter V, a residual vibration frequency $\omega_n$, and a damping ratio $\zeta$.

$$\alpha = 1 - e^{\zeta\omega_p\frac{2q^2}{1-q}\cdot\frac{D}{V}}\cos\omega_d\left(\zeta\omega_p\frac{2q^2}{1-q}\cdot\frac{D}{V}\right) + \quad \text{[Expression 39]}$$
$$e^{\zeta\omega_p\frac{1-q-4q^2}{1-q}\cdot\frac{D}{V}}\cos\omega_d\left(\zeta\omega_p\frac{1-q-4q^2}{1-q}\cdot\frac{D}{V}\right)$$

$$\beta = -e^{\zeta\omega_p\frac{2q^2}{1-q}\cdot\frac{D}{V}}\sin\omega_d\left(\zeta\omega_p\frac{2q^2}{1-q}\cdot\frac{D}{V}\right) +$$
$$e^{\zeta\omega_p\frac{1-q-4q^2}{1-q}\cdot tef}\sin\omega_d\left(\zeta\omega_p\frac{1-q-4q^2}{1-q}\cdot\frac{D}{V}\right)$$

$$\omega_d = \sqrt{1-\zeta^2}\,\omega_n,\ Z_1 = \frac{1-4\zeta^2}{\omega_n^2},\ Z_2 = \frac{3\zeta - 4\zeta^2}{(1-4\zeta^2)\sqrt{1-\zeta^2}}$$

$$\psi = \begin{cases} \pi - \arcsin\left(\dfrac{\{\alpha - Z_2\beta\}}{\sqrt{\{\beta + Z_2\alpha\}^2 + \{\alpha - Z_2\beta\}^2}}\right) & (\beta + Z_2\alpha < 0) \\ \arcsin\left(\dfrac{\{\alpha - Z_2\beta\}}{\sqrt{\{\beta + Z_2\alpha\}^2 + \{\alpha - Z_2\beta\}^2}}\right) & (\beta + Z_2\alpha \geq 0) \end{cases}$$

As a result, the detected position signal x (t) takes on a vibrational behavior centered on the set movement distance D and with the amplitude being the value expressed in square brackets [ ] of Expression 38. An analytical value GV of the maximum value of the residual vibration amplitude of the detected position signal x (t) in performing positioning control is expressed by the following Expression 40 while using the position command signal parameter V, the set movement distance D, the acceleration A during the accelerating operation, the residual vibration frequency $\omega_n$, and the damping ratio $\zeta$. The analytical value GV of the maximum value of the residual vibration amplitude is hereinafter simply referred to as a residual vibration amplitude GV.

$$GV = Z_1\sqrt{\{\beta + Z_2\alpha\}^2 + \{\alpha - Z_2\beta\}^2} \quad \text{[Expresion 40]}$$

Figure 31:
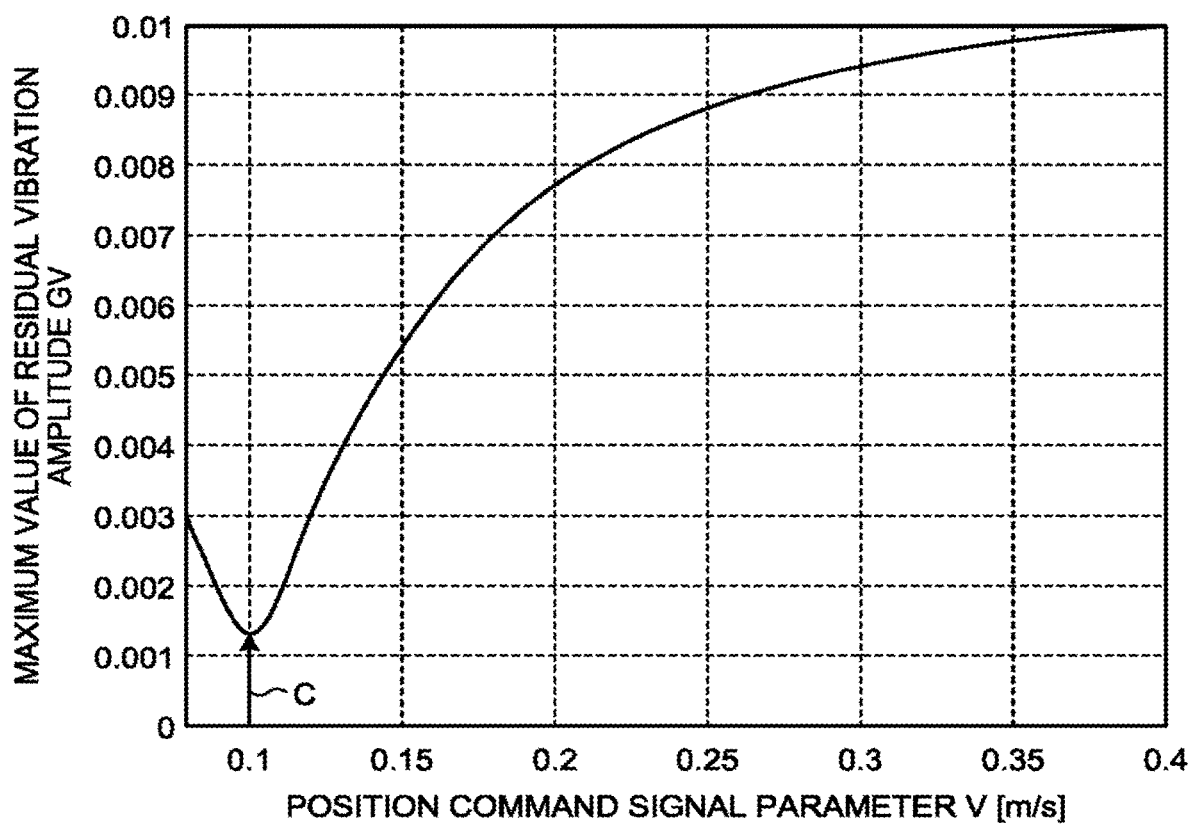
FIG. 31 is a graph illustrating the relation between the position command signal parameter of a command signal and residual vibration amplitude according to the sixth embodiment of the present invention.

In order to understand the relation between the residual vibration amplitude GV and the position command signal parameter V, FIG. 31 illustrates the relation between the residual vibration amplitude GV and the position command signal parameter V when the residual vibration period Tn=100 ms ($\omega_n$=2π/Tn [rad/s]), the damping ratio $\zeta$=0.1, the set movement distance D=10 mm, and the acceleration A=3.0 G during the accelerating operation are each substituted into the above Expression 40.

In the sixth embodiment as well, as illustrated in FIG. 31, the residual vibration is minimum when the position command signal parameter V takes the same value as the maximum velocity of the position command signal at the time the sum tef of the acceleration time and the constant velocity time is equal to the residual vibration period of 100 ms, or when V=D/Tn (the position indicated by a symbol C in FIG. 31). In the range of the position command signal parameter V>D/Tn, the residual vibration amplitude increases monotonically as the position command signal parameter V increases. Although FIG. 31 illustrates the example with the residual vibration period Tn=100 ms ($\omega_n$=2π/Tn [rad/s]), the damping ratio $\zeta$=0.1, the set movement distance D=10 mm, and the acceleration A=3.0 G during accelerating operation, the characteristic between the position command signal parameter and the residual vibration amplitude is a characteristic that is widely established independently from the values of the residual vibration period, the damping ratio, the set movement distance, and the acceleration during the accelerating operation. The characteristic that the residual vibration amplitude increases monotonically as the position command signal parameter V increases in using the position command signal 222 of the sixth embodiment also holds true for an actual measured value for the reason similar to that according to the first embodiment.

Figure 32:
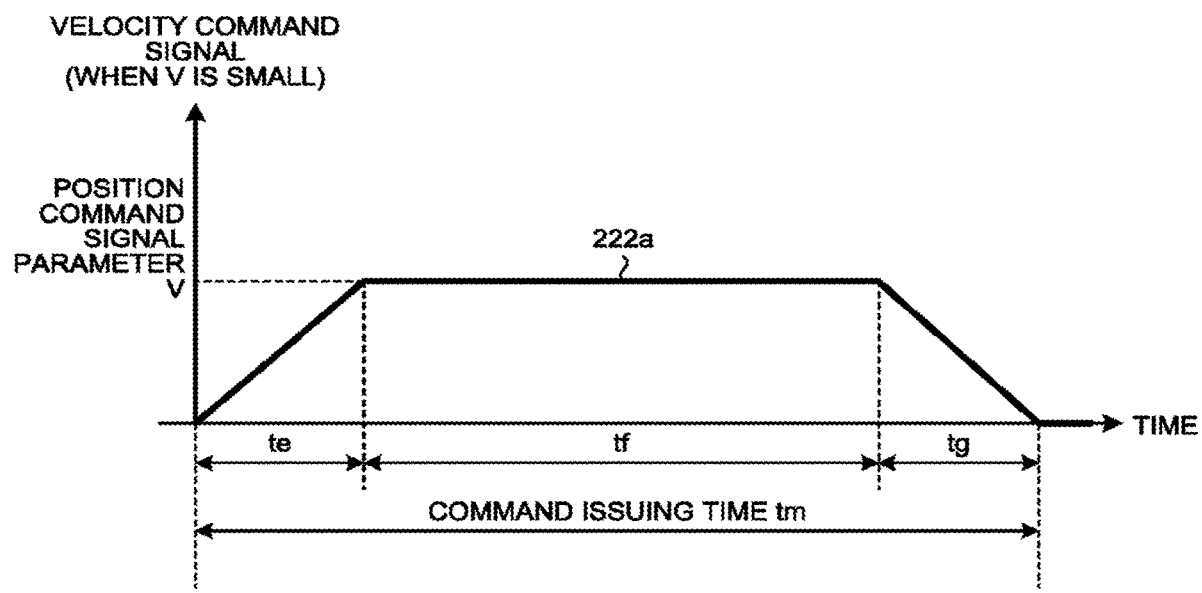
FIG. 32 is a graph illustrating the relation between the position command signal parameter and command issuing time of a command signal according to the sixth embodiment of the present invention.
Figure 33:
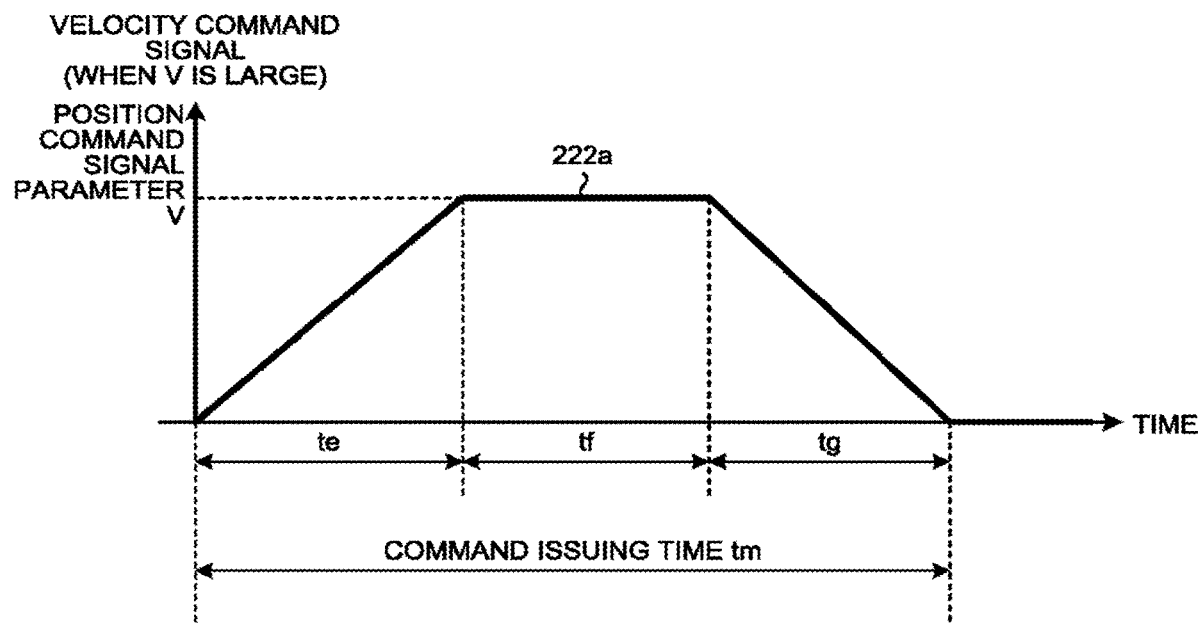
FIG. 33 is a graph illustrating another relation between the position command signal parameter and the command issuing time of a command signal according to the sixth embodiment of the present invention.

In the sixth embodiment, the position command signal parameter 521 corresponds to the maximum velocity V of the position command signal 222. FIG. 32 illustrates a change in the velocity command signal when the position command signal parameter V is small, and FIG. 33 illustrates a change in the velocity command signal when the position command signal parameter V is large. As illustrated in FIGS. 32 and 33, an increase in the position command signal parameter V causes reduction in the sum of the acceleration time te and the constant velocity time tf of the command signal, thereby shortening a command issuing time tm. The positioning time can thus be shortened when the increase in the position command signal parameter V does not cause the residual vibration amplitude to exceed the allowable positioning error 23.

An increase in the position command signal parameter V causes the residual vibration amplitude to increase monotonically in the actual measured value. This characteristic is used so as to be able to obtain the position command signal parameter 521 of which residual vibration amplitude matches the allowable positioning error 23. Accordingly, positioning control can be performed by using the position command signal parameter 521 so as to be able to achieve the object of shortening the positioning time as much as possible while suppressing the residual vibration amplitude within the allowable positioning error 23.

As with the first embodiment, the residual vibration information recording unit 13 stores a plurality of pieces of the residual vibration information 24 while associating the residual vibration amplitude, which is measured at the time of performing positioning control on the basis of the position command signal parameter V, with the corresponding position command signal parameter V. Accordingly, with the use of the characteristic that the residual vibration amplitude increases monotonically as the position command signal parameter V increases, one can easily calculate and determine the position command signal parameter 521 of which residual vibration amplitude matches the allowable positioning error 23 from the plurality of pieces of the residual vibration information 24 stored in the residual vibration information recording unit 13.

A linear interpolation function expressing the relation between the position command signal parameter V and the residual vibration amplitude GV' is expressed by the following Expression 41 when two pieces of the residual vibration information 24 can be used as the plurality of pieces of the residual vibration information 24, the two pieces of the residual vibration information being the first residual vibration amplitude $GV_1'$ which is the maximum value of the residual vibration amplitude measured when positioning control is performed with the first position command signal parameter $V_1$ and the second residual vibration amplitude $GV_2'$ which is the maximum value of the residual vibration amplitude measured when positioning control is performed with the second position command signal parameter $V_2$.

$$V = \frac{GV' - GV_1'}{GV_1' - GV_2'}(V_1 - V_2) + V_1 \quad \text{[Expression 41]}$$

Accordingly, the position command signal parameter $V_{opt}$ of which residual vibration amplitude matches the allowable positioning error $G_{INP}$ can be calculated by substituting $G_{INP}$ for GV' in Expression 41 and expressed by Expression 35 above.

Here, the processing from steps S62 to S64 in the flowchart of FIG. 30 corresponds to the processing performed by the residual vibration information recording unit 13 to obtain the first position command signal parameter $V_1$ and the first residual vibration amplitude $GV_1'$ used to calculate the position command signal parameter 521 of which residual vibration amplitude matches the allowable positioning error 23.

The processing from steps S66 to S68 in the flowchart of FIG. 30 corresponds to the processing performed by the residual vibration information recording unit 13 to obtain the second position command signal parameter $V_2$ and the second residual vibration amplitude $GV_2'$ used to calculate the position command signal parameter 521 of which residual vibration amplitude matches the allowable positioning error 23.

The processing of step S69 in the flowchart of FIG. 30 corresponds to the processing performed by the position command signal parameter determining unit 14 to calculate the position command signal parameter $V_{opt}$ of which residual vibration amplitude matches the allowable positioning error $G_{INP}$.

In the sixth embodiment, the velocity command signal 222a which is the first derivative of the position command signal 222 has the trapezoidal shape with the constant velocity time tf as well as the acceleration time te having the same value as the deceleration time tg, where the position command signal parameter 521 is the maximum velocity V of the position command signal.

In this case as well, there can be calculated the position command signal parameter 521 of which residual vibration amplitude being generated is within the allowable positioning error 23 and at the same time the positioning time can be shortened.

Although the sixth embodiment employs linear interpolation as a method of interpolating the relation between the position command signal parameter V and the residual vibration amplitude GV' being generated on the basis of the residual vibration information 24, there can be employed any interpolation method using the monotonically increasing characteristic such as polynomial interpolation or interpolation using a trigonometric function with the monotonically increasing characteristic.

In the sixth embodiment, the position command signal 222 which is a command for performing positioning control can be uniquely determined by specifying the maximum velocity V of the velocity command signal 222a as the position command signal parameter 521, not just from the set movement distance D, the acceleration A during the accelerating operation, and the information that the velocity command signal 222a has the trapezoidal shape with the acceleration time te equal to the deceleration time tg. Alternatively, the position command signal 222 can be uniquely determined in a similar manner by specifying, as the position command signal parameter 521, a parameter indirectly expressing the maximum velocity V of the velocity command signal 222a.

Specifically, the position command signal parameter 521 can be a parameter expressing a ratio between the maximum velocity V of the velocity command signal 222a and the maximum value $\sqrt{(AD)}$ of the maximum velocity V described above in Expression 34. The parameter expressing the ratio between the maximum velocity V and the maximum value $\sqrt{(AD)}$ of the maximum velocity V is hereinafter denoted by a reference character n. At this time, the maximum velocity V is expressed by the following Expression 42.

$$V = n \cdot \sqrt{AD} \quad \text{[Expression 42]}$$

The maximum velocity V takes the value within the range of Expression 34 so that, by substituting Expression 42 into Expression 34, the position command signal parameter n takes the value within the range of the following Expression 43.

$$0 < n \leq 1 \quad \text{[Expression 43]}$$

Figure 34:
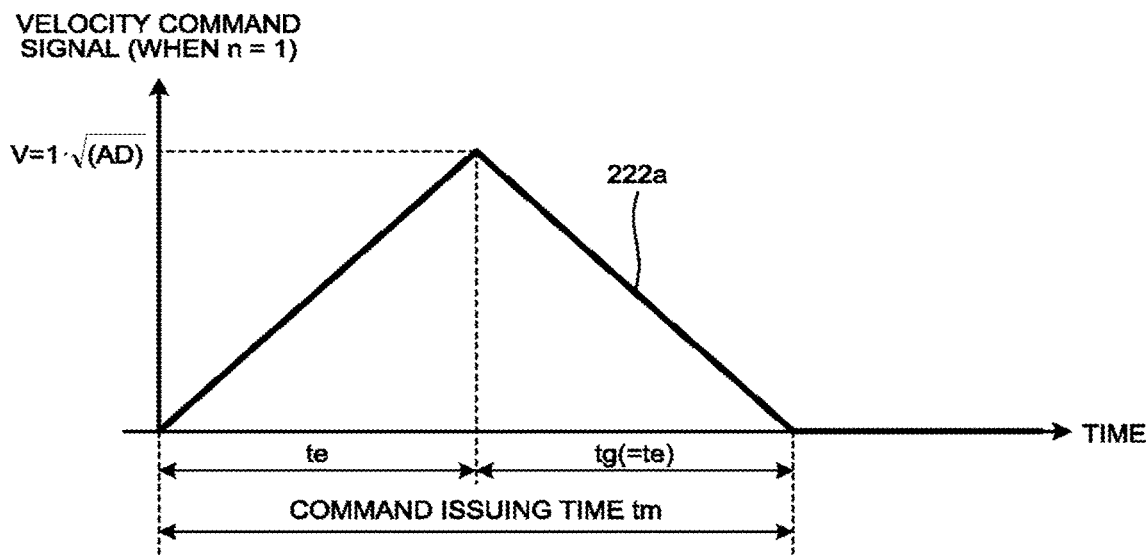
FIG. 34 is a graph illustrating the relation between another position command signal parameter and the command issuing time of a command signal according to the sixth embodiment of the present invention.
Figure 35:
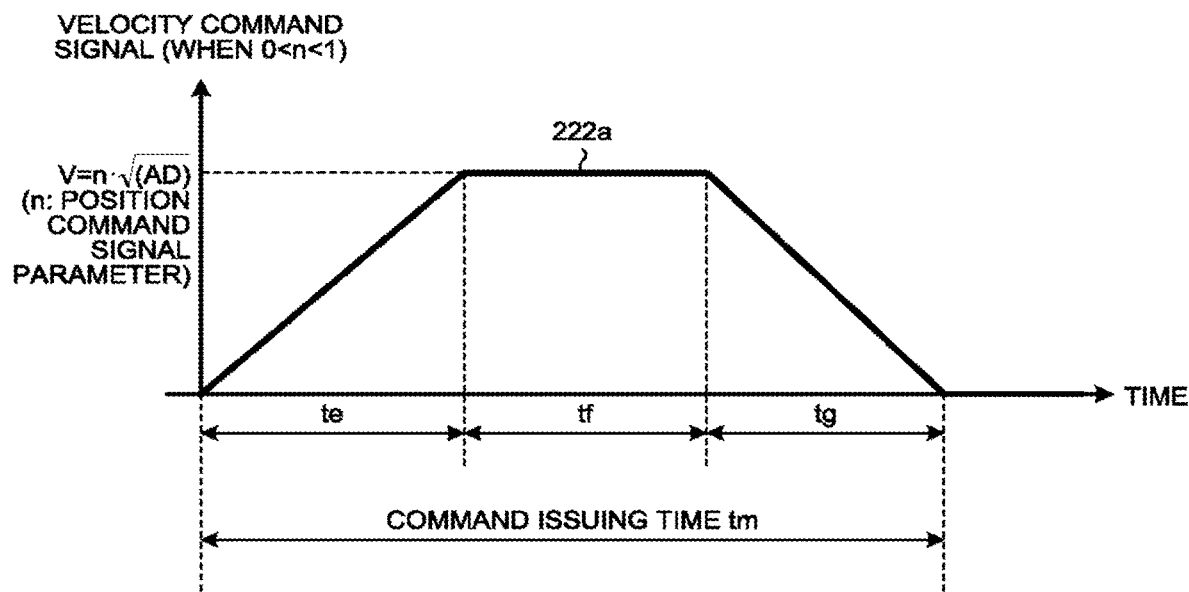
FIG. 35 is a graph illustrating another relation between another position command signal parameter and command issuing time of a command signal according to the sixth embodiment of the present invention.

FIG. 34 illustrates the shape of the velocity command signal 222a when the position command signal parameter n=1, and FIG. 35 illustrates the shape of the velocity command signal 222a when 0<n<1. As illustrated in FIGS. 34 and 35, the position command signal 222 which is the command for performing positioning control can be uniquely determined by specifying, as the position command signal parameter 521, the ratio n between the maximum velocity V of the velocity command signal 222a and the maximum value $\sqrt{(AD)}$ of the maximum velocity V in addition to the set movement distance D, the acceleration A during the accelerating operation, and the information that the velocity command signal 222a has the trapezoidal shape with the acceleration time te equal to the deceleration time tg.

According to Expression 42, the maximum velocity V is directly proportional to the position command signal parameter n, thereby establishing the characteristic that the residual vibration amplitude increases monotonically as the position command signal parameter n increases. Thus, in the case where the ratio n between the maximum velocity V of the velocity command signal 222a and the maximum value $\sqrt{(AD)}$ of the maximum velocity V is used as the position command signal parameter 521, there can also be calculated the position command signal parameter 521 of which residual vibration amplitude being generated is within the allowable positioning error 23 and at the same time the positioning time can be shortened.

Seventh Embodiment

A seventh embodiment of the present invention will now be described. From the characteristic that the residual vibration amplitude decreases monotonically as the position command signal parameter increases, the positioning controller according to the first to third embodiments shortens the positioning time by using the linear interpolation function and calculating the position command signal parameter of which residual vibration amplitude matches the allowable positioning error 23. The seventh embodiment is adapted to obtain a position command signal parameter 21 of which positioning time can be further shortened.

Figure 36:
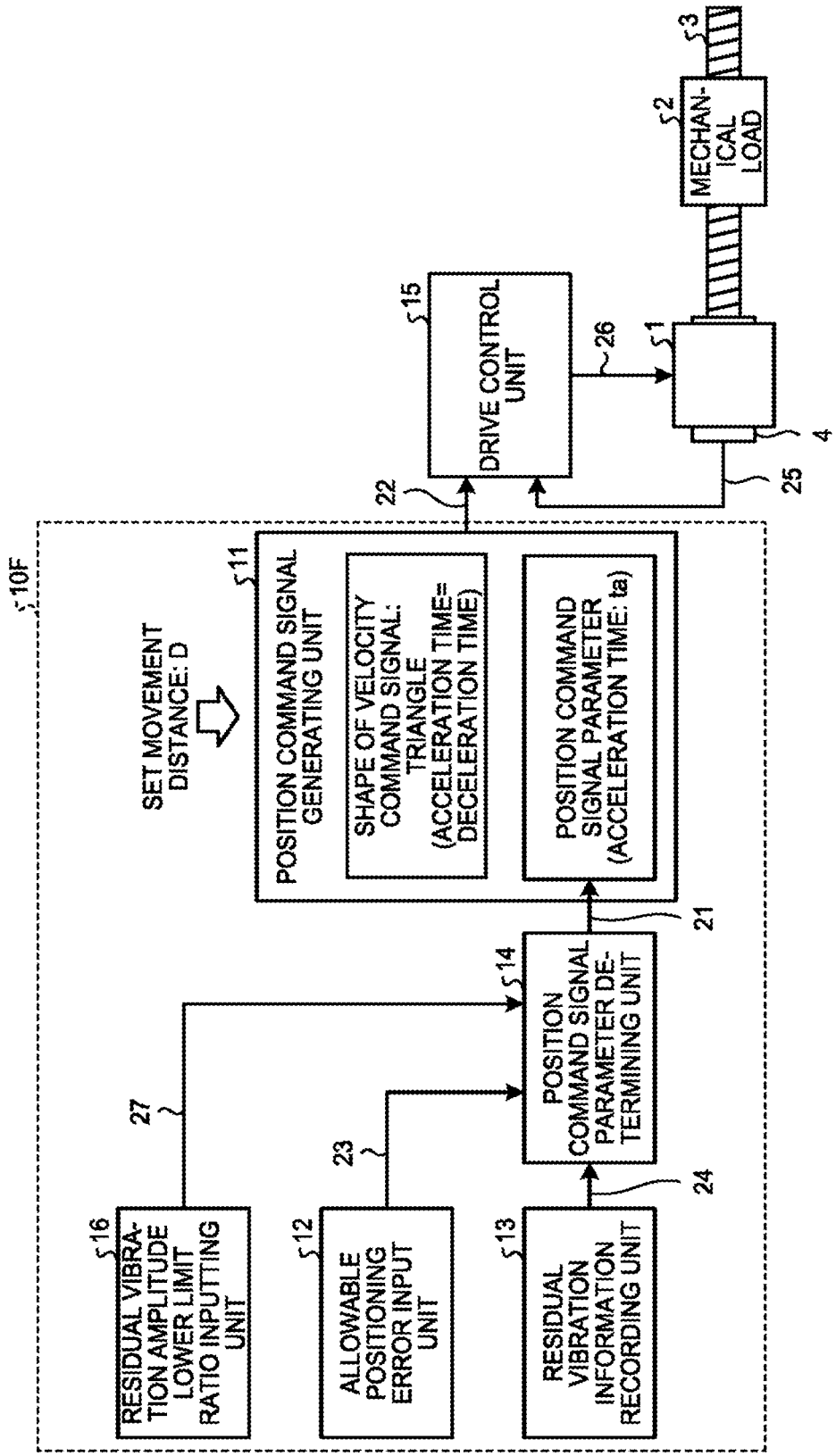
FIG. 36 is a block diagram of a positioning controller according to a seventh embodiment of the present invention.

FIG. 36 is a block diagram illustrating a positioning controller according to the seventh embodiment of the present invention. A positioning controller 10F of the seventh embodiment is different from the positioning controller 10 of the first embodiment in that a residual vibration amplitude lower limit ratio inputting unit 16 is included. Overlaps with the positioning controller 10 of the first embodiment will be denoted by the same reference numerals and not be described in detail, whereby a difference between the embodiments will be described.

As illustrated in FIG. 36, the positioning controller 10F according to the seventh embodiment includes the residual vibration amplitude lower limit ratio inputting unit 16. A residual vibration amplitude lower limit ratio 27 is specified and input in advance to the residual vibration amplitude lower limit ratio inputting unit 16. The residual vibration amplitude lower limit ratio 27 is a value determining the magnitude of an error between a target position and a detected position of a motor 1 or a mechanical load 2 at the end of positioning control, or a residual vibration amplitude lower limit being the lower limit of a residual vibration amplitude of the motor 1 or the mechanical load 2 generated at the time of positioning control with respect to the aforementioned allowable positioning error 23. For example, the residual vibration amplitude lower limit ratio determines what percentage or more of the allowable positioning error 23 is set as the value of the error or the residual vibration amplitude lower limit.

The residual vibration amplitude lower limit ratio 27 is externally input in advance by an operator, so that the residual vibration amplitude lower limit ratio inputting unit 16 outputs the residual vibration amplitude lower limit ratio 27 being input to a position command signal parameter determining unit 14. The position command signal parameter determining unit 14 calculates the position command signal parameter 21 on the basis of the allowable positioning error 23, the residual vibration amplitude lower limit ratio 27, and a plurality of pieces of residual vibration information 24 stored in a residual vibration information recording unit 13.

Figure 37:
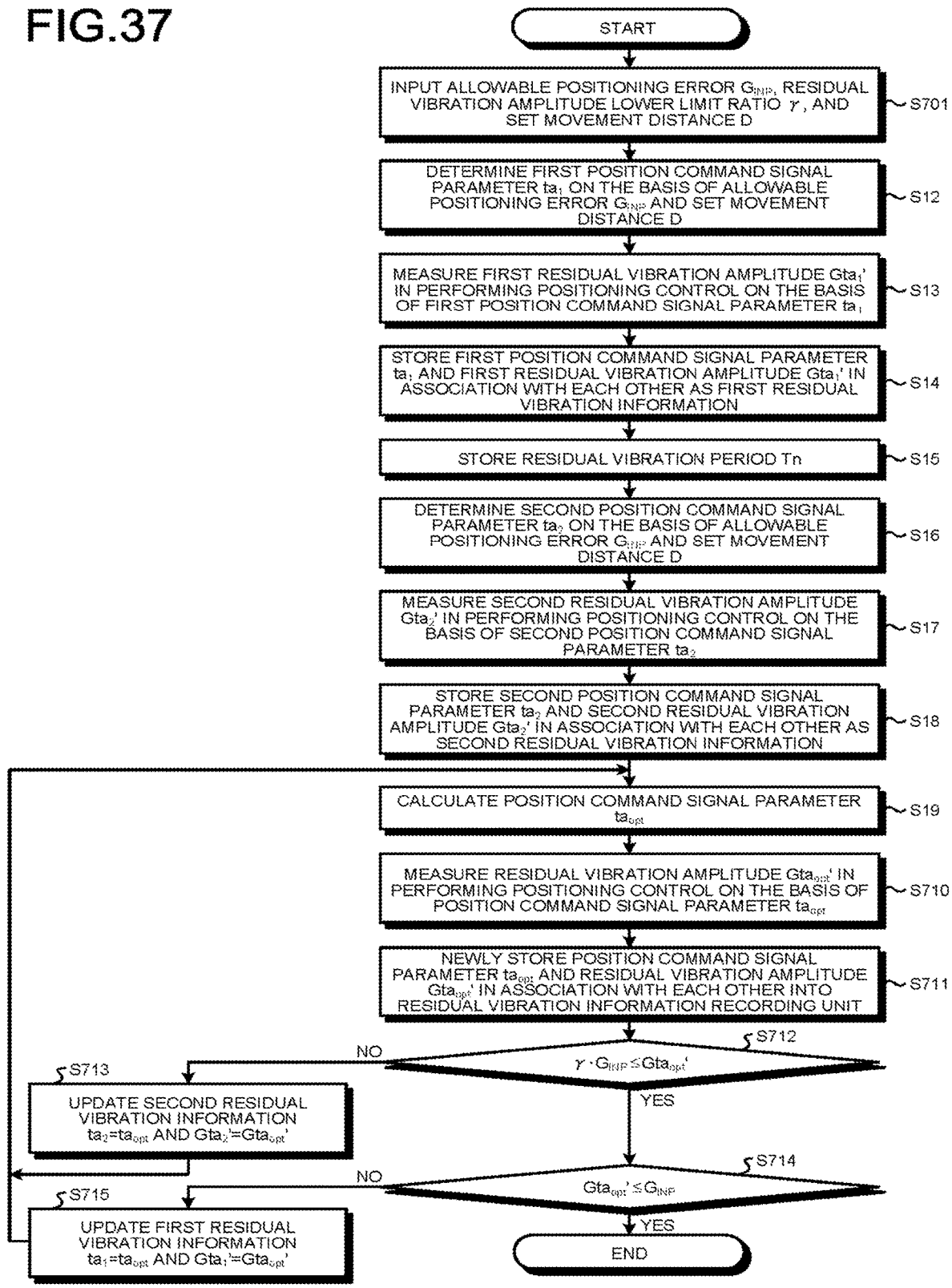
FIG. 37 is a flowchart illustrating operation procedures of the positioning controller according to the seventh embodiment of the present invention.

FIG. 37 is a flowchart illustrating operation procedures of the positioning controller according to the seventh embodiment. In this flowchart, the procedures from steps S12 to S19 are the same as those explained in the first embodiment (FIG. 3) and are thus denoted by the same reference numerals to omit description of such procedures.

At step S701, an operator inputs a predetermined allowable positioning error $G_{INP}$ to an allowable positioning error input unit 12. The operator also inputs a predetermined set movement distance D to a position command signal generating unit 11. The operator further inputs a predetermined residual vibration amplitude lower limit ratio γ to the residual vibration amplitude lower limit ratio inputting unit 16. As described above, the allowable positioning error $G_{INP}$ is the same as the allowable positioning error 23 described above. The residual vibration amplitude lower limit ratio γ is set within the range of 0<γ<1, and the residual vibration amplitude lower limit is expressed as γ·$G_{INP}$ on the basis of the allowable positioning error $G_{INP}$. Alternatively, instead of inputting the allowable positioning error $G_{INP}$, the residual vibration amplitude lower limit ratio γ, and the set movement distance D as occasion demands, a storage unit allowing storage in each of the allowable positioning error input unit 12 and the residual vibration amplitude lower limit ratio inputting unit 16 can be included therein to store the allowable positioning error $G_{INP}$, the residual vibration amplitude lower limit ratio γ, and the set movement distance D in advance and read the allowable positioning error $G_{INP}$, the residual vibration amplitude lower limit ratio γ, and the set movement distance D stored in the storage unit in the procedure of step S701.

Although the details will be described later, a position command signal parameter ta of the seventh embodiment is determined such that a residual vibration amplitude Gta' generated by positioning control and the residual vibration amplitude lower limit γ·$G_{INP}$ satisfies the following relation.

$$\gamma \cdot G_{INP} \leq Gta' \leq G_{INP}$$

As described above, at step S19, there is calculated a position command signal parameter $ta_{opt}$ of which residual vibration amplitude is within the allowable positioning error $G_{INP}$ and at the same time the positioning time can be shortened. After that, at step S710, a drive control unit 15 performs positioning control by using a position command signal 22 corresponding to the position command signal parameter $ta_{opt}$ being calculated, and the residual vibration information recording unit 13 measures a residual vibration amplitude $Gta_{opt}'$ generated at this time.

At step S711, the residual vibration information recording unit 13 stores the position command signal parameter $ta_{opt}$ and the residual vibration amplitude $Gta_{opt}'$ in association with each other as new residual vibration information 24. At step S712, the position command signal parameter determining unit 14 compares the magnitude of the residual vibration amplitude $Gta_{opt}'$ and the residual vibration amplitude lower limit γ·$G_{INP}$. The processing proceeds to step S714 if it is determined at step S712 that the residual vibration amplitude $Gta_{opt}'$ is larger than the residual vibration amplitude lower limit γ·$G_{INP}$ (Yes at step S712). The processing proceeds to step S713 if the residual vibration amplitude $Gta_{opt}'$ is not larger than the residual vibration amplitude lower limit γ·$G_{INP}$ (No at step S712).

At step S713, the residual vibration information recording unit 13 updates second residual vibration information. In this case, the residual vibration information recording unit 13 uses the position command signal parameter $ta_{opt}$ calculated at step S19 as a second position command signal parameter $ta_2$ and uses the residual vibration amplitude $Gta_{opt}'$ measured at step S710 as a second residual vibration amplitude $Gta_2'$.

On the other hand, at step S714, the position command signal parameter determining unit 14 compares the magnitude of the residual vibration amplitude $Gta_{opt}'$ and the allowable positioning error $G_{INP}$. The processing is completed if it is determined at step S714 that the allowable positioning error $G_{INP}$ is larger than the residual vibration amplitude $Gta_{opt}'$ (Yes at step S714). The process proceeds to step S715 if the allowable positioning error $G_{INP}$ is not larger than the residual vibration amplitude $Gta_{opt}'$ (No at step S714).

At step S715, the residual vibration information recording unit 13 updates first residual vibration information. In this case, the residual vibration information recording unit 13 uses the position command signal parameter $ta_{opt}$ calculated at step S19 as a first position command signal parameter $ta_1$ and uses the residual vibration amplitude $Gta_{opt}'$ measured at step S710 as a first residual vibration amplitude $Gta_1'$.

Accordingly, on the basis of the operation procedures of the flowchart illustrated in FIG. 37, the position command signal parameter 21 simultaneously satisfying the conditions described at steps S712 and S714, namely γ·$G_{INP} \leq Gta_{opt}' \leq G_{INP}$, can be calculated and determined. Positioning control can thus be performed by using the position command signal parameter 21 to be able to obtain the position command signal 22 of which positioning time can be further shortened while suppressing the residual vibration amplitude generated at the time of positioning control within the allowable positioning error 23.

Effects of the seventh embodiment will now be described. In particular, there will be described the reason why the processing of the flowchart illustrated in FIG. 37 calculates the position command signal parameter 21 generating the position command signal 22 of which residual vibration amplitude is within the allowable positioning error 23 and at the same time a command issuing time is shortened.

In order to shorten the positioning time, the first to third embodiments calculate the position command signal parameter $ta_{opt}$ of which residual vibration amplitude Gta matches the allowable positioning error $G_{INP}$. In this case, the relation between the position command signal parameter ta and the residual vibration amplitude Gta' is interpolated by using the plurality of pieces of the residual vibration information 24 and the characteristic that the residual vibration amplitude Gta decreases monotonically as the position command signal parameter ta increases in the actual measured value.

The first embodiment calculates the position command signal parameter 21 of which residual vibration amplitude matches the allowable positioning error 23 by the interpolation function while performing approximation therewith. In this case, depending on the situation, the residual vibration amplitude $Gta_{opt}'$ being generated cannot completely match the allowable positioning error 23 when positioning control is performed using the position command signal corresponding to the position command signal parameter $ta_{opt}$ being calculated.

In the first to third embodiments, an increase in the position command signal parameters 21 to 221 causes the residual vibration amplitude to decrease monotonically but the positioning time to increase. On the other hand, there has been described the characteristic that a decrease in the position command signal parameters 21 to 221 causes an increase in the residual vibration amplitude but reduction in the positioning time when the residual vibration amplitude is within the allowable positioning error 23.

From this characteristic, one can see the following (1) and (2) when the residual vibration amplitude $Gta_{opt}'$ does not match the allowable positioning error $G_{INP}$.

(1) When the residual vibration amplitude $Gta_{opt}'$<the allowable positioning error $G_{INP}$, the position command signal parameter ta can be set to a lower value than the position command signal parameter $ta_{opt}$ so as to be able to determine the position command signal parameter 21 of which residual vibration amplitude is within the allowable positioning error 23 and at the same time the positioning time can be shortened.

(2) Even if the residual vibration amplitude $Gta_{opt}'$>the allowable positioning error $G_{INP}$, the position command signal parameter 21 can be set to a larger value than the position command signal parameter $ta_{opt}$ so as to be able to perform positioning control within the allowable positioning error 23.

The seventh embodiment is characterized by the configuration in which a specific position command signal parameter 21 is calculated and determined.

The seventh embodiment sets the residual vibration amplitude lower limit ratio γ (0<γ<1) indicating what percentage or more of the allowable positioning error 23 is set as the value of the residual vibration amplitude.

In this case, there is calculated the position command signal parameter 21 of which residual vibration amplitude $Gta_{opt}'$ satisfies $\gamma \cdot G_{INP} \leq Gta_{opt}' \leq G_{INP}$. When the position command signal parameter 21 of which residual vibration amplitude is simply within the allowable positioning error 23 is to be calculated, there can possibly be calculated the position command signal parameter 21 of which residual vibration amplitude is within the allowable positioning error 23 but the positioning time is increased.

The position command signal parameter 21 can thus be calculated upon setting the lower limit of the residual vibration amplitude with the residual vibration amplitude lower limit ratio $\gamma$ so as to be able to calculate the position command signal parameter 21 of which residual vibration amplitude is within the allowable positioning error 23 and at the same time the positioning time can be shortened.

From steps S701 to S19 of the flowchart in the seventh embodiment, the position command signal parameter 21 is obtained on the basis of the plurality of pieces of the residual vibration information 24 as with the first to third embodiments. After step S19, it is determined at step S712 whether the residual vibration amplitude $Gta_{opt}'$ generated when positioning control is performed on the basis of the position command signal parameter 21 satisfies $\gamma \cdot G_{INP} \leq Gta_{opt}'$, or it is determined at step S714 whether $Gta_{opt}' \leq G_{INP}$ is satisfied.

If the condition at step S712 or S714 is not satisfied, the processing at step S713 or S715 is performed to update the position command signal parameter 21. There will now be described updating of the position command signal parameter 21 with reference to FIGS. 38 to 41. FIGS. 38 to 41 each illustrates the relation between the position command signal parameter and the residual vibration amplitude with a horizontal axis representing the position command signal parameter and a vertical axis representing the residual vibration amplitude.

Figure 38:
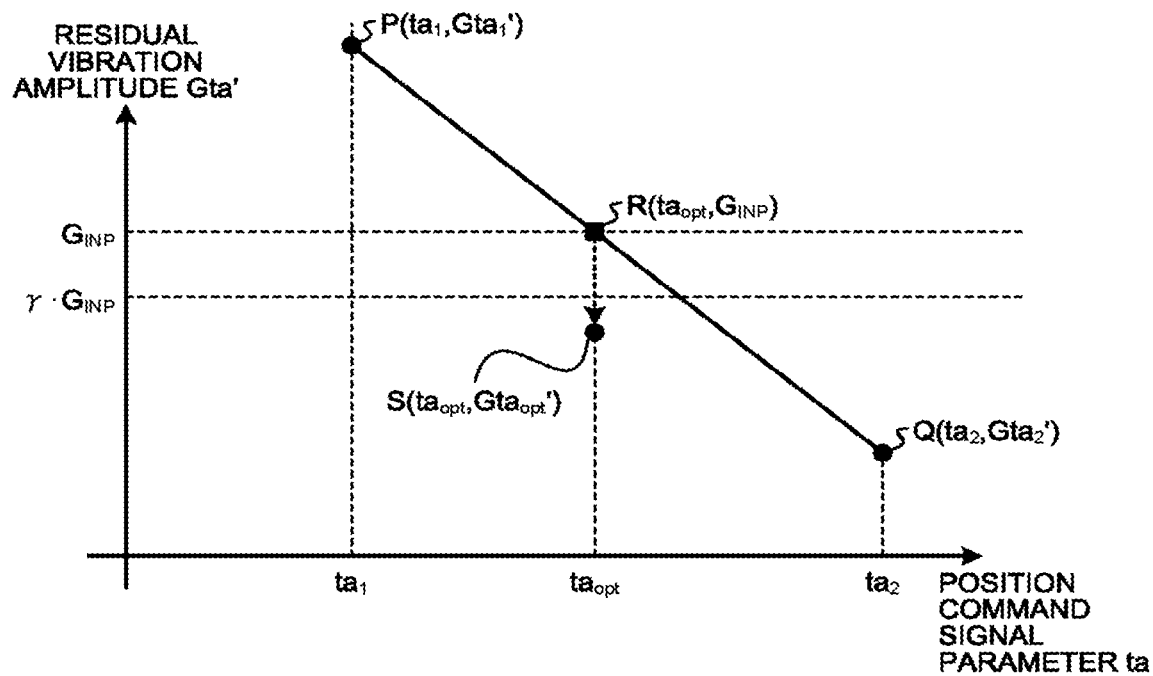
FIG. 38 is a graph illustrating the relation between a position command signal parameter and residual vibration amplitude according to the seventh embodiment of the present invention.

FIG. 38 illustrates the relation among the first and second residual vibration information 24, the position command signal parameter $ta_{opt}$ being calculated, and the residual vibration amplitude $Gta_{opt}'$ in the case where $\gamma \cdot G_{INP} \leq Gta_{opt}'$ is not satisfied at step S712 of FIG. 37. Point P in FIG. 38 represents the relation between the first position command signal parameter $ta_1$ and the first residual vibration amplitude $Gta_1'$ stored as the first residual vibration information 24 at step S14. Point Q represents the relation between the second position command signal parameter $ta_2$ and the second residual vibration amplitude $Gta_2'$ stored as the second residual vibration information 24 at step S18. Point R represents the relation between the position command signal parameter $ta_{opt}$ and the allowable positioning error $G_{INP}$ when the position command signal parameter $ta_{opt}$ is calculated at step S19 such that the residual vibration amplitude matches the allowable positioning error $G_{INP}$ on the basis of the first residual vibration information 24 and the second residual vibration information 24. Point S represents the relation between the position command signal parameter 21 and the residual vibration amplitude $Gta_{opt}'$ actually measured when positioning control is performed with the position command signal parameter $ta_{opt}$ at step S710. The condition at step S712 is not satisfied in FIG. 38 so that the residual vibration amplitude $Gta_{opt}'$ actually measured is smaller than the residual vibration amplitude lower limit $\gamma \cdot G_{INP}$.

Moreover, when point S is in the range of $Gta_{opt}' < \gamma \cdot G_{INP}$ as illustrated in FIG. 38, a decrease in the position command signal parameter 21 causes an increase in the residual vibration amplitude as described above. In this case, according to the characteristic that the positioning time is shortened when the residual vibration amplitude is within the allowable positioning error 23, the position command signal parameter $ta$ smaller than the position command signal parameter $ta_{opt}$ is used so as to be able to calculate the position command signal parameter 21 of which residual vibration amplitude is within the allowable positioning error 23 and at the same time the positioning time can be further shortened. The position command signal parameter $ta_{opt}$ at point R is obtained by interpolating the residual vibration information 24 at points P and Q and thus takes the value between the first position command signal parameter $ta_1$ and the second position command signal parameter $ta_2$. Here, when positioning control is performed with the position command signal parameter $ta_{opt}$ at point R, the residual vibration amplitude is known by step S712 to be smaller than the residual vibration amplitude lower limit $\gamma \cdot G_{INP}$ and is represented by point S. It is also known that, when positioning control is performed at point P, the residual vibration amplitude exceeds the allowable positioning error $G_{INP}$. Accordingly, from the characteristic that the residual vibration amplitude increases as the position command signal parameter 21 decreases, the position command signal parameter 21 of which residual vibration amplitude is between the residual vibration amplitude lower limit $\gamma \cdot G_{INP}$ and the allowable positioning error $G_{INP}$ takes a value between the first position command signal parameter $ta_1$ and the position command signal parameter $ta_{opt}$.

Now, with point S being a new piece of the second residual vibration information 24, the position command signal parameter 21 of which residual vibration amplitude matches the allowable positioning error $G_{INP}$ is obtained by interpolating the residual vibration information 24 at points P and S. This corresponds to the processing performed at step S713 by the residual vibration information recording unit 13 to update the second residual vibration information 24, and the processing performed at step S19 by the position command signal parameter determining unit 14 to calculate the position command signal parameter 21 on the basis of the two pieces of the residual vibration information 24.

Figure 39:
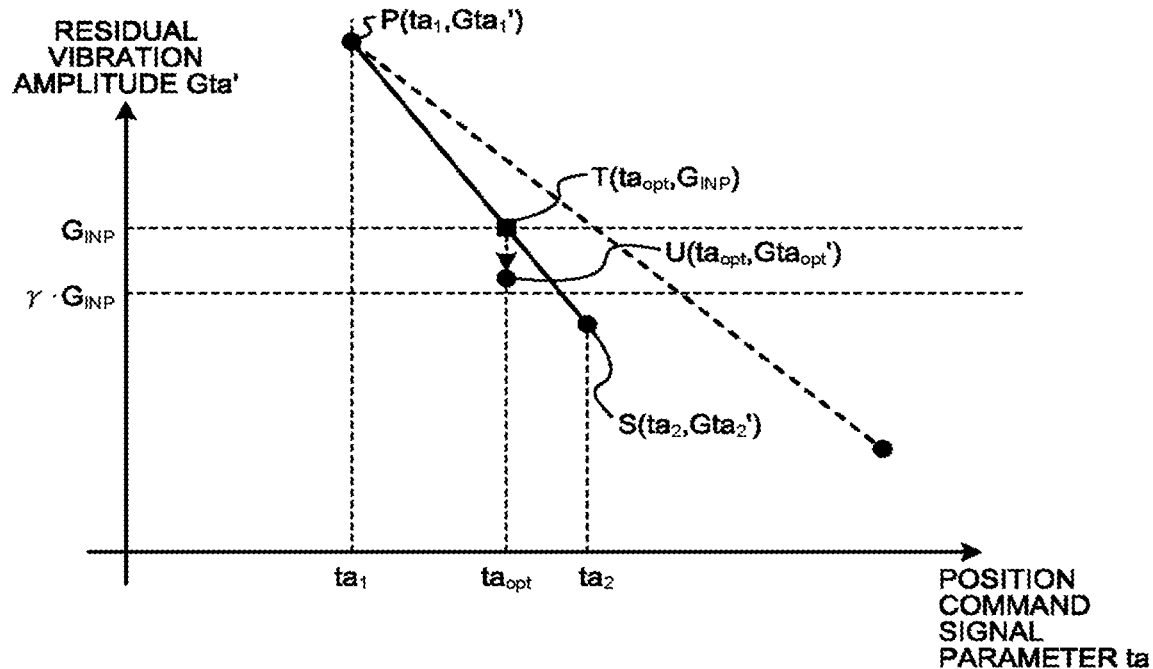
FIG. 39 is a graph illustrating the relation between a position command signal parameter and residual vibration amplitude according to the seventh embodiment of the present invention.

FIG. 39 illustrates the relation between the position command signal parameter 21 and the residual vibration amplitude in the processing from step S713 onward in FIG. 37. Point T represents the relation between the position command signal parameter $ta_{opt}$ and the allowable positioning error $G_{INP}$ when the position command signal parameter $ta_{opt}$ is calculated at step S19 such that the residual vibration amplitude matches the allowable positioning error $G_{INP}$ on the basis of the first residual vibration information 24 (point P) and the new second residual vibration information 24 (point S).

The position command signal parameter 21 calculated at point R (FIG. 38) is in the range between the first position command signal parameter $ta_1$ and the second position command signal parameter $ta_2$, whereas the position command signal parameter 21 calculated at point T is in a narrower range between the first position command signal parameter $ta_1$ and the position command signal parameter $ta_{opt}$. The position command signal parameter 21 can thus be calculated more accurately. Positioning control using the newly calculated position command signal parameter 21 at point T is likely to cause the residual vibration amplitude to fall between the residual vibration amplitude lower limit $\gamma \cdot G_{INP}$ and the allowable positioning error $G_{INP}$ in an actual measured value and to take a value close to the allowable positioning error $G_{INP}$, whereby the positioning time can be further shortened.

Figure 40:
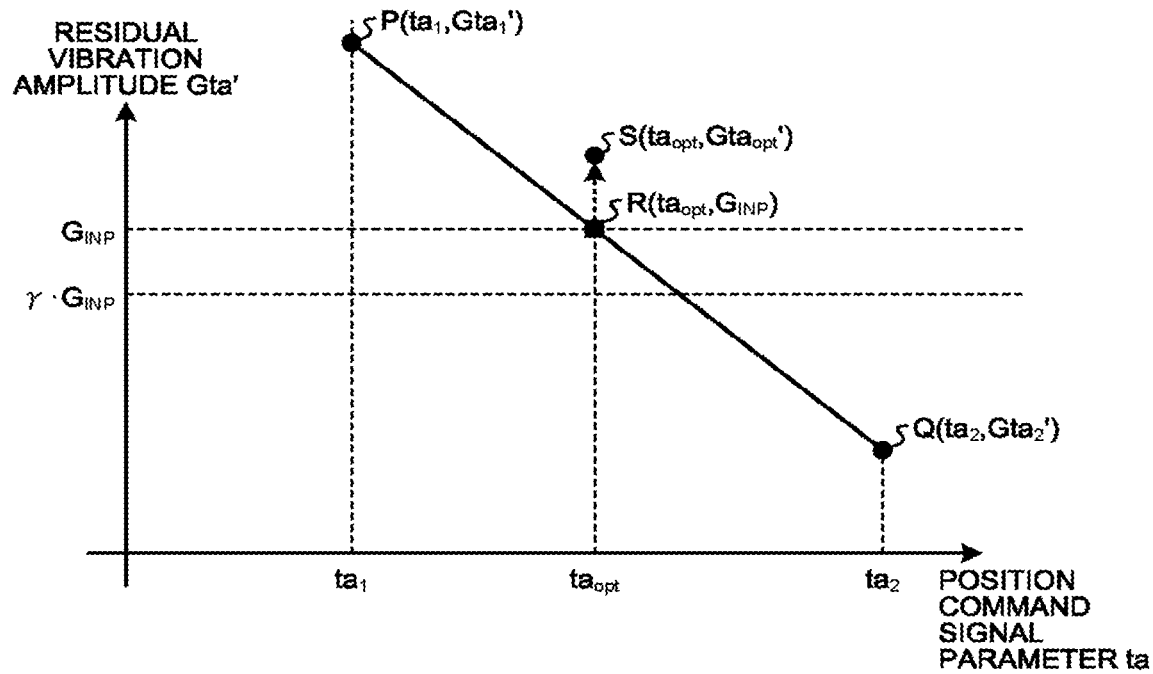
FIG. 40 is a graph illustrating the relation between a position command signal parameter and residual vibration amplitude according to the seventh embodiment of the present invention.

FIG. 40 illustrates the relation among the first and second residual vibration information 24, the position command signal parameter $ta_{opt}$ being calculated, and the residual vibration amplitude $Gta_{opt}'$ when $Gta_{opt}' \leq G_{INP}$ is not satisfied at step S714 of FIG. 37. Points P, Q, and R in FIG. 40 are the same as those in FIG. 38. Point S represents the relation between the position command signal parameter 21 and the residual vibration amplitude $Gta_{opt}'$ actually measured when positioning control is performed with the position command signal parameter $ta_{opt}$ at step S710. The condition at step S714 is not satisfied in FIG. 40 so that the residual vibration amplitude $Gta_{opt}'$ actually measured exceeds the allowable positioning error $G_{INP}$.

Even when point S lies where $G_{INP} < Gta_{opt}'$ as illustrated in FIG. 40, an increase in the position command signal parameter 21 causes a decrease in the residual vibration amplitude. According to this characteristic, the position command signal parameter ta larger than the position command signal parameter $ta_{opt}$ can be used so as to be able to calculate the position command signal parameter 21 for performing positioning control with the residual vibration amplitude suppressed within the allowable positioning error 23. The position command signal parameter $ta_{opt}$ at point R is obtained by interpolating the residual vibration information 24 at points P and Q and thus takes the value between the first position command signal parameter $ta_1$ and the second position command signal parameter $ta_2$. Here, when positioning control is performed with the position command signal parameter $ta_{opt}$ at point R, the residual vibration amplitude is known by step S714 to exceed the allowable positioning error $G_{INP}$ and is represented by point S. It is also known that, when positioning control is performed at point Q, the residual vibration amplitude is within the allowable positioning error $G_{IN}$. The position command signal parameter 21 of which residual vibration amplitude is within the allowable positioning error $G_{INP}$ lies between the position command signal parameter $ta_{opt}$ and the second position command signal parameter $ta_2$.

Now, with point S being a new piece of the first residual vibration information 24, the position command signal parameter 21 of which residual vibration amplitude matches the allowable positioning error $G_{INP}$ is obtained by interpolating the residual vibration information 24 at points S and Q. This corresponds to the processing performed at step S715 by the residual vibration information recording unit 13 to update the first residual vibration information 24, and the processing performed at step S19 by the position command signal parameter determining unit 14 to calculate the position command signal parameter 21 on the basis of the two pieces of the residual vibration information 24.

Figure 41:
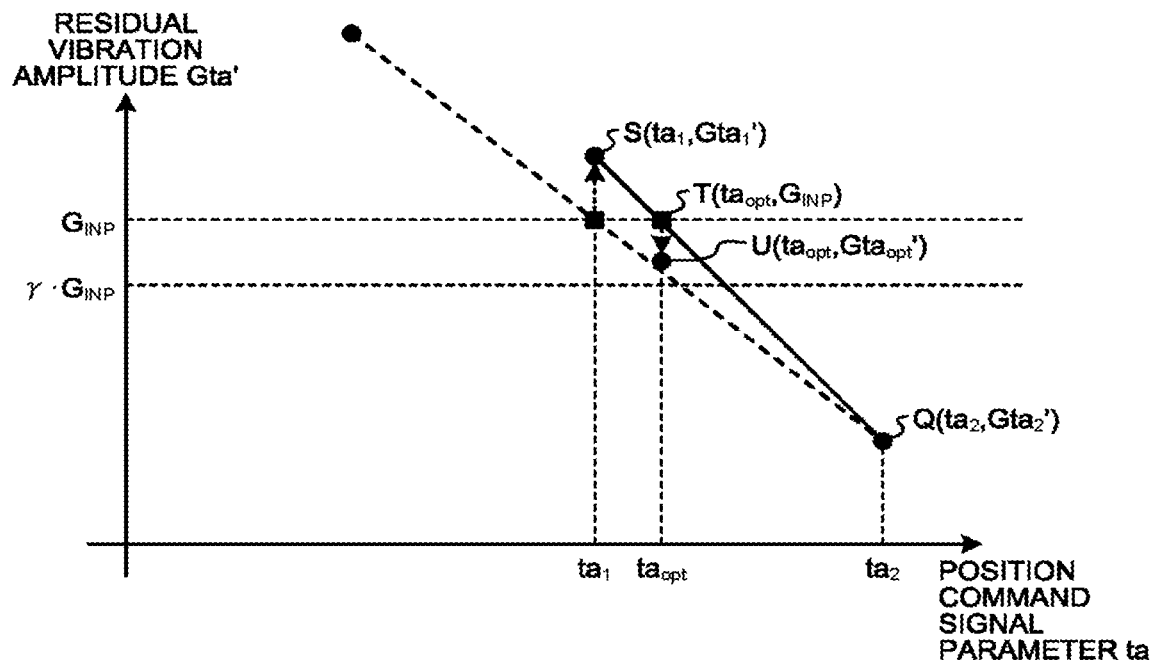
FIG. 41 is a graph illustrating the relation between a position command signal parameter and residual vibration amplitude according to the seventh embodiment of the present invention.

FIG. 41 illustrates the relation between the position command signal parameter 21 and the residual vibration amplitude in the processing from step S714 onward in FIG. 37. Point T represents the relation between the position command signal parameter 21 ($ta_{opt}$) and the residual vibration amplitude $Gta_{opt}'$ when the position command signal parameter $ta_{opt}$ is calculated at step S19 such that the residual vibration amplitude matches the allowable positioning error $G_{INP}$ on the basis of the new first residual vibration information 24 (point S) and the second residual vibration information 24 (point Q).

The position command signal parameter 21 calculated at point R (FIG. 40) is in the range between the first position command signal parameter $ta_1$ and the second position command signal parameter $ta_2$, whereas the position command signal parameter 21 calculated at point T is in a narrower range between the position command signal parameter $ta_{opt}$ and the second position command signal parameter $ta_2$. The position command signal parameter 21 can thus be calculated more accurately. Positioning control using the newly calculated position command signal parameter 21 at point T is likely to cause the residual vibration amplitude to be within the allowable positioning error $G_{INP}$ in an actual measured value, whereby positioning control can be performed such that the residual vibration amplitude is within the allowable positioning error 23.

The seventh embodiment can thus calculate the position command signal parameter 21 for generating the position command signal 22 of which residual vibration amplitude is within the allowable positioning error 23 and at the same time the positioning time can be further shortened. According to the seventh embodiment, the position command signal parameter 21 for shortening a command issuing time is calculated while determining that the residual vibration amplitude $Gta_{opt}'$ is actually between the residual vibration amplitude lower limit $\gamma \cdot G_{INP}$ and the allowable positioning error $G_{INP}$ on the basis of the processing at steps S712 and S714, so that there can be calculated the position command signal parameter 21 of which positioning time can be shortened more reliably.

Although the seventh embodiment has described the configuration and the effect using the position command signal 22 and the position command signal parameter ta of the positioning controller 10 according to the first embodiment, there can be similarly calculated the position command signal parameter for generating the position command signal of which command issuing time is further shortened by using the position command signals 122 and 222 and the position command signal parameters td and tef of the positioning controllers 10A and 10B according to the second and third embodiments, respectively.

The first, second, and third embodiments have the characteristic that an increase in the position command signal parameters 21, 121, and 221 causes the residual vibration amplitude to decrease monotonically, whereas the fourth, fifth, and sixth embodiments have the characteristic that an increase in the position command signal parameters 321, 421, and 521 causes the residual vibration amplitude to increase monotonically. The characteristic of these embodiments is the same in that the increase in the position command signal parameter causes the residual vibration amplitude to change monotonically. A similar effect can thus be obtained by just replacing the processing at steps S713 and S715 of the flowchart in the seventh embodiment illustrated in FIG. 37 in accordance with the fourth, fifth, and sixth embodiments.

Figure 42:
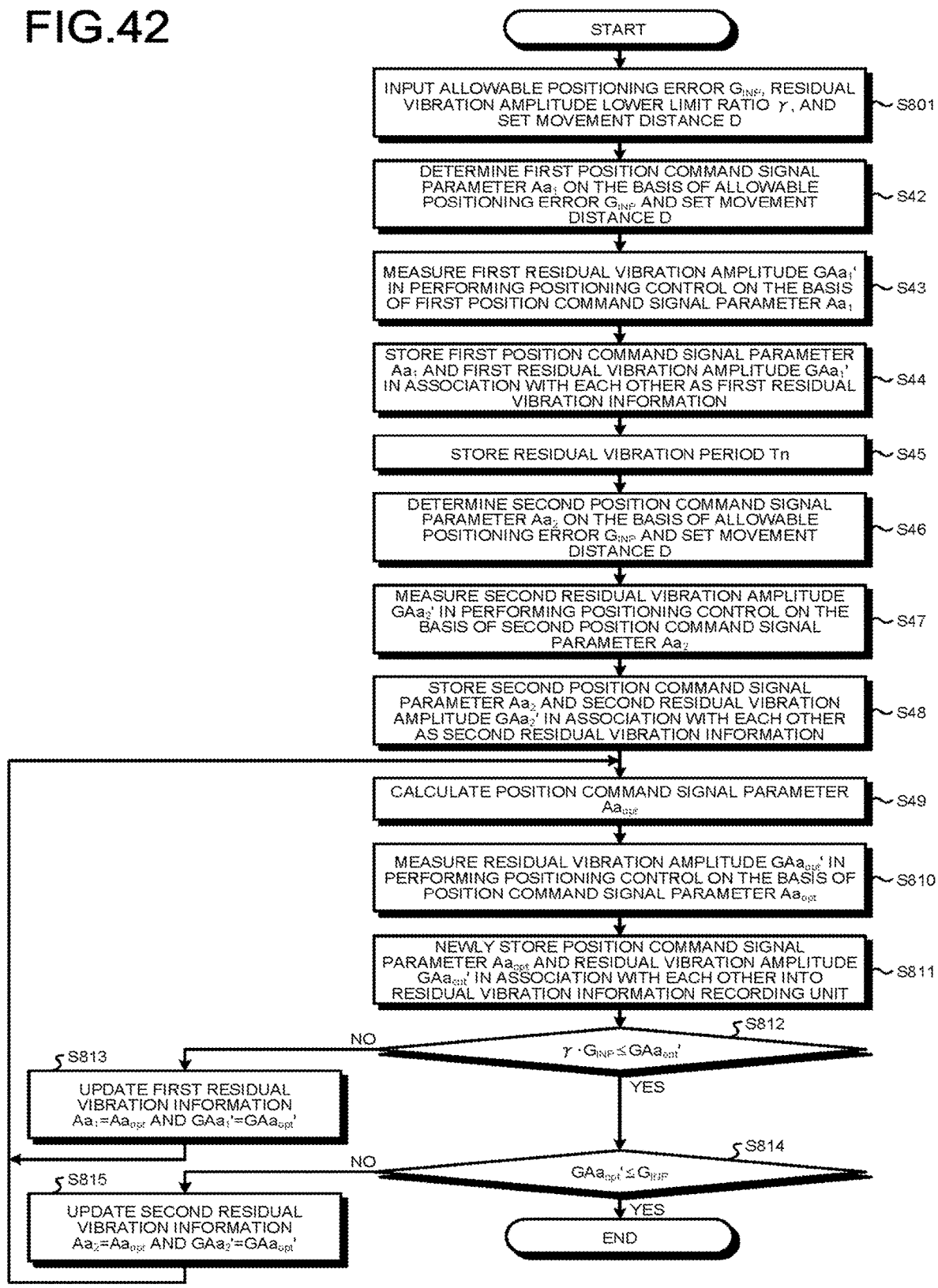
FIG. 42 is a flowchart illustrating different operation procedures of the positioning controller according to the seventh embodiment of the present invention.

FIG. 42 illustrates a flowchart using the fourth embodiment as an example.

At step S813, the residual vibration information recording unit 13 updates first residual vibration information. In this case, the residual vibration information recording unit 13 uses a position command signal parameter $Aa_{opt}$ calculated at step S49 as a first position command signal parameter $Aa_1$ and uses a residual vibration amplitude $GAa_{opt}'$ measured at step S810 as a first residual vibration amplitude $GAa_1'$.

At step S815, the residual vibration information recording unit 13 updates second residual vibration information. In this case, the residual vibration information recording unit 13 uses the position command signal parameter $Aa_{opt}$ calculated at step S49 as a second position command signal parameter $Aa_2$ and uses the residual vibration amplitude $GAa_{opt}'$ measured at step S810 as a second residual vibration amplitude $GAa_2'$.

Therefore, there can be similarly calculated the position command signal parameter for generating the position command signal, of which command issuing time is further shortened, by using the position command signals 22, 122, and 222 and the position command signal parameters Aa, Ad, and V of the positioning controllers 10C, 10D, and 10E according to the fourth, fifth, and six embodiments, respectively.

REFERENCE SIGN LIST 1 motor, 2 mechanical load, 3 ball screw, 4 position sensor, 11, 111, 211, 311, 411, 511 position command signal generating unit, 12 allowable positioning error input unit, 13 residual vibration information recording unit, 14 position command signal parameter determining unit, 15 drive control unit, 16 residual vibration amplitude lower limit ratio inputting unit, 21, 121, 221, 321, 421, 521 position command signal parameter, 22, 122, 222 position command signal, 23 allowable positioning error, 24 residual vibration information, 25 detected position signal, 26 drive current, 27 residual vibration amplitude lower limit ratio.

The invention claimed is:

1. An apparatus comprising:
a controller to:
generate a position command signal on the basis of a position command signal parameter that determines a shape of the position command signal, the position command signal being used to move a control target over a set movement distance by driving a motor;
execute positioning control so that a detected position signal, which is a piece of position information on the motor or the control target that is detected, follows the position command signal on the basis of the detected position signal and the position command signal;
store, as residual vibration information, a residual vibration amplitude and the position command signal parameter in association with each other, the residual vibration amplitude being a magnitude of a residual vibration of the motor or the control target generated when the positioning control has been executed by using a plurality of the position command signals, the position command signal parameter of each being determined and different; and
determine, on the basis of the allowable positioning error and a plurality of stored pieces of the residual vibration information, the position command signal parameter for generating the position command signal that has a residual vibration amplitude that is within an allowable positioning error, the allowable positioning error being a tolerance of a difference between the set movement distance of the control target and a detected position of the motor or the control target at the end of the positioning control.

2. The apparatus according to claim 1, wherein the controller:
accepts input of information that specifies a residual vibration amplitude lower limit that is a lower limit of the residual vibration amplitude when the positioning control is performed, and
determines, on the basis of the allowable positioning error and the plurality of stored pieces of the residual vibration information, the position command signal parameter for generating the position command signal for which residual vibration amplitude is larger than or equal to the residual vibration amplitude lower limit and is within the allowable positioning error.

3. The apparatus according to claim 1, wherein the controller stores at least first residual vibration information when the residual vibration amplitude exceeds the allowable positioning error and second residual vibration information when the residual vibration amplitude is within the allowable positioning error.

4. The apparatus according to claim 3, wherein the controller stores, as the second residual vibration information, the residual vibration information when the residual vibration amplitude is minimum.

5. The apparatus according to claim 1, wherein the controller determines, by interpolating the residual vibration information on the basis of the allowable positioning error and the plurality of stored pieces of the residual vibration information, the position command signal parameter for generating the position command signal for which residual vibration amplitude is within the allowable positioning error.

6. The apparatus according to claim 1, wherein the controller:
newly stores, in addition to the residual vibration information stored in advance, a piece of residual vibration information when the positioning control is performed by using the position command signal corresponding to the determined position command signal parameter, and
determines newly, on the basis of the allowable positioning error and the plurality of pieces of the residual vibration information including the newly stored residual vibration information, the position command signal parameter for generating the position command signal for which residual vibration amplitude is lower than or equal to the allowable positioning error.

7. The apparatus according to claim 1, wherein the controller generates the position command signal, a first derivative of which is a velocity command signal that has a triangular shape with an acceleration time equal to a deceleration time.

8. The apparatus according to claim 1, wherein the controller generates the position command signal, a first derivative of which is a velocity command signal that has a triangular shape with an acceleration time shorter than or equal to a deceleration time.

9. The apparatus according to claim 1, wherein the controller generates the position command signal, a first derivative of which is a velocity command signal that has a trapezoidal shape with a constant velocity time as well as an acceleration time equal to a deceleration time.

10. The apparatus according to claim 1, wherein the controller uses the acceleration time or the deceleration time of the position command signal as the position command signal parameter.

11. The apparatus according to claim 1, wherein the controller uses the sum of the acceleration time and the constant velocity time or the sum of the deceleration time and the constant velocity time as the position command signal parameter.

12. The apparatus according to claim 7, wherein the controller uses acceleration of the position command signal as the position command signal parameter.

13. The apparatus according to claim 9, wherein the controller uses maximum velocity of the velocity command signal, which is the first derivative of the position command signal, as the position command signal parameter.

14. The apparatus according to claim 9, wherein the controller uses, as the position command signal parameter, a ratio between a maximum velocity of a velocity command signal of which a first derivative of the position command signal has a trapezoidal shape and a maximum velocity of a velocity command signal that is the same as the velocity command signal of which set movement distance and acceleration have trapezoidal shape and that has a triangular shape with the acceleration time equal to the deceleration time.

15. The apparatus according to claim 3, wherein the controller includes, as the second residual vibration information of which residual vibration amplitude is smaller than or equal to the allowable positioning error, a piece of residual vibration information having a position command signal parameter in which an acceleration time or deceleration time of the position command signal is a period of the residual vibration, when the velocity command signal which is a first derivative of the position command signal has a triangular shape.

16. The apparatus according to claim 3, wherein the controller includes, as the second residual vibration information of which residual vibration amplitude is smaller than or equal to the allowable positioning error, a piece of residual vibration information that has a position command signal parameter in which the sum of an acceleration time or deceleration time and a constant velocity time of the position command signal is equal to a period of the residual vibration, when the velocity command signal which is the first derivative of the position command signal has a trapezoidal shape.

* * * * *